United States Patent [19]

Itoh

[11] Patent Number: 5,159,596
[45] Date of Patent: Oct. 27, 1992

[54] MOBILE COMMUNICATION SYSTEM

[75] Inventor: Sadao Itoh, Kanagawa, Japan

[73] Assignee: Iwatsu Electric Co., Ltd., Tokyo, Japan

[21] Appl. No.: 543,560

[22] Filed: Jun. 26, 1990

[30] Foreign Application Priority Data

Jun. 26, 1989 [JP] Japan .................. 1-163210

[51] Int. Cl.$^5$ ............ H04J 3/02; H04Q 7/04
[52] U.S. Cl. ...................... 370/95.1; 379/60; 455/33.1; 455/33.4
[58] Field of Search ............ 370/50, 95.1, 95.3, 370/109; 379/60, 63; 455/33, 56, 33.1, 33.4

[56] References Cited

PUBLICATIONS

IEEE Journal on Selected Areas in Communications, vol. Sac-2, No. 4, Jul. 1984, Karl Kammerlander, "C 900—An Advanced Mobile Radio Telephone System with Optimum Frequency Utilization," pp. 589-597.
IEE Proceedings, vol. 131, Part F, No. 2, Apr. 1984, pp. 130-138, R. J. Holbeche, et al., "Comparison Between Time-Compression Multiplexing and Frequency-Division Multiplexing Over Narrowband Radio Systems."
IEEE Transactions on Communications, vol. com-22, No. 12, Dec. 1974, D. H. Morgen, et al., "Time Compression Multiplexing for Loop Transmission of Speech Signals", pp. 1932-1939.

Primary Examiner—Douglas W. Olms
Assistant Examiner—Min Jung
Attorney, Agent, or Firm—Oblon, Spivak, McClelland, Maier & Neustadt

[57] ABSTRACT

A mobile communication system based on a time division communication system comprising: mobile radio units for transmitting and recording time-compressed and segmented signals by a radio channel allocated to time slots; radio base stations to which a communicable time slot is previously allocated so as to communicate using only a specific time slot of those time slots of the radio channel when the mobile radio units moves across one of service areas that are disposed so as to overlap at least partially with one another, the time slot allocated to one radio base station being different from that allocated to another radio base station; and gateway exchange units for exchanging communications between the mobile radio units and the radio base stations and for connecting the radio base stations to a public switched telephone network.

3 Claims, 50 Drawing Sheets

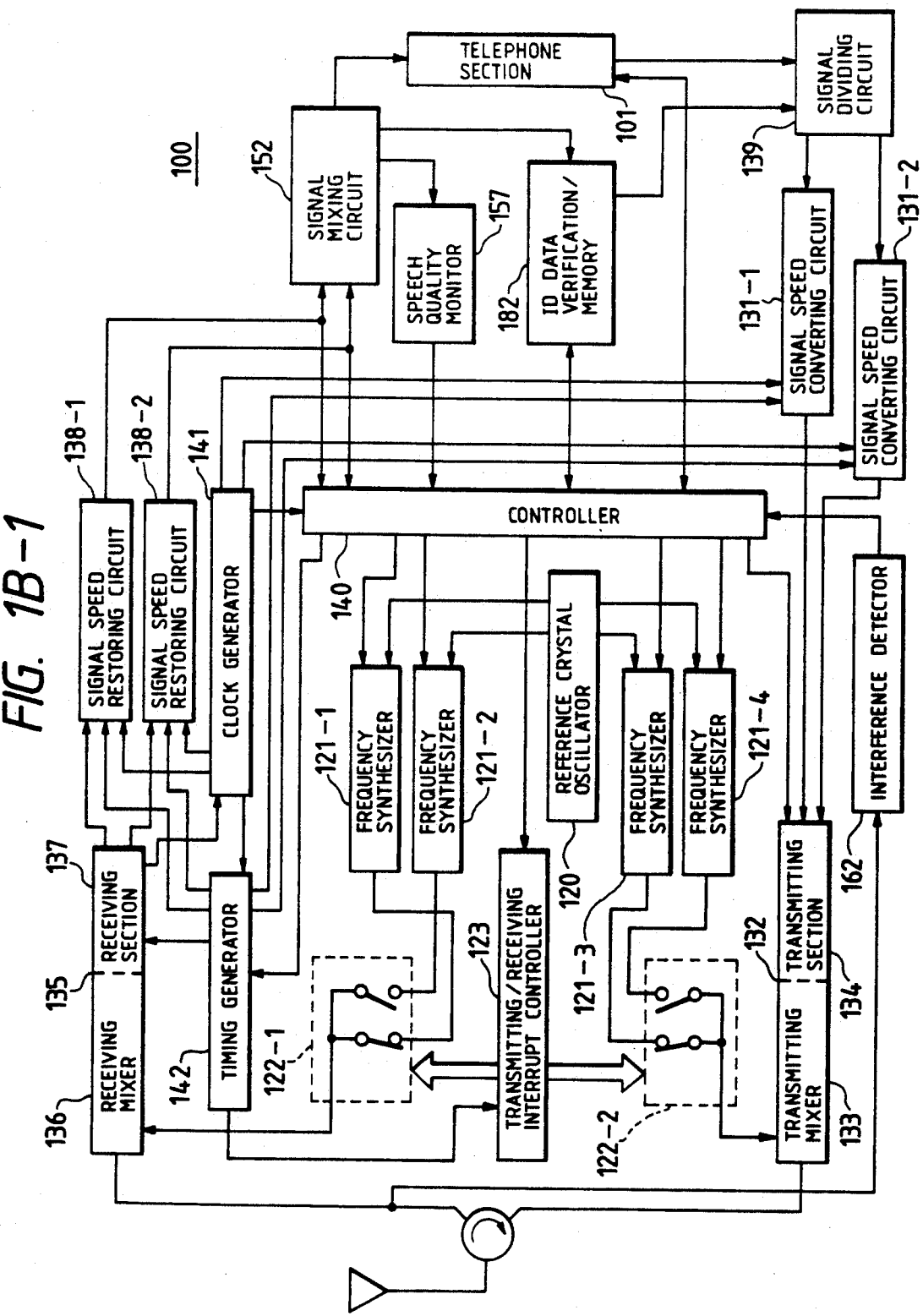

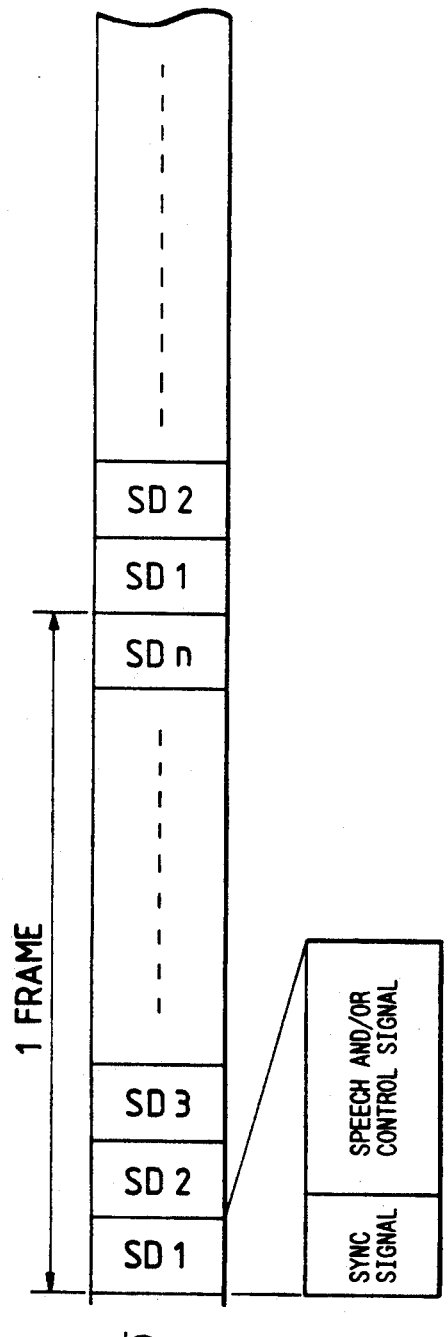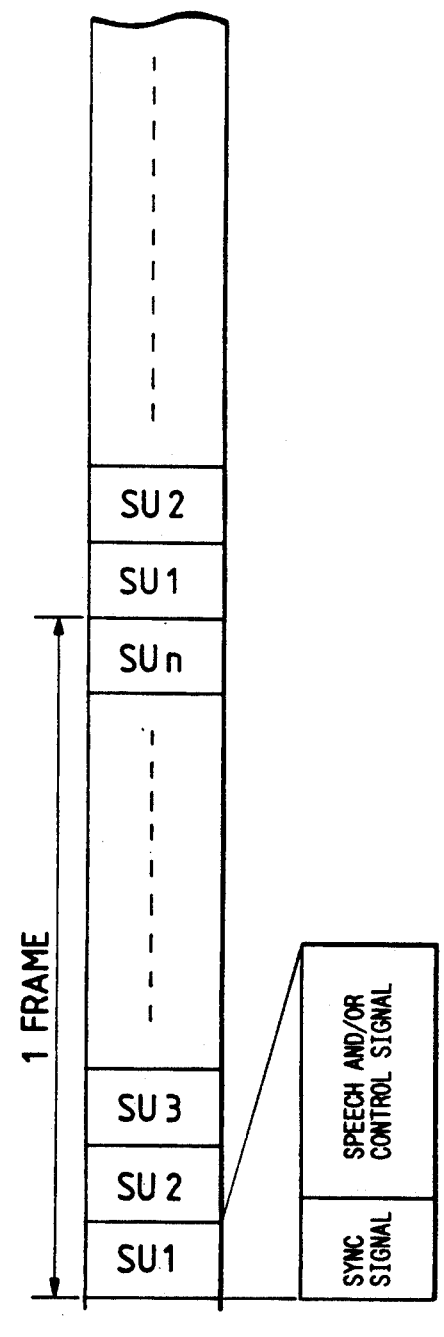
FIG. 2A(a)  FIG. 2A(b)

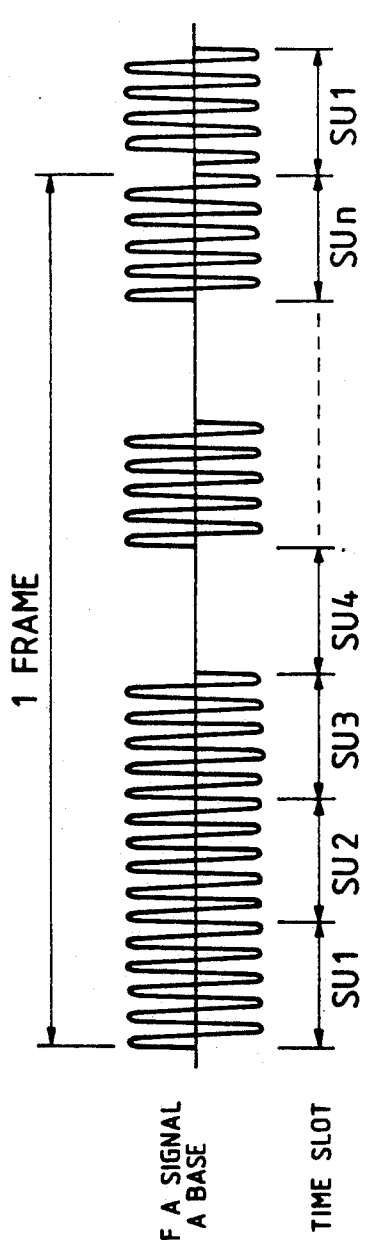
FIG. 2B(c) WAVEFORM OF A SIGNAL RECEIVED BY A BASE STATION 30
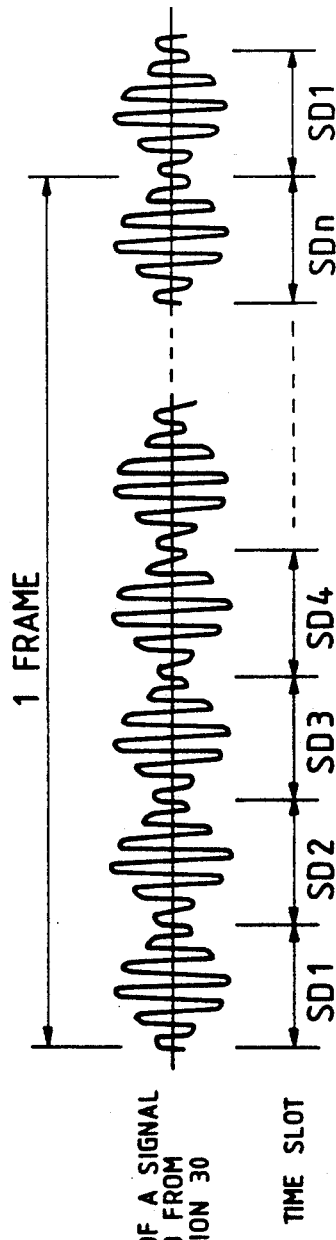
FIG. 2B(d) WAVEFORM OF A SIGNAL TRANSMITTED FROM A BASE STATION 30

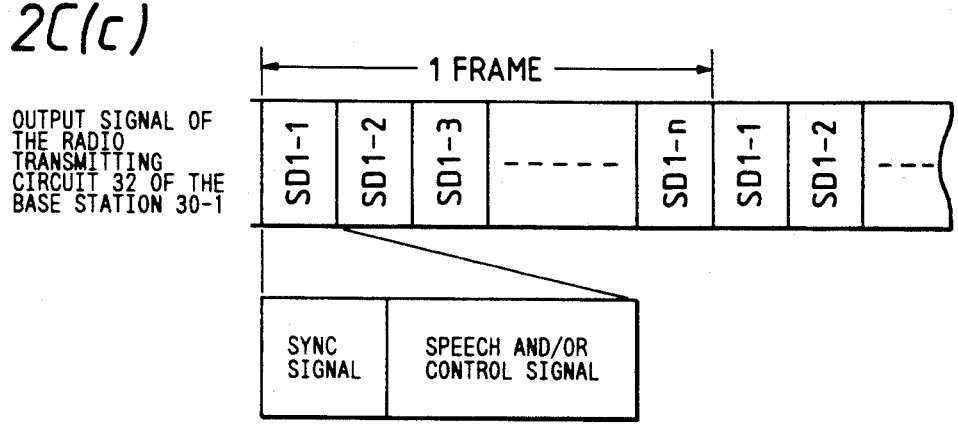
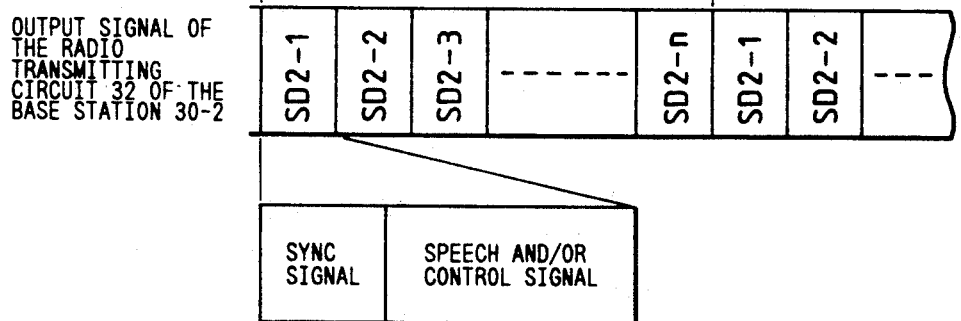
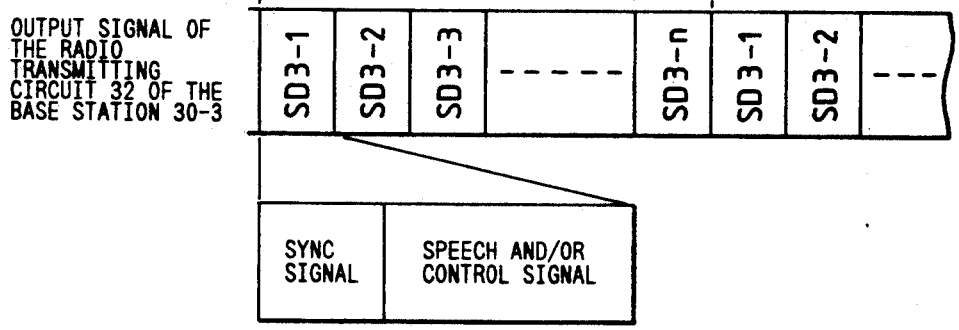

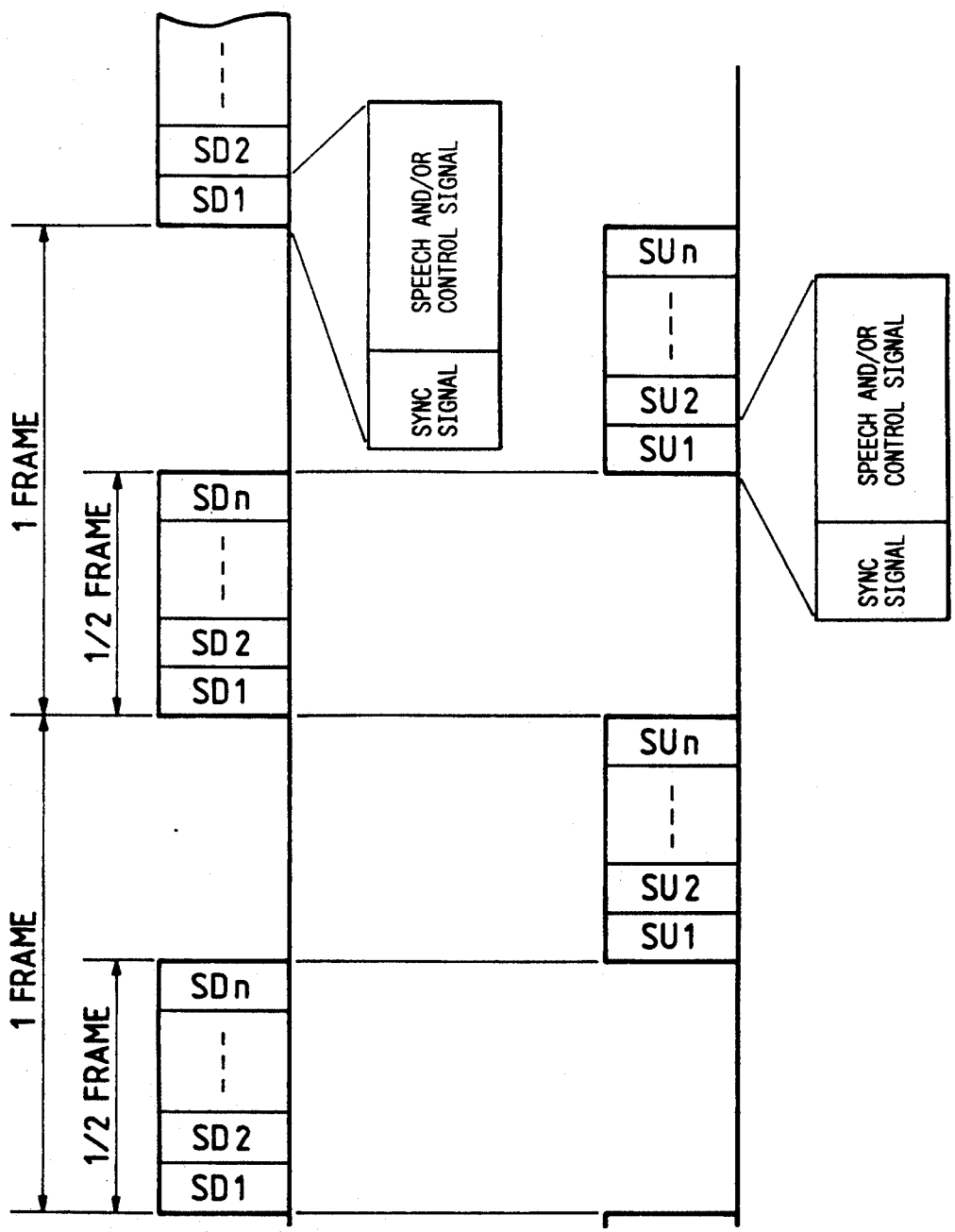

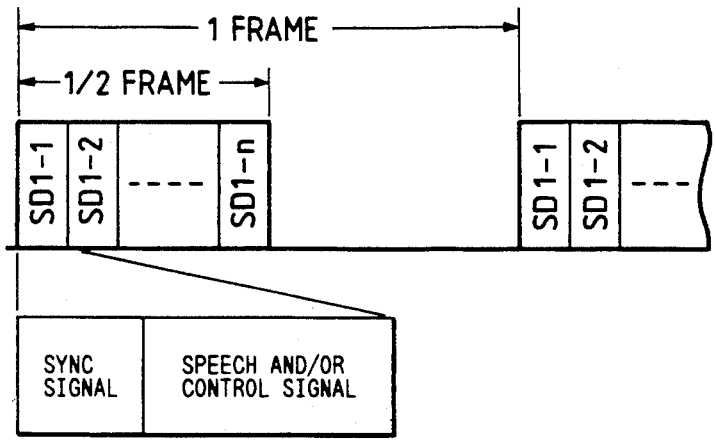
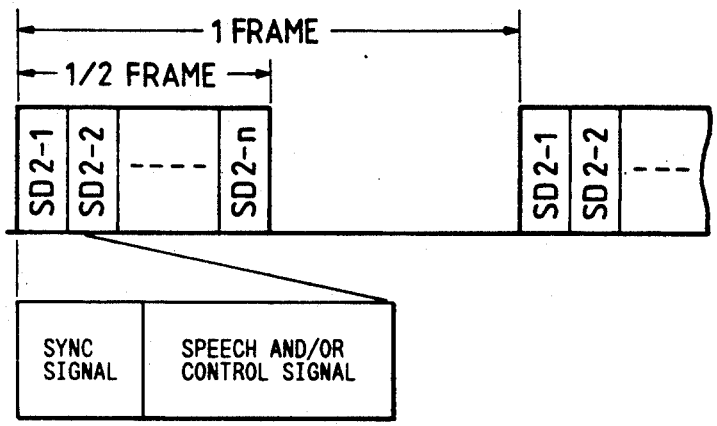
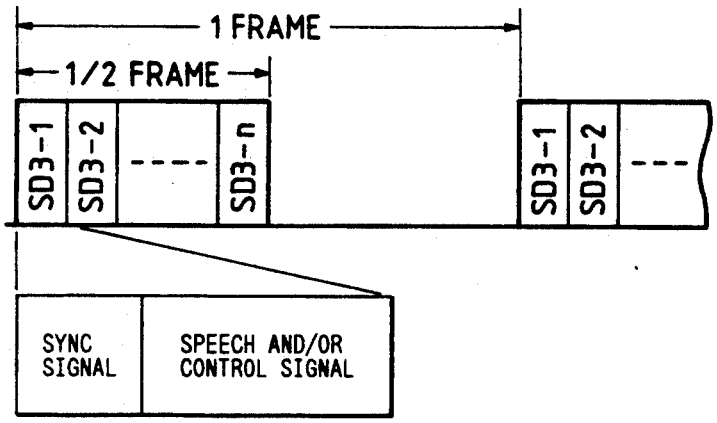

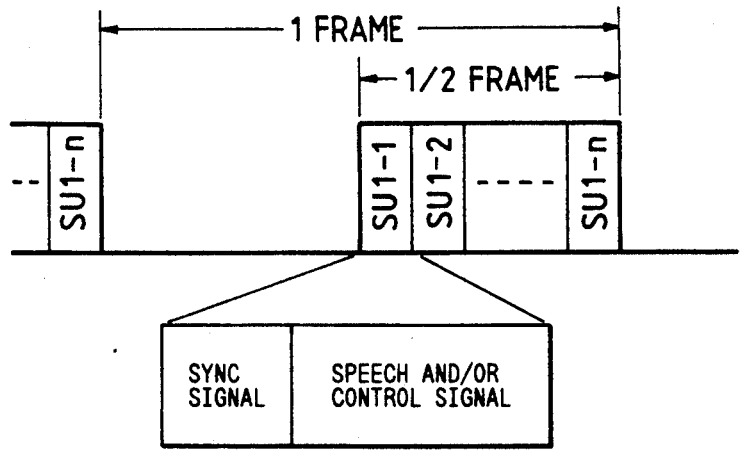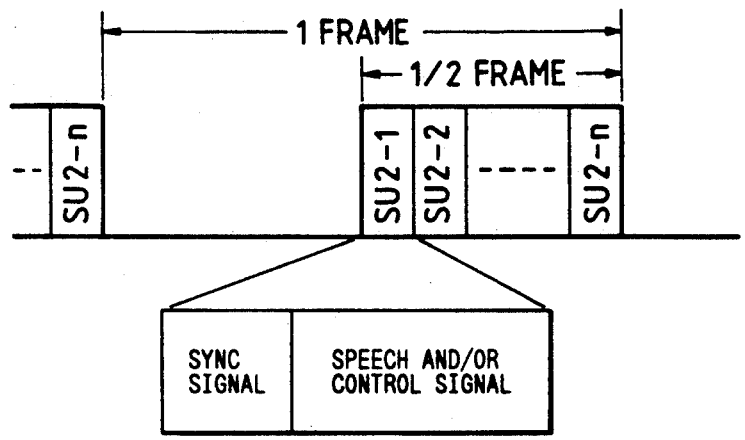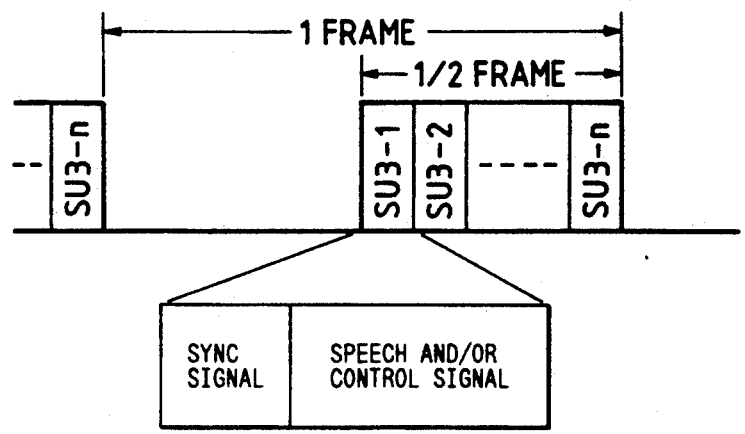

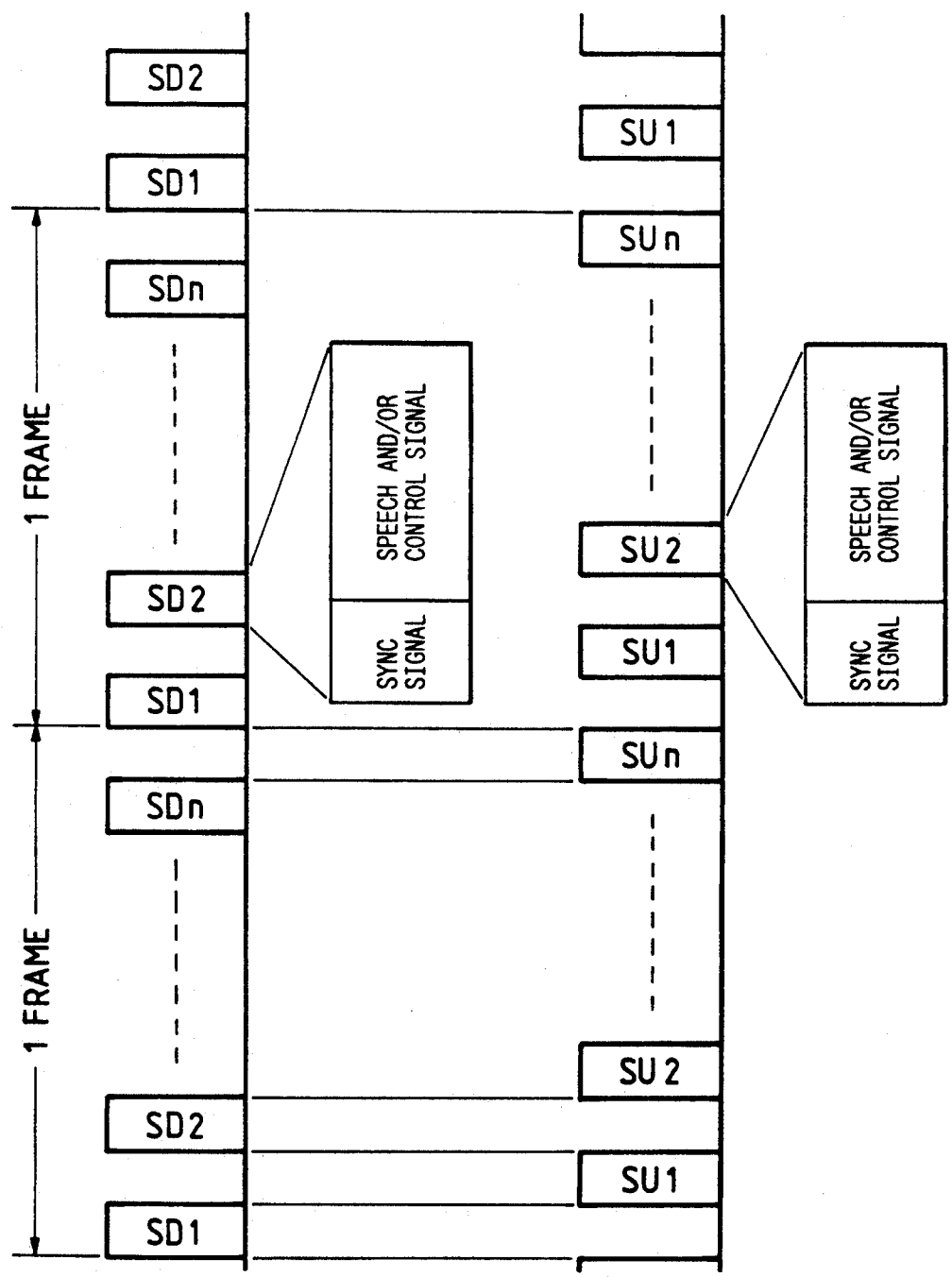

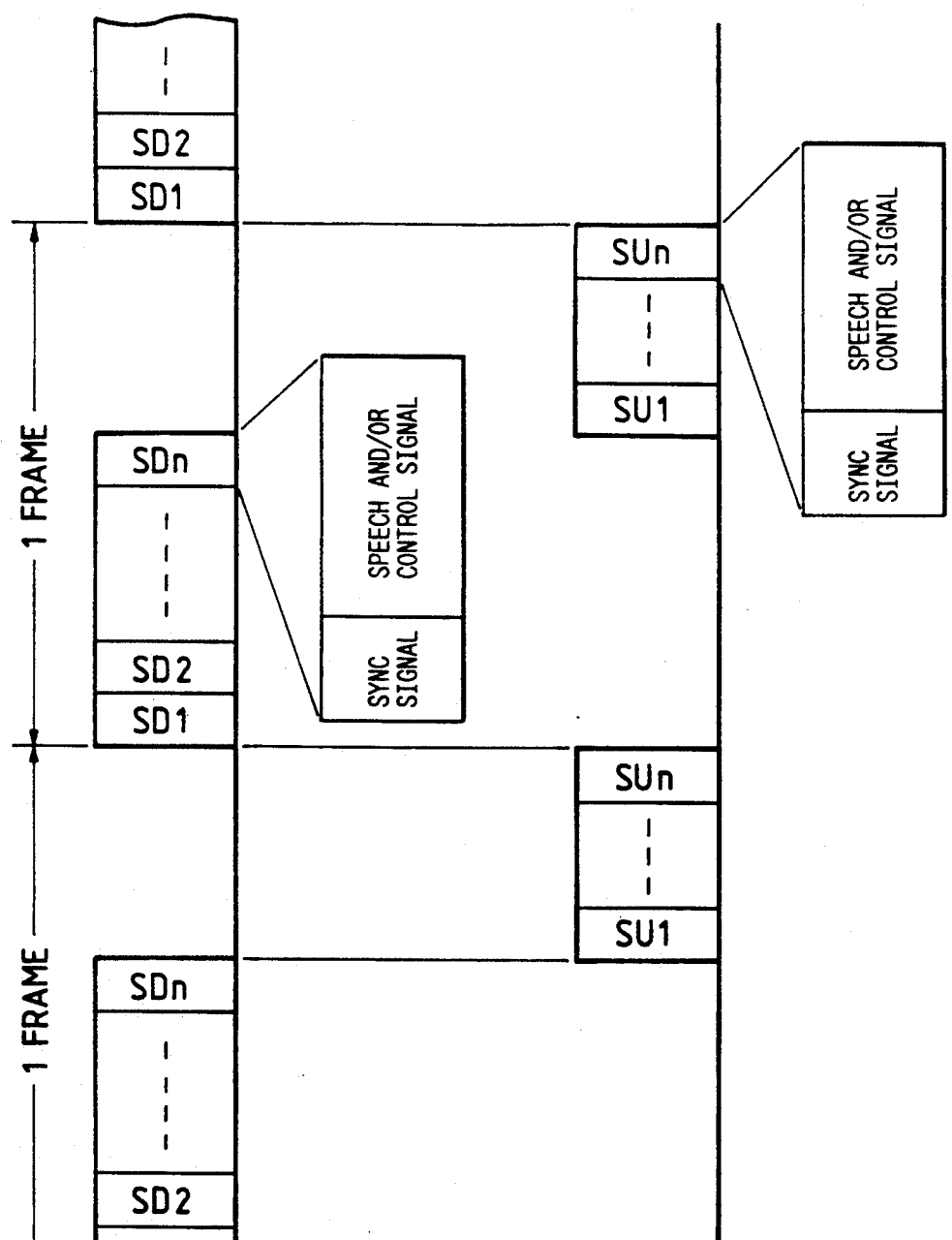
FIG. 2K(a) OUTPUT SIGNAL OF THE RADIO TRANSMITTING CIRCUIT 32
FIG. 2K(b) INPUT SIGNAL OF THE RADIO RECEIVING CIRCUIT 35

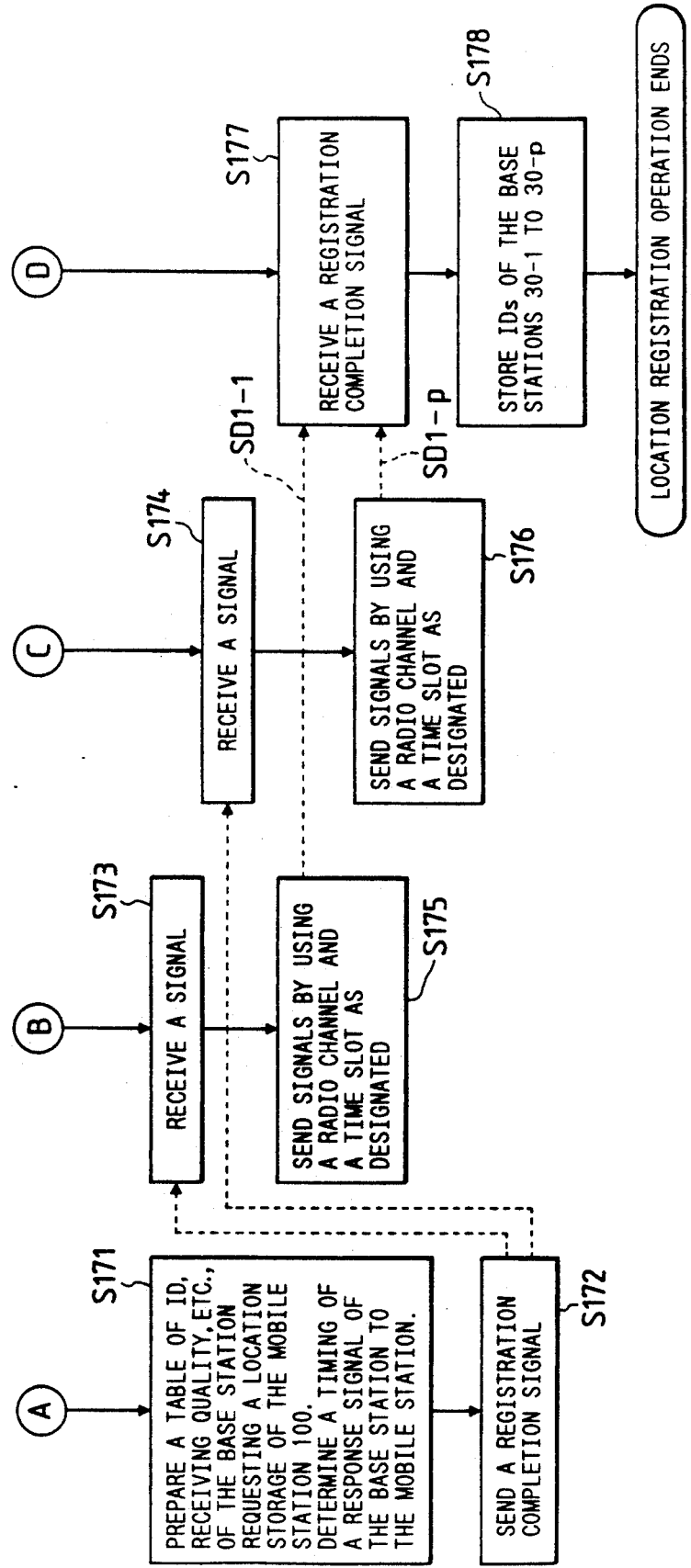

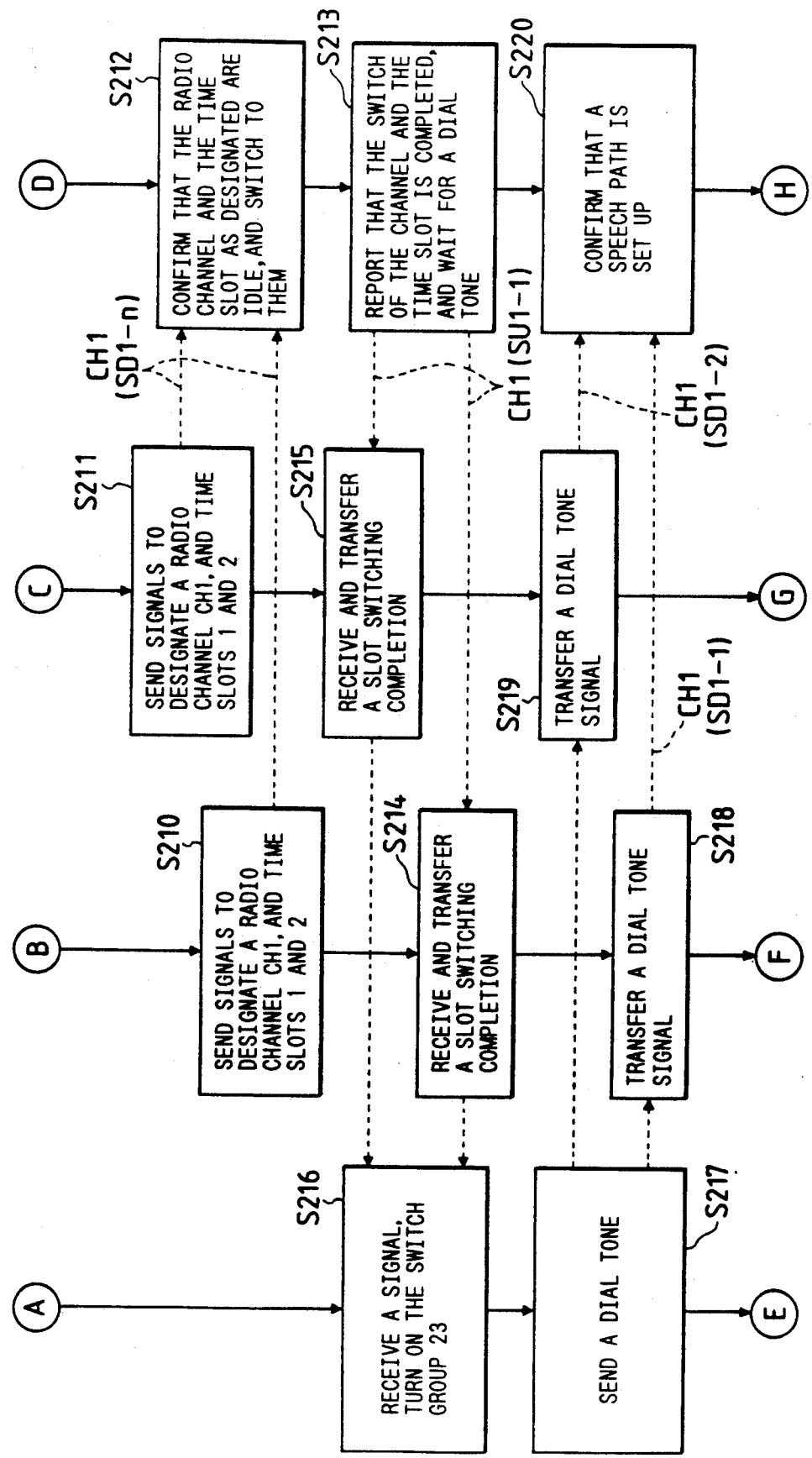

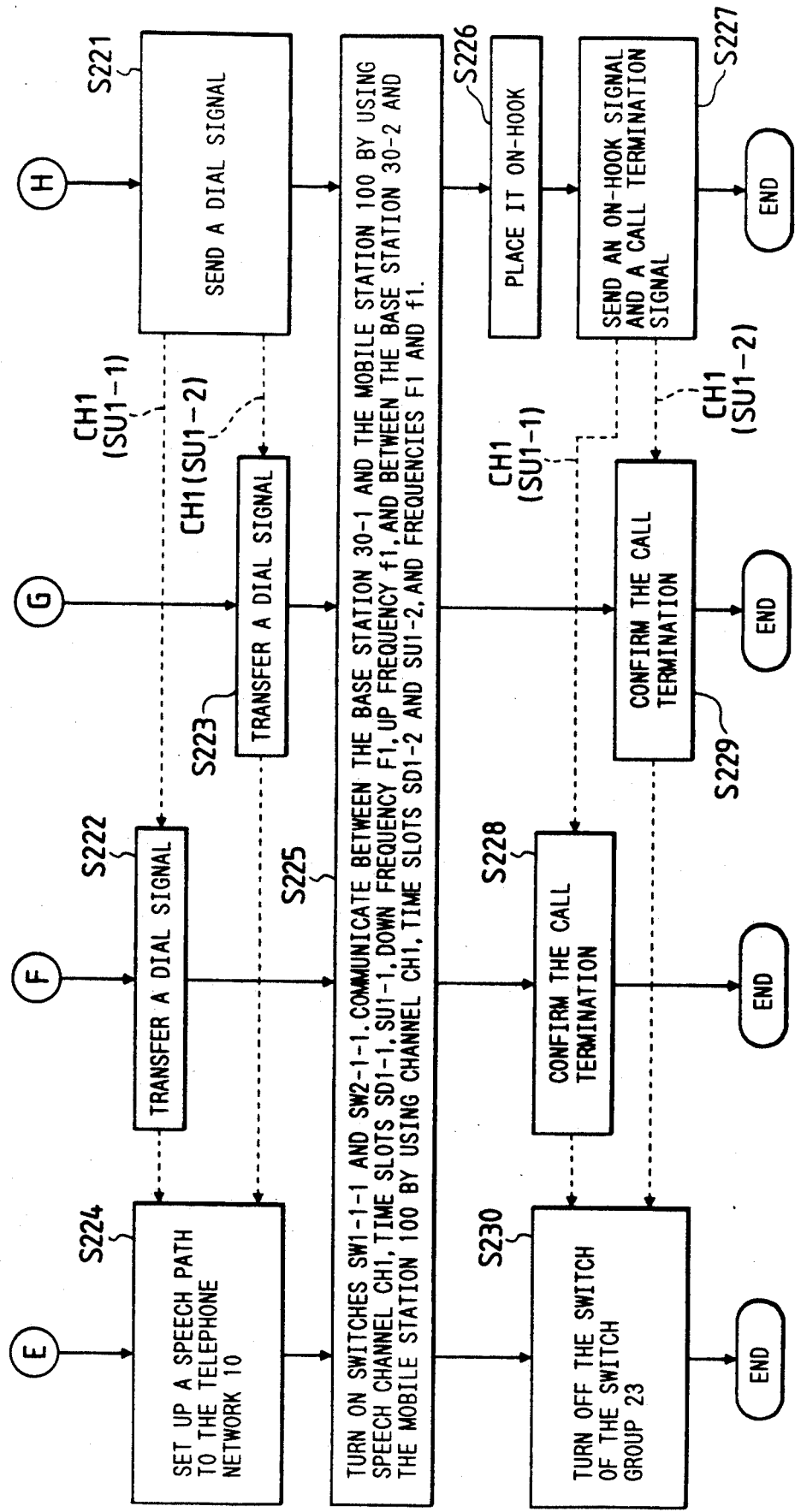

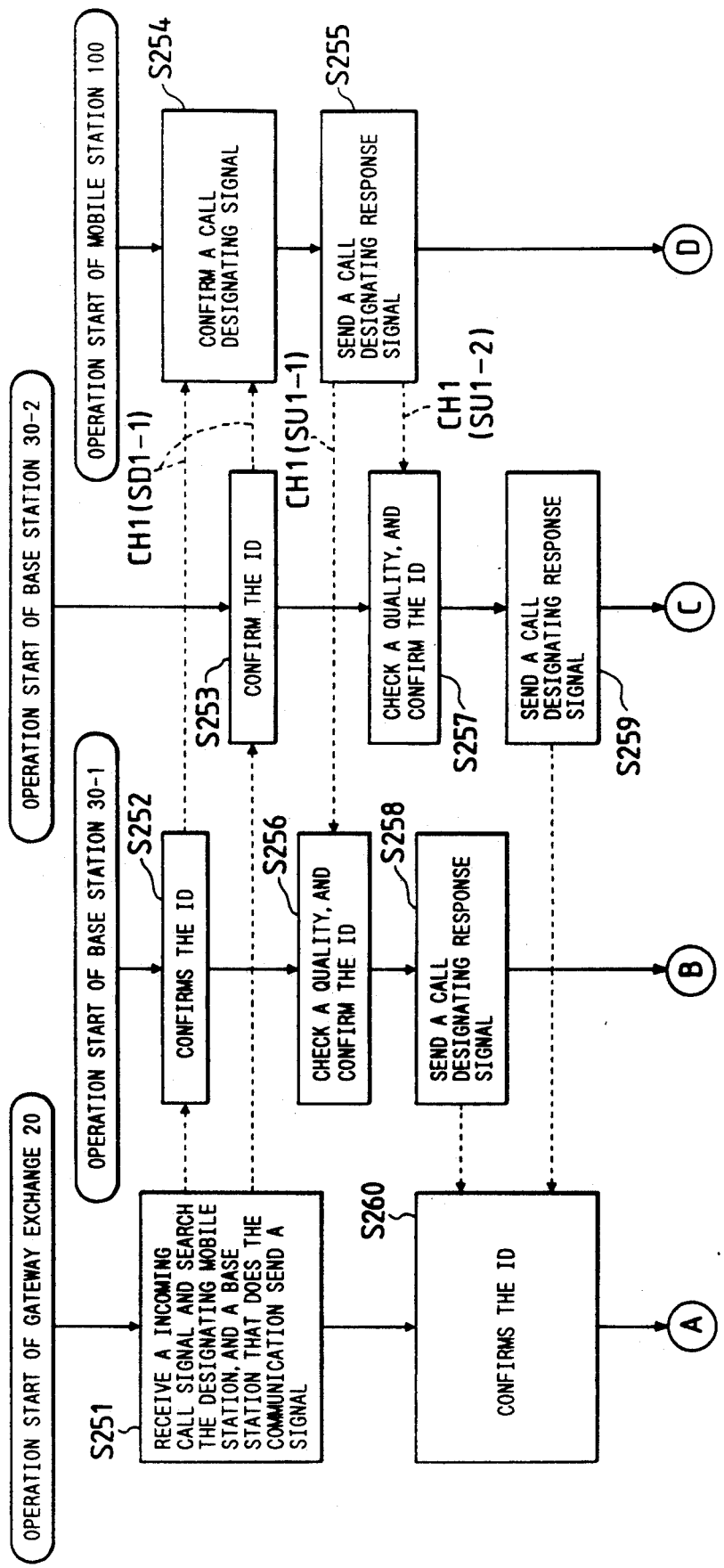

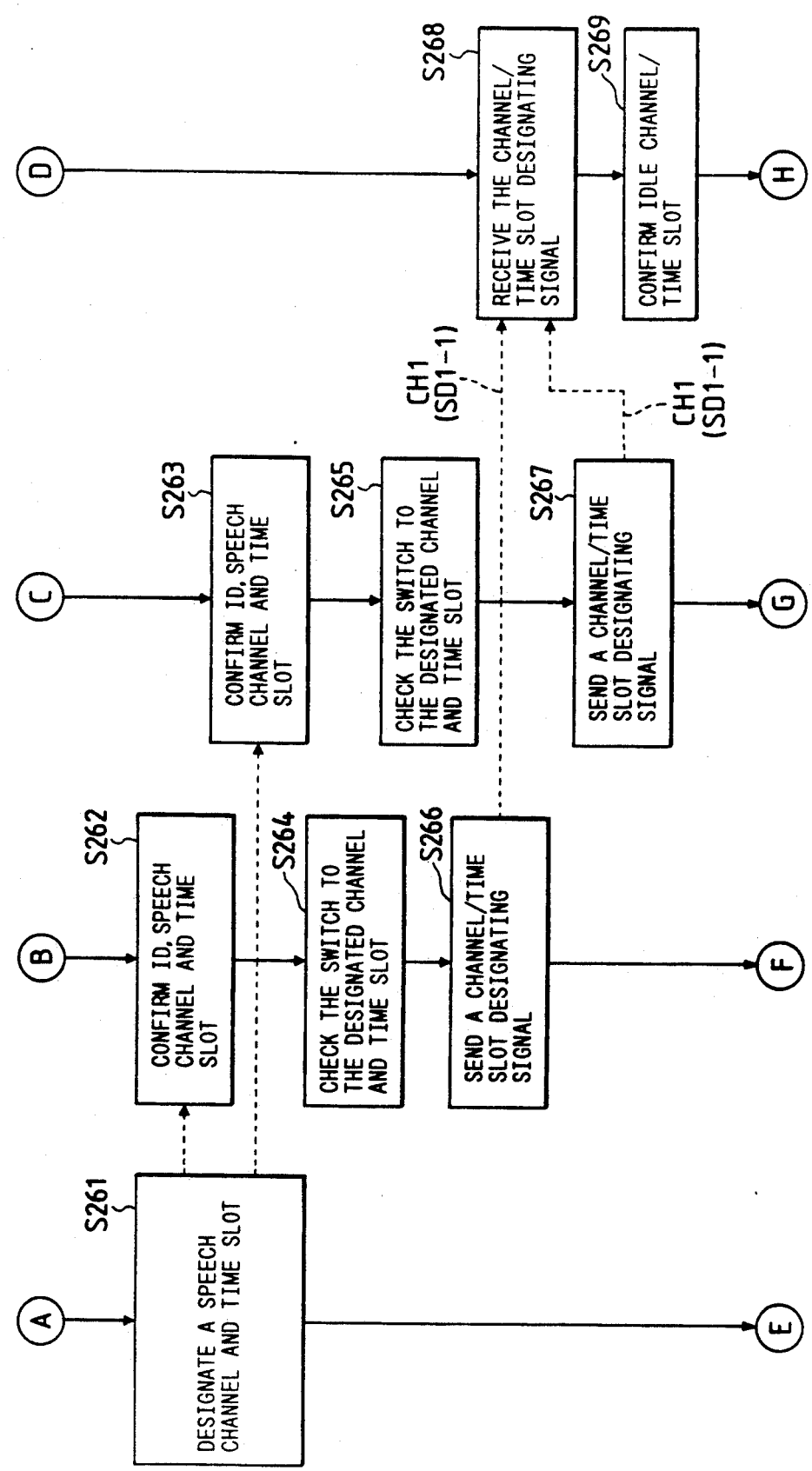

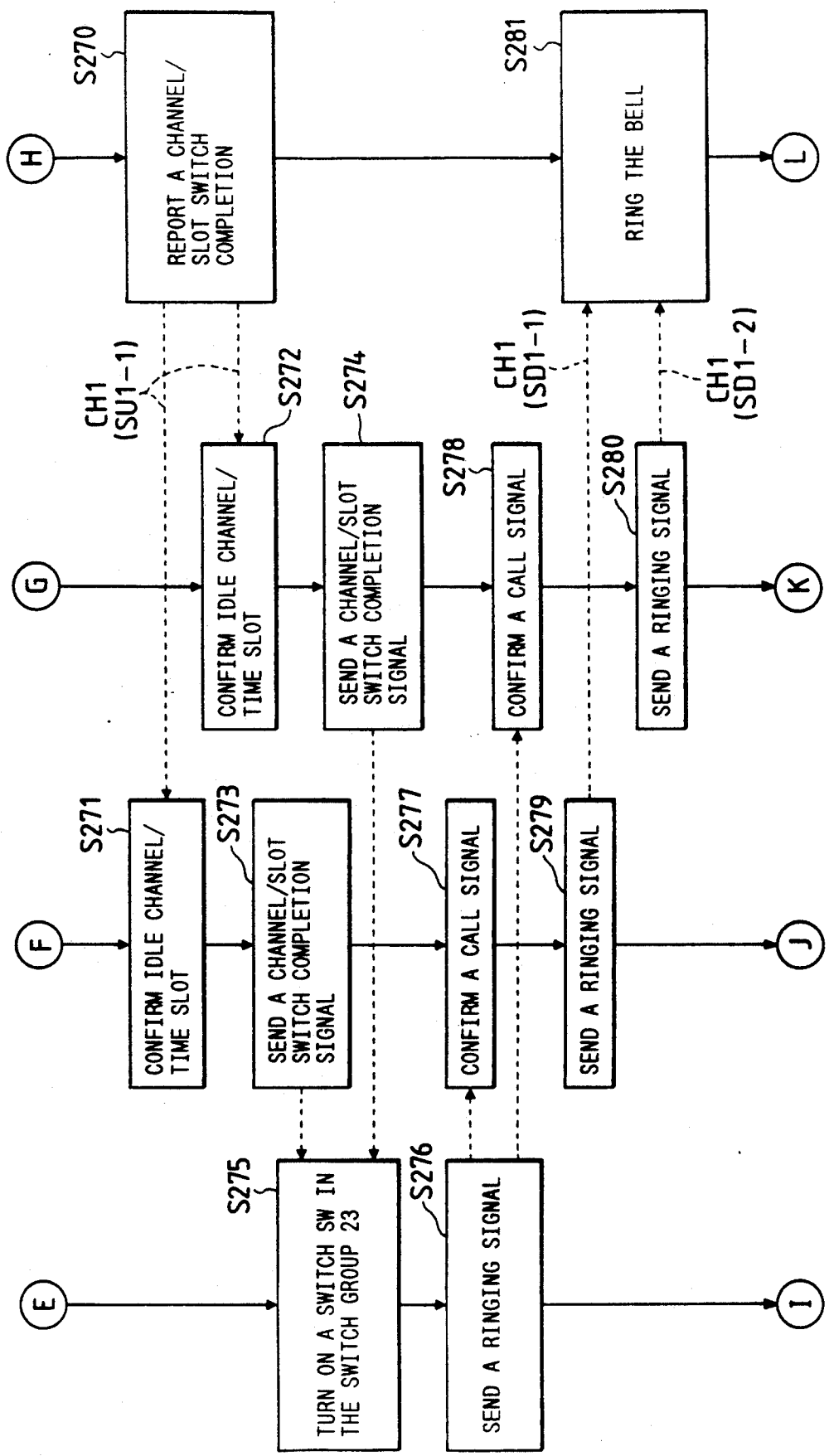

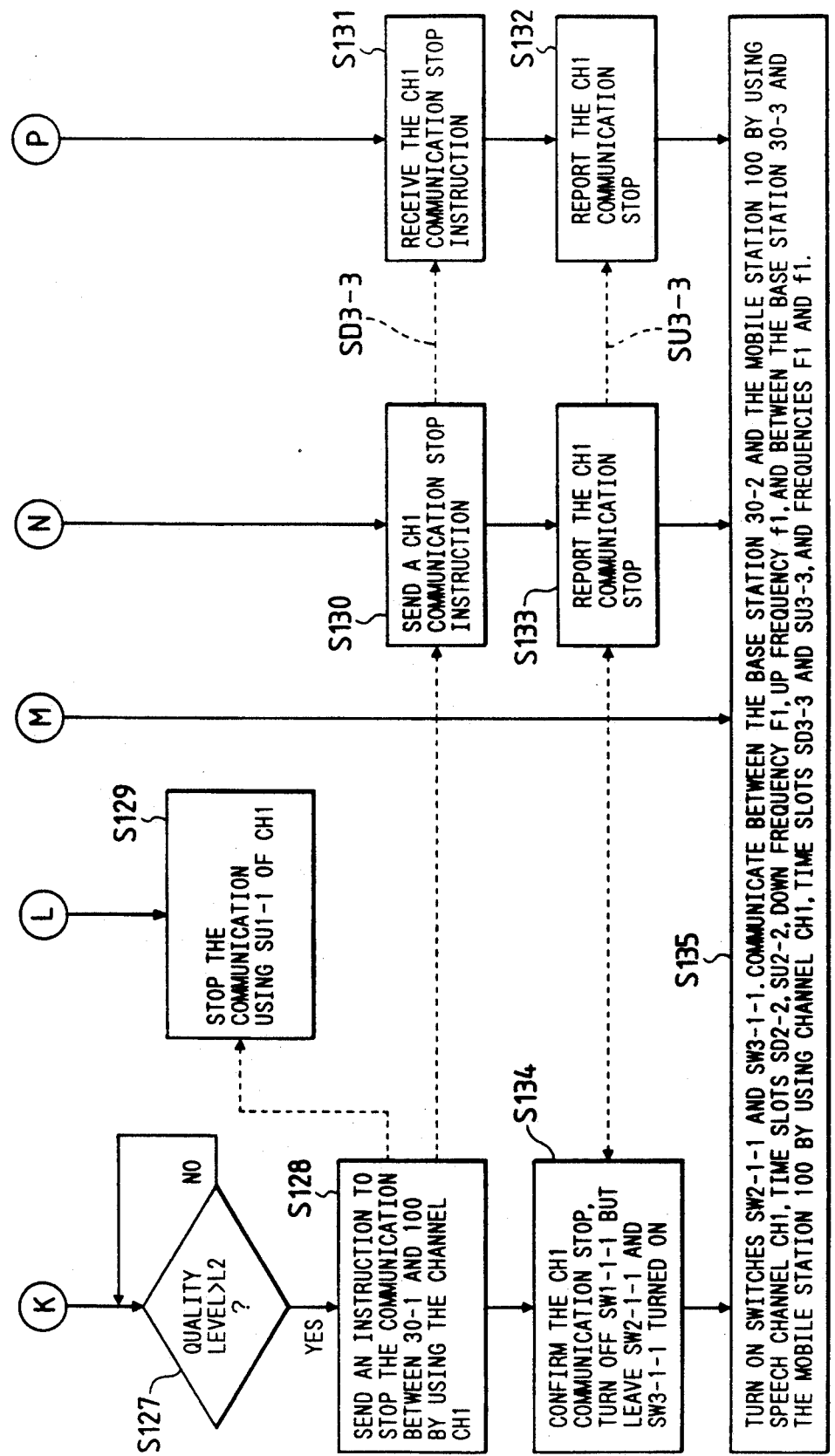

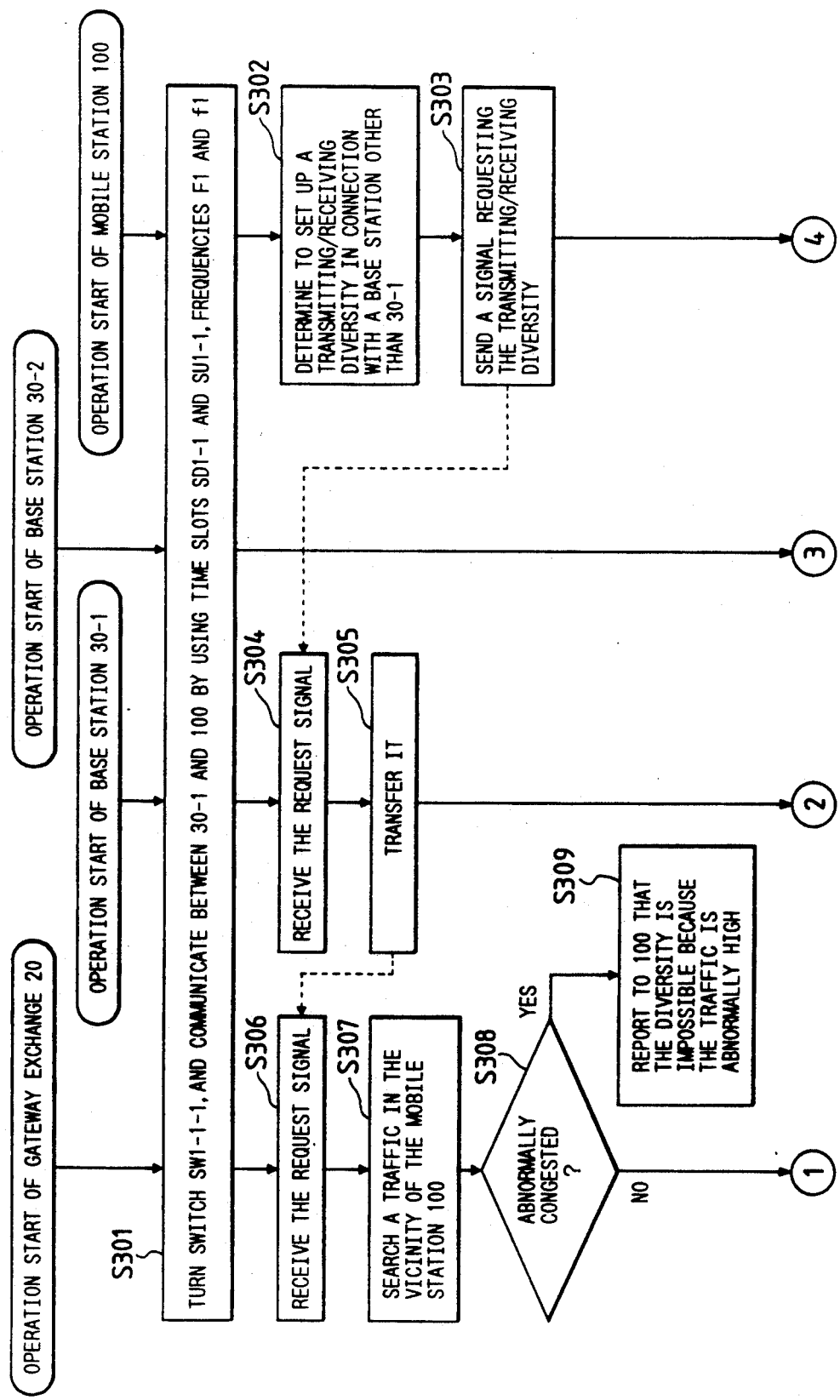

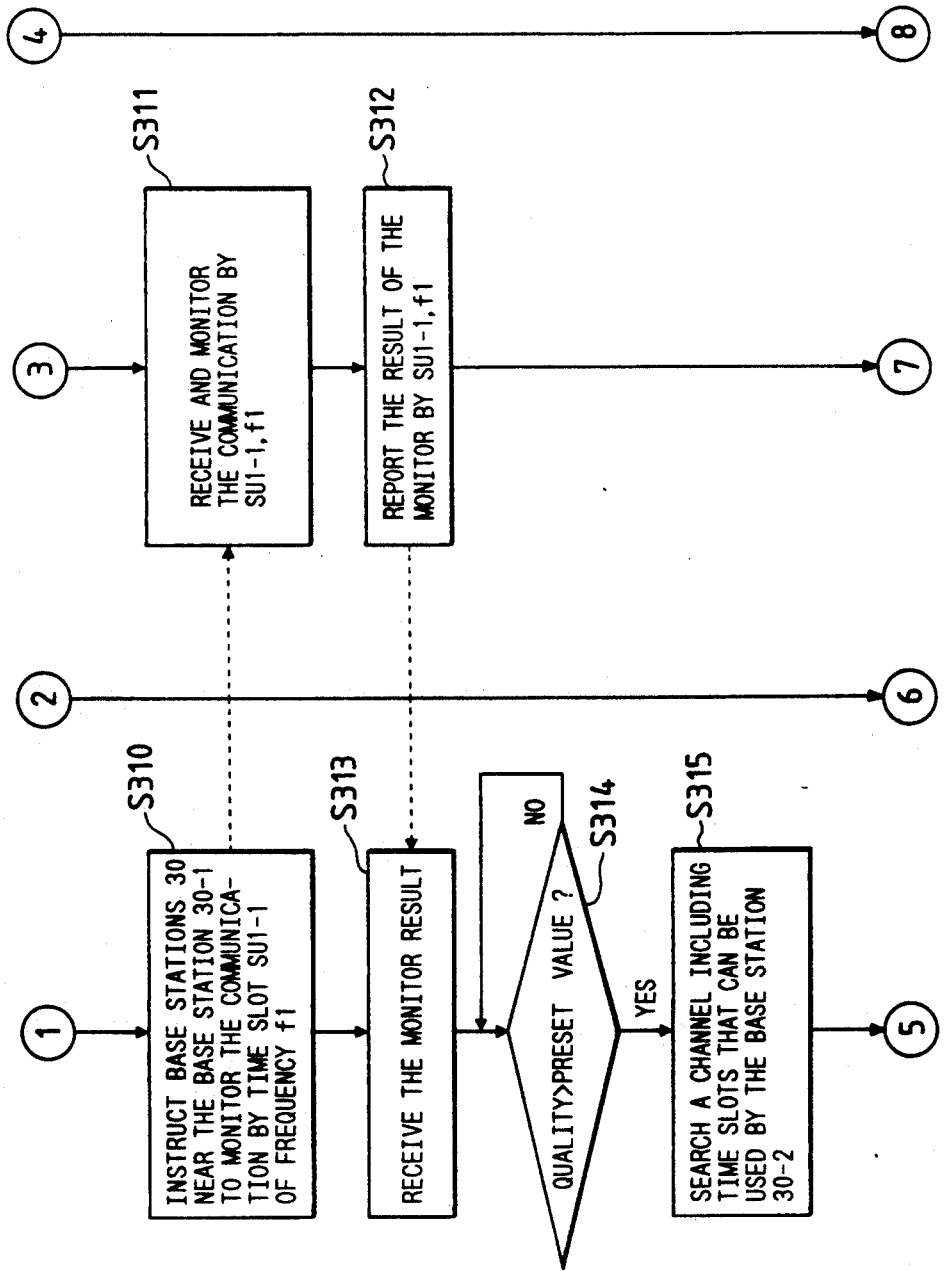

FIG. 9

| MODULATION | SPACE (FOR EACH PATH BETWEEN BASE STATION AND MOBILE STATION) | CHANNEL USED (FOR EACH FREQUENCY) | | TIME SLOT USED (FOR EACH TIME USED) | | SPACE USED (FOR EACH SPACE LOCATION OF AN ANTENNA USED) |
|---|---|---|---|---|---|---|
| | | SAME CHANNEL | DIFFERENT CHANNEL | SAME TIME SLOT | DIFFERENT TIME SLOT | |
| PRESENT INVENTION (PULSE COMMUNICATION) | PLURALITY OF BASE STATIONS | ○ | ○ | ○ | ○ | SATISFIED BY THE SPACE OF A SINGLE ANTENNA |
| | SAME STATION | × | ○ | × | ○ | MORE WIDE SPACE |
| CONVENTIONAL SYSTEM (ANGLE/AMPLITUDE MODULATION) | PLURALITY OF BASE STATIONS | ○ | ○ | — | — | SATISFIED BY THE SPACE OF A SINGLE ANTENNA |
| | SAME STATION | — | ○ | — | — | MORE WIDE SPACE |

DIVERSITY EFFECT IS:  ○ : GOOD
△ : SOMEWHAT GOOD
× : NONE
— : DIVERSITY IS IMPOSSIBLE

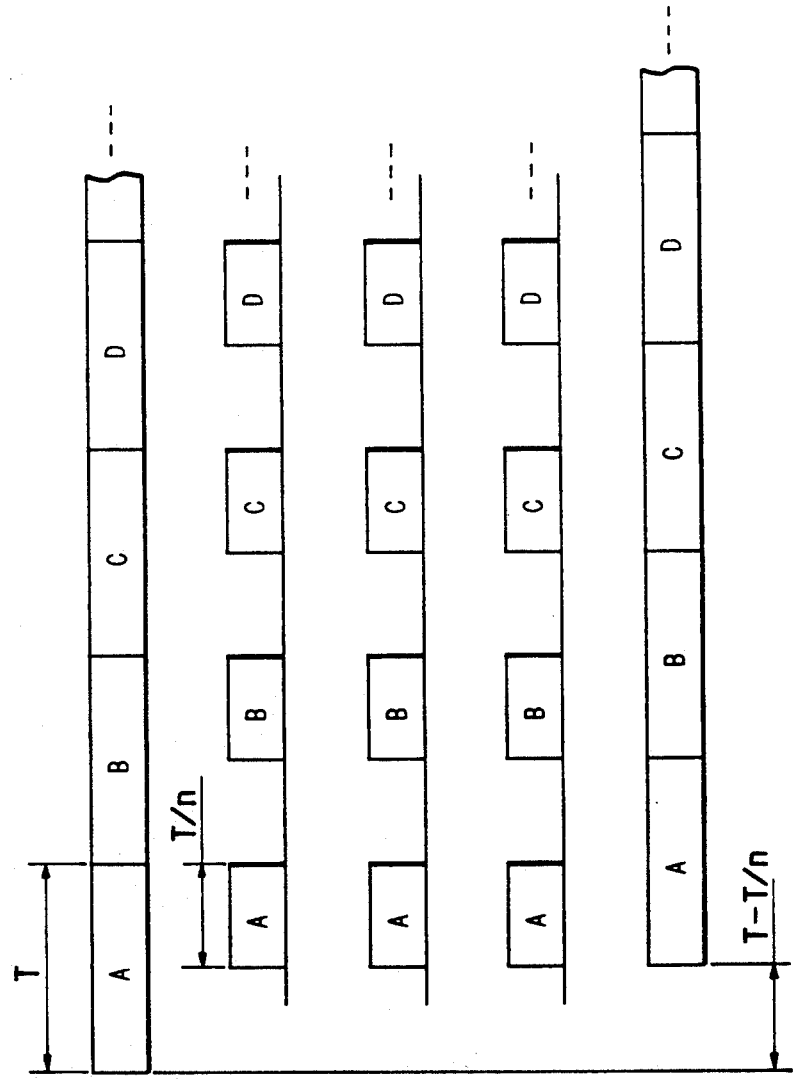

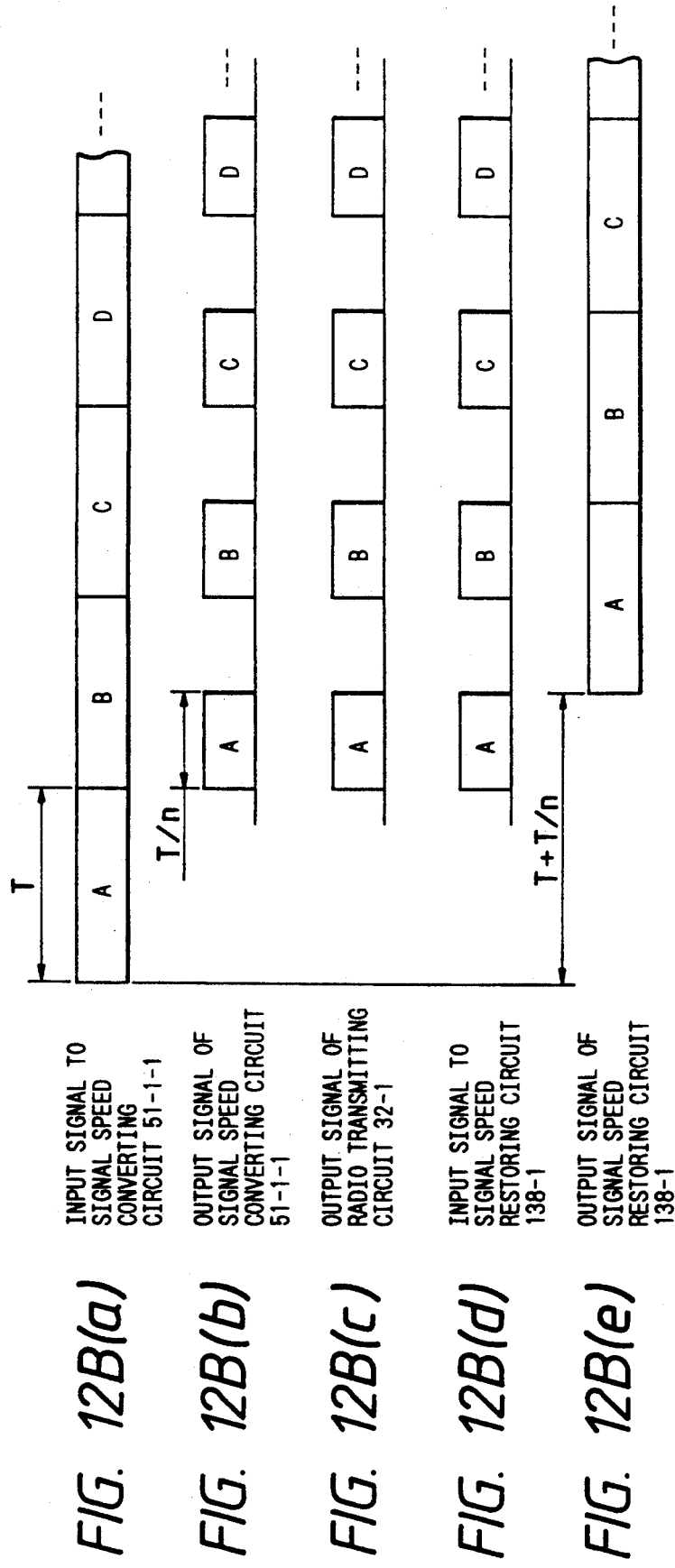

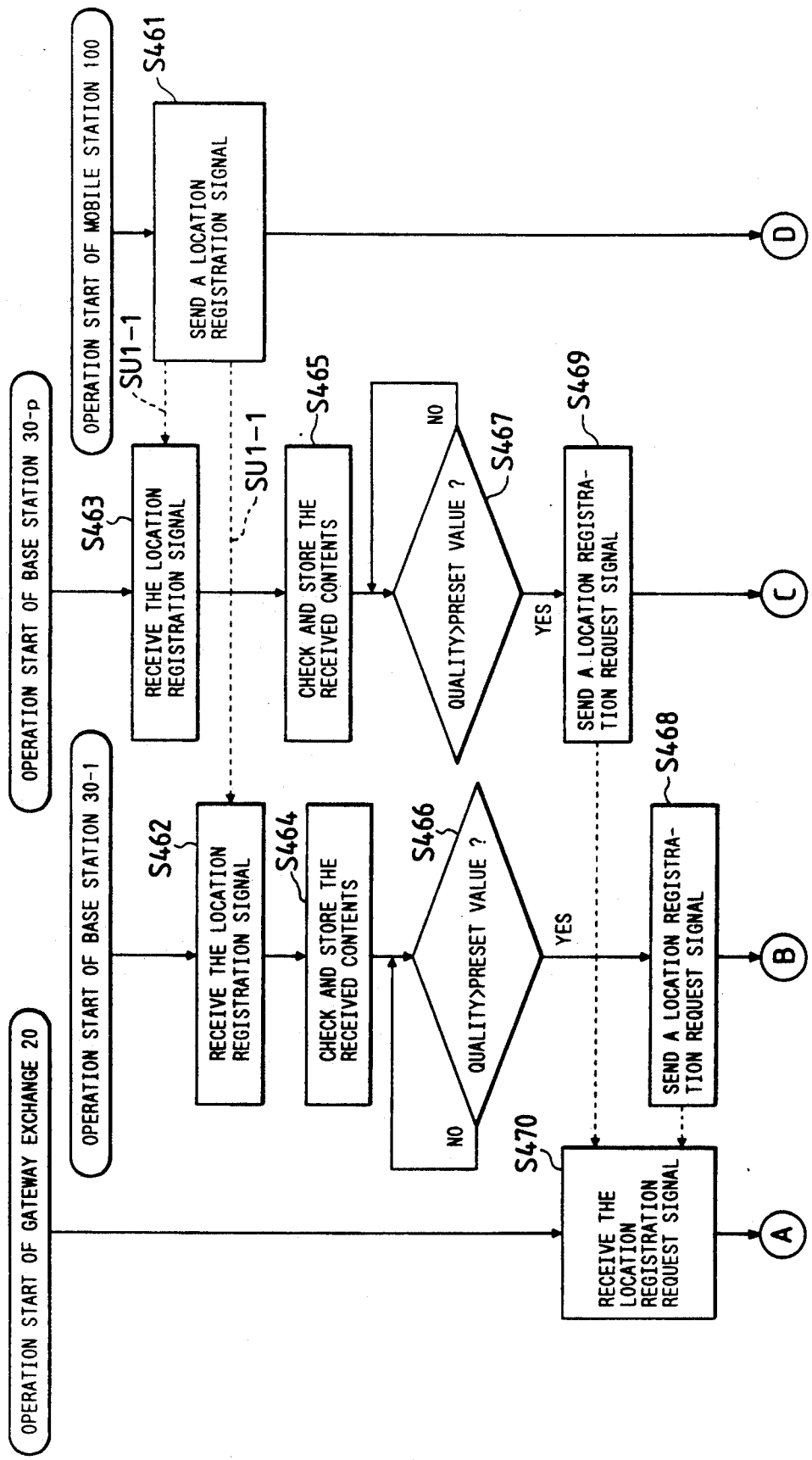

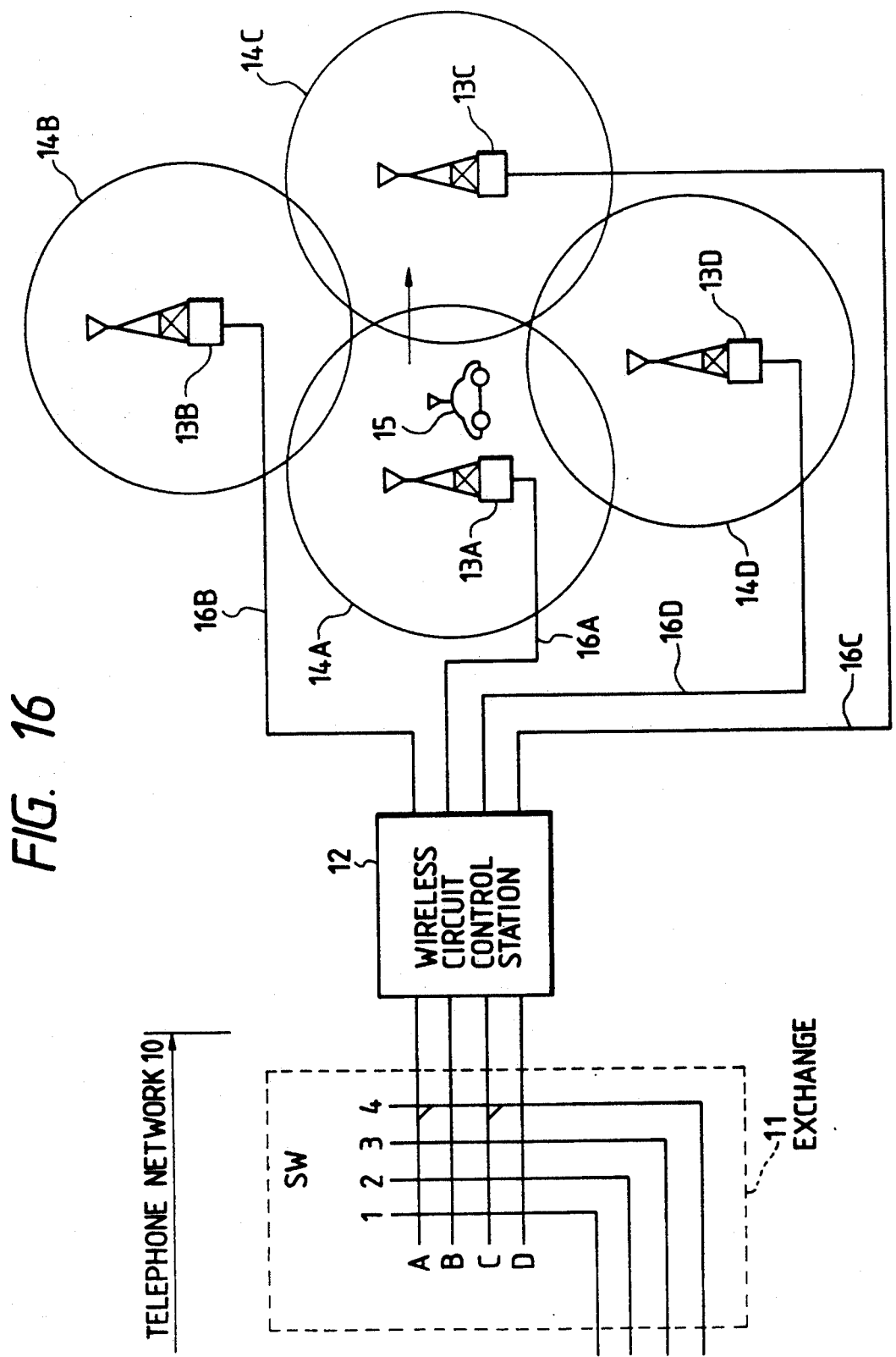

MOBILE COMMUNICATION SYSTEM

BACKGROUND OF THE INVENTION

1. Field of the Invention

The present invention relates to a time division communication system of radio communication channels in a mobile communication system. More particularly, the present invention relates to a time division communication system of radio communication channels in a mobile communication system in which one of many radio mobile stations within a service area, to which radio channels are allocated, set up wireless circuits connecting to radio base stations by using the allocated radio channels, and when the first mobile stations are communicating with the base stations through the wireless circuits, another mobile station requests a communication with the base station currently engaging the communication with the first mobile station, by using the same radio channel as the first radio channel, a wireless circuit can be set up between the second mobile station and the base station in a transmitting/receiving diversity communication mode by the same radio channel or another radio channel, without any adverse effect on the now progressing communication between the first mobile station and the base stations.

2. Description of Prior Art

A conventional mobile communication system has been employed in a land mobile telephone system commercially serviced by NTT (Nihon Telephone and Telegram Co., Ltd). The telephone system will be described with reference to FIG. 16. A plurality of radio channels are allocated to a radio base station 13, in order that it communicates with a number of mobile stations 15 carried on vehicles, which roam in a zone 14 as a service area. Each mobile station 15 has a function to select one of the radio channels (this function is called a multi-access). When the mobile station 15 desires to communicate with the base station 13, the station 15 sends a control signal to a wireless circuit control station 12 by way of the base station 13. The control station 12 determines radio channels used by many base stations 13. In response to an instruction from the control station, the mobile station 15 determines a speech channel number to be used for communication, and communicates with a subscriber in a public telephone network 10, through an exchange 11 including switches SW.

In the field of wireless communication, a transmitting/receiving diversity technique is frequently used. Many diversity techniques have been known. In a frequency diversity, at a transmitting point, a plurality of transmitters simultaneously transmit the same signal at different frequencies. At a remote receiving point, a plurality of receivers, tuned to the transmitting frequencies, receives the transmitted signals, detect them, and adds together the detected signals. In a transmission space diversity, at a transmitting point, an output signal of a transmitter is divided coupled with a plurality of antennae disposed at different locations. These divided signals are transmitted from the antennae. At a distant remote receiving point, the transmitted signals are received by a single antenna, led to a receiver, and detected in the receiver. In a receiving diversity, at a transmitting point, an output signal of a transmitter is led to a single antenna, and is transmitted by the antenna. At a remote receiving point, the signal is received by a plurality of antennae disposed at different locations, and led to a receiver. After the received signals are passed through a high (intermediate) frequency stage or a detect stage, the received signals are added together.

In the transmitting/receiving diversity, amplitude modulation or angular modulation is used for modulating a signal.

A communication system of the type in which the base station and the mobile station use the same transmitting frequency, that is, the same radio frequency is used as a transmitting/receiving frequency, is also used in the digital mobile communication system.

In the communication system, if the number of radio channels for speech as assigned to a base station is 10, those radio channels can be allocated to communication requests by 10 number of mobile stations within a service area. The communications of the base station and the mobile stations can be done, while being free from radio interference. For an 11th call originating request generated by a mobile station, the base station cannot originate a call (call loss) because there is no radio channel assigned to the mobile station. The above description of problem relates to the case where the radio channel is used for transmitting an analog signal. The same problem is involved in the communication system using a voice signal subjected to digital modulation process, and the system of the single channel per carrier (SCPC) type in which a telephone (communication) signal is transferred by a single carrier wave.

Further, in the system using only assigned radio channels, the band width of the signal is fixed. Accordingly, it is impossible to transmit a signal whose band width is broader than that of the assigned channel.

SUMMARY OF THE INVENTION

Accordingly, an object of the present invention is to provide a mobile communication system in which a plurality of radio mobile stations can more flexibly communicate with at least one radio base station by using an increased number of communication paths, while successfully solving the problem that a maximum number of communications is limited to the number of radio channels assigned to the base station, and the problem of limiting the frequency band of the transmission signal to within the frequency band of the assigned radio channel.

To achieve the above object, there is provided a mobile communication system comprising:

a plurality of radio base stations each with a radio transmitter;

at least one mobile station engaging a communication while moving service areas covered by the plurality of radio base stations, the mobile station including a radio receiving circuit with a receiving mixer, a radio transmitting circuit with a transmitting mixer, switch receiving means including frequency synthesizers being capable of selectively receiving signals of two channels by applying two frequencies to the receiving mixer of the radio receiving circuit, switch transmitting means including synthesizers being capable of selectively transmitting signals of two channels by applying two frequencies to the transmitting mixer of the radio transmitting circuit, the mobile station in which, a transmitting signal (base band signal) is segmented at predetermined time intervals and those segmented signals are stored into a memory circuit, the stored signals are read out of the memory circuit through predetermined time slots and at a high speed that is "n" times higher than when those signals are stored, a carrier wave is angle modulated or amplitude modulated by the signal contained in the time slot. a radio receiving circuit with a receiving mixer, and a radio transmitting circuit with a transmitting mixer, the radio receiving and transmitting circuits forming a pair of communication parties, which are contained in the mobile station and the base station for the transmission and reception which are interruptive with respect to time, a switch circuit is provided for a synthesizer to apply a signal to the receiving mixer of the radio receiving circuit and another synthesizer to apply a signal to the transmitting mixer of the radio transmitting circuit, a method is employed in which the output signals of the synthesizers are interrupted, the interrupting operations of the output signals in the transmitting circuit side are synchronized with those in the receiving circuit side, and the interruptive transmission and reception in the base station is synchronized with those in the mobile station as a counter part of the paired communication parties, in the receiving side, in order to pick up only the signal contained in the predetermined time slot, transmitted signals are received by opening and closing the radio receiving circuit, and are demodulated and stored into the memory circuit, and the signal are read out of the memory at a low speed that is 1/n times slower than when the signals are stored, in the base station, speech path control means for setting up a speech path between the base station and a predetermined mobile station by using a predetermined time slot, is provided; and a gateway exchange for connecting the base stations and a public telephone network, which enables the base band signal as the original signal as transmitted to be reproduced in the base stations and the mobile stations.

With such an arrangement, even when the radio channels assigned to the system are all used, if an idle time slot being not yet used is present in the time slots arrayed in time division manner in each radio channel, the base station can originate a call for a mobile station which additionally requests the base station to originate a call. Also for a mobile station which is present in a radio zone adjacent to the radio zone in which the base station is located and now engages the communication with the base station, the base station can continue the communication. Further, a mobile station, which now engages the communication with one base station, can communicate with another radio base station located near the mobile station in a diversity mode. When the transmission of a broad band signal is requested, such a signal can be transmitted by using a necessary number of time slots if idle time slots are present. By allocating time slots of one channel that can be used, to a plurality of base stations, one channel can be used commonly by the plurality of base stations. Thus, in the mobile communication system according to the present invention, the frequency utilization efficiency is remarkably improved.

In a mobile communication system including a base station and a number of mobile stations present in a service area of the base station, to enable an appropriate number of mobile stations to communicate with the base station, one radio channel is segmented into a series of time slots in a time divisional manner. One of the time slots is selected for communication. In a situation that when one mobile station is communicating with a base station, another mobile station sends a communication request signal to the base station. In such a situation, an idle time slot of those time slots of the radio channel being currently used is allotted to the mobile station requesting a communication anew. By using the idle time slot, the new mobile station can communicate with the base station. Accordingly, a plurality of communications can concurrently be carried out without any radio interference among them and within each communication.

For example, when a base station is transmitting a signal by using a given time slot, a mobile station exclusively receives a signal as transmitted by using the time slot. Alternately, when the mobile station sends a signal by using a given time slot, the base station exclusively receives the signal as transmitted from the mobile station by the time slot. Thus, a single radio channel can be used for both the transmission and the reception.

When one base station is communicating with a mobile station by using one time slot in a channel (one time slot of an old channel), it communicates with another base station, which satisfies a preset communication quality, by using one time slot of the same channel or another channel (one time slot of a new channel), thereby to maintain and improve a communication quality. For a terminal device using a broad band signal, a plurality of time slots are used for transmitting the broad band signal. A communication service by the mobile communication system is improved, accordingly.

Different time slots of one radio channel are assigned to base stations adjacent to each other. Accordingly, the same radio channel can be used for the adjacent base stations without any radio interference. Accordingly, the utilization of radio channels is remarkably improved.

In a communication system (which is called a Ping-Pong transmission, and used in a conventional digital communication system) of the type in which the base station and the mobile station use the same transmission frequency, but different transmission timings, when the transmission speed becomes high, e.g., approximately 200 kbps, an average error bit rate is remarkably increased due to the multipath propagation wave. In the present invention, the increasing of the error bit rate is alleviated. Accordingly, a mobile communication system with high performance can be realized.

Other objects, advantages and features of the present invention will be apparent from the following description in connection with the accompanying drawings.

BRIEF DESCRIPTION OF THE DRAWINGS

FIG. 1B-1 shows a circuit arrangement of a mobile station used in the mobile communication system according to the present invention;

FIG. 1B-2 shows a circuit arrangement of a radio receiving circuit in FIG. 1B-1;

FIG. 2A shows a time slot structure useful in explaining time slots used in the mobile communication system according to the present invention;

FIG. 2B shows waveforms of transmission and receiving signals of a base station, which contain time slots;

FIGS. 2C and 2D show time slot structures useful in explaining a channel switching operation;

FIGS. 2F through 2K show time slot arrangements useful in explaining other time slots used for the mobile communication system according to the present invention;

FIGS. 4A and 4B show a flowchart showing a flow of a location registration operation of the mobile communication system according to the present invention;

FIGS. 5A through 5C cooperate to show a flowchart showing a flow of a call originating operation of the mobile communication system according to the present invention;

FIGS. 6A through 6D cooperate to show a flowchart showing a flow of a call terminating operation of the mobile communication system according to the present invention;

FIGS. 7A through 7D cooperate to show a flowchart showing a flow of a channel switching operation of the mobile communication system according to the present invention;

FIGS. 8A through 8D cooperate to show a flowchart showing a flow of a transmitting/receiving diversity communication in the mobile communication system according to the present invention;

FIG. 9 shows a table comparatively showing the effects of the transmitting/receiving diversity communication in the conventional mobile communication system and the mobile communication system according to the present invention;

FIGS. 12A and 12B show timing charts useful in explaining delay time generated in the signal compression/expansion process in the mobile communication system according to the present invention;

FIGS. 14A and 14B cooperate to form a flowchart showing a flow of a location registration operation when an intra-frame time slot allocation according to the present invention is used;

FIG. 16 shows a schematic illustration for explaining a conventional mobile communication system.

DETAILED DESCRIPTION OF THE PREFERRED EMBODIMENTS

A mobile communication system based on the time division communication according to an embodiment of the present invention is configured as shown in FIGS. 1A, 1B-1, 1B-2, and 1C. The present mobile communication system employs a small zone architecture, more exactly a so-called cellular or microcell system in which each zone is extremely small, within 1 km, as described in paper entitled "A Proposal of Time-Division, Time-Compressed Multiplexing FM Mobile Radio System" written by Sadao Itoh, SHINGAKU GIHOH (Technical Comittee Report of the Institute of Electronics Information and Communication Engineers), CS 86-88, Nov. 1987. In the microcell system, the radio zones overlap, and one radio zone frequently serves as another, adjacent radio zone.

Figure 1A:
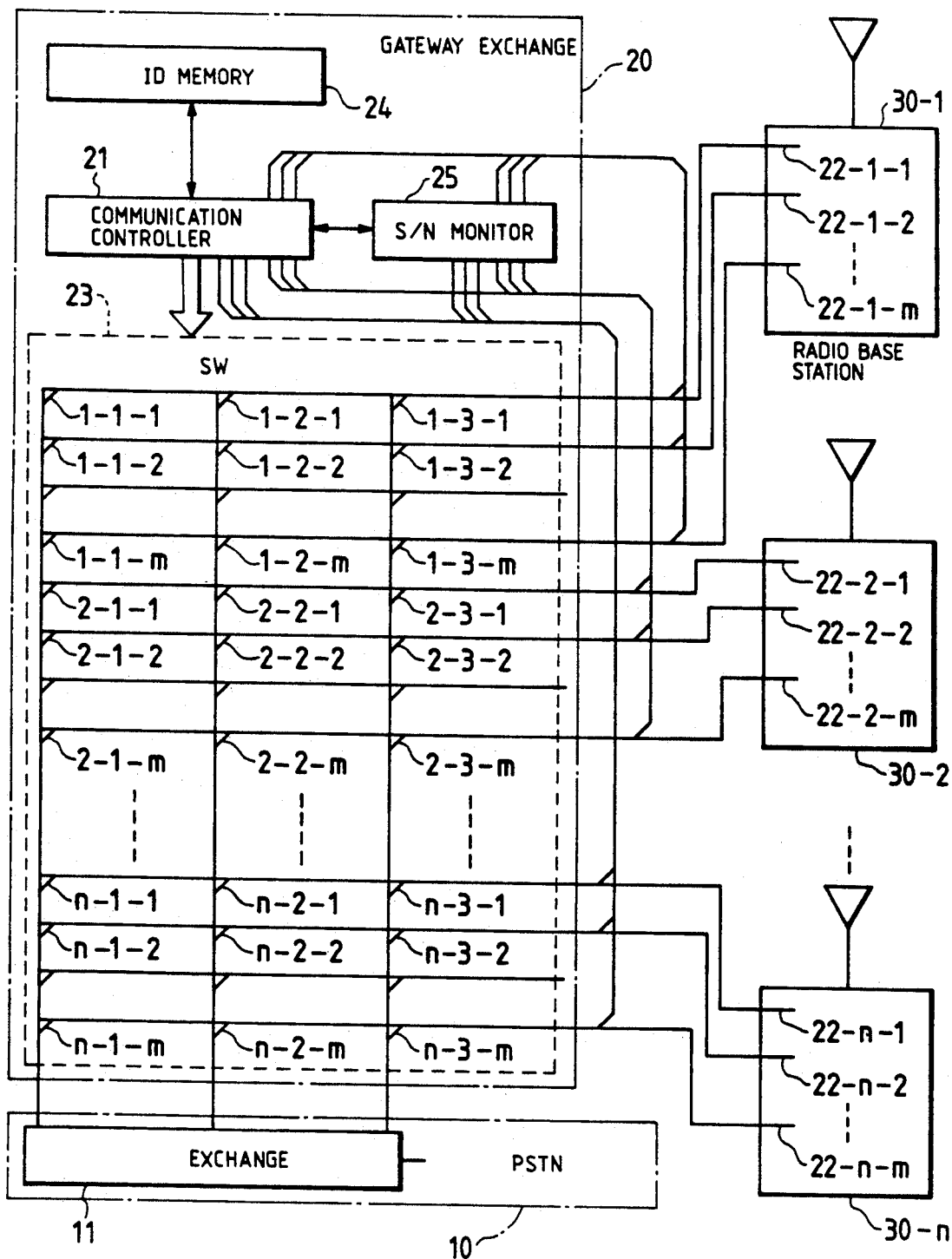
FIG. 1A is a diagram showing an arrangement of a gateway exchange contained in a mobile communication system according to the present invention, and the connection among the gateway exchange, a public telephone network, and base stations.

In FIG. 1A, reference numeral 10 designates a general public switched telephone network (PSTN); 11 an exchange closer to the telephone network 10; 20 a gateway exchange for switching the exchange 11 with a radio system. The gateway exchange 20 controls a plurality of radio base stations 30 and a number of mobile stations in order to change channels one to another when radio channel assignment and release, and zone shift are executed. The gateway exchange 20 is made up of a communication controller 21 for controlling "n" number of radio base stations 30-1 to 30-n, an ID memory 24 for discriminating an identification (ID) number of each mobile station, an S/N monitor 25 for monitoring communication quality when the radio stations 30-1 to 30-n receive radio waves from mobile stations, and a group of switches 23 necessary for switching the communication lines between the exchange 11 and the respective radio stations 30-1 to 30-n under control of the communication controller 21. For each of illustration of the switch group 23, there are illustrated only three incoming lines connecting to the exchange 11, and outgoing lines of n×m for wirelessly transmitting to the radio stations 30-1 to 30-n, communication signals 22-1-1 to 22-1-m, 22-2-1 to 22-2-m, ..., 22-n-1 to 22-n-m.

The radio base station 30 is made up a switch group for speech paths serving as an interface with the gateway exchange 20, a speech path controller for controlling the switch group, a circuit for signal speed (pitch) conversion of an ID discrimination memory signal, a circuit for assignment and select of time slots, a controller, a receiver/transmitter for a plurality of radio channels. The radio base station 30 sets up and releases radio channels, and further includes a transmitting/receiving circuit for transmitting and receiving radio signals to and from a number of mobile stations.

Between the gateway exchange 20 and the radio station 30, transmission lines are provided for transmitting communication signals 22-1 to 22-m containing speech signals of speech channels CH1 to CHm and control signals.

Figures 1, 1B, 2:
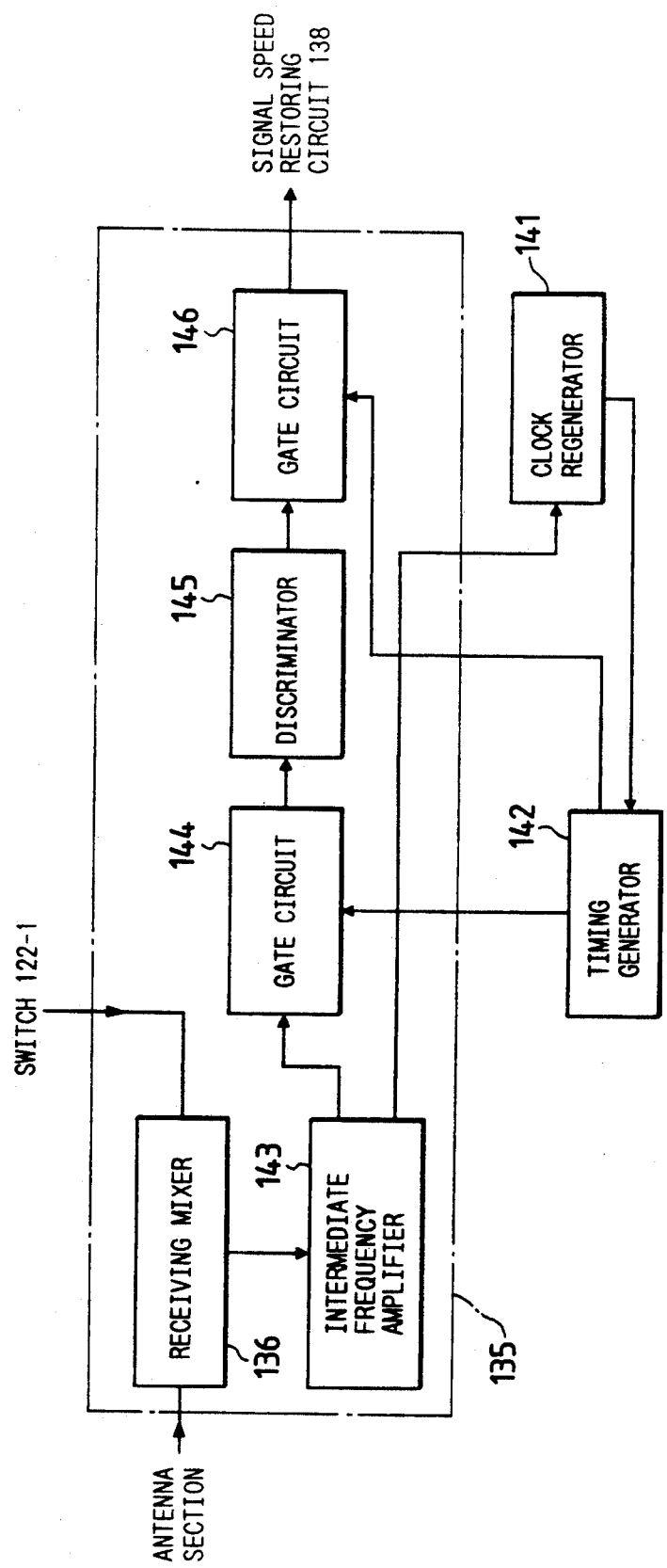

A circuit arrangement of the mobile station 100 for making a communication with the radio base stations 30-1 to 30-n is shown in FIG. 1B-1. The communication signal containing the speech signal and the control signal as is received by an antenna section, enters a receiver 135 including a receiving mixer 136 and a receiving section 137. The output signal of the receiver 135 is input to signal speed (pitch) restoring circuits 138-1 and 138-2, and a clock regenerator 141. The regenerator 141 regenerates a clock signal on the basis of the received signal, and delivers it to the signal speed restoring circuits 138-1 and 138-2, controller 140, timing generator 142, and signal speed (pitch) converting circuits 131-1 and 132-2.

The signal speed restoring circuits 138-1 and 138-2 restore speeds (in the case of an analog signal, pitches) of two communication signals as compressed and segmented in two time slots in the received signals of two channels, thereby to form a continuous signal. The continuous signal thus formed is subjected to a mixing process in a signal mixer 152. The output signal of the signal mixer 152 is delivered to a telephone section 101, speech signal monitor 157, and ID data verification/memory 182.

An output signal of the telephone section 101 is divided into two signals by a signal divider 139. The divided signals are applied to signal speed converting circuits 131-1 and 131-2, respectively. In the converting circuits, the communication signals are segmented at predetermined time intervals to increase (compress the signals) the signal speed (in the case of the analog signal, pitches). The output signals of the signal speed converting circuits are applied to a transmitter 132 including a transmitting mixer 133 and a transmitting section 134. The transmitting signals are transmitted by using two time slots from the antenna section, The speech quality monitor 157, which receives the output signal of the signal mixer 152, constantly monitors a speech quality of the speech signal under communication. When detecting a degradation of the speech quality, the monitor transfers the degradation to the controller 140. The ID data verification/memory 182 stores ID data of the mobile station per se, and recognizes a radio zone in which the mobile station is now present, and stores the zone. An interference detector 162 monitors radio interference under communication. When the radio interference exceeds a predetermined level, the interference detector 162 sends the excessive interference to the controller 140.

The timing generator 142 generates timing signals on the basis a clock signal from the clock regenerator 141 and a control signal from the clock controller 140, and delivers them to a transmitting/receiving interrupt controller 123, the signal speed converting circuits 131-1 and 131-2, and the signal speed restoring circuits 138-1 and 138-2.

The mobile station 100 further includes synthesizers 121-1 to 121-4 for enabling simultaneous transmission and reception of two channels, select switches 122-1 and 122-2, the transmitting/receiving interrupt controller 123 for operating the switches 122-1 and 122-2, and the timing generator 142. The synthesizers 121-1 to 121-4, the transmitting/receiving interrupt controller 123, and the timing generator 142 are controlled by the controller 140. A reference frequency is applied from a reference crystal oscillator 120 to the synthesizers 121-1 to 121-4. With such an arrangement, the mobile station can communicate with the plurality of radio base stations 30 by using two channels.

FIG. 1B-2 shows an arrangement of an internal circuit of the radio receiving circuit 135. A signal as received by the antenna section is applied to the receiving mixer 136, which receives a local oscillator frequency through the switch 122-1 from the synthesizer 121-1. The output signal of the receiving mixer 136 is applied to an intermediate frequency IIF) amplifier 143. The signal as amplified by the IF amplifier 143 is applied to a gate circuit 144 and the clock regenerator 141. The gate circuit 144 functions to pick up only signals of desired time slots without any interference from other time slots. The output signal of the gate circuit 144 is demodulated by a discriminator 145, and applied through a gate circuit 146 to the signal speed restoring circuit 138. The gate circuit 146 removes transient components of a waveform after demodulation.

Figure 1C:
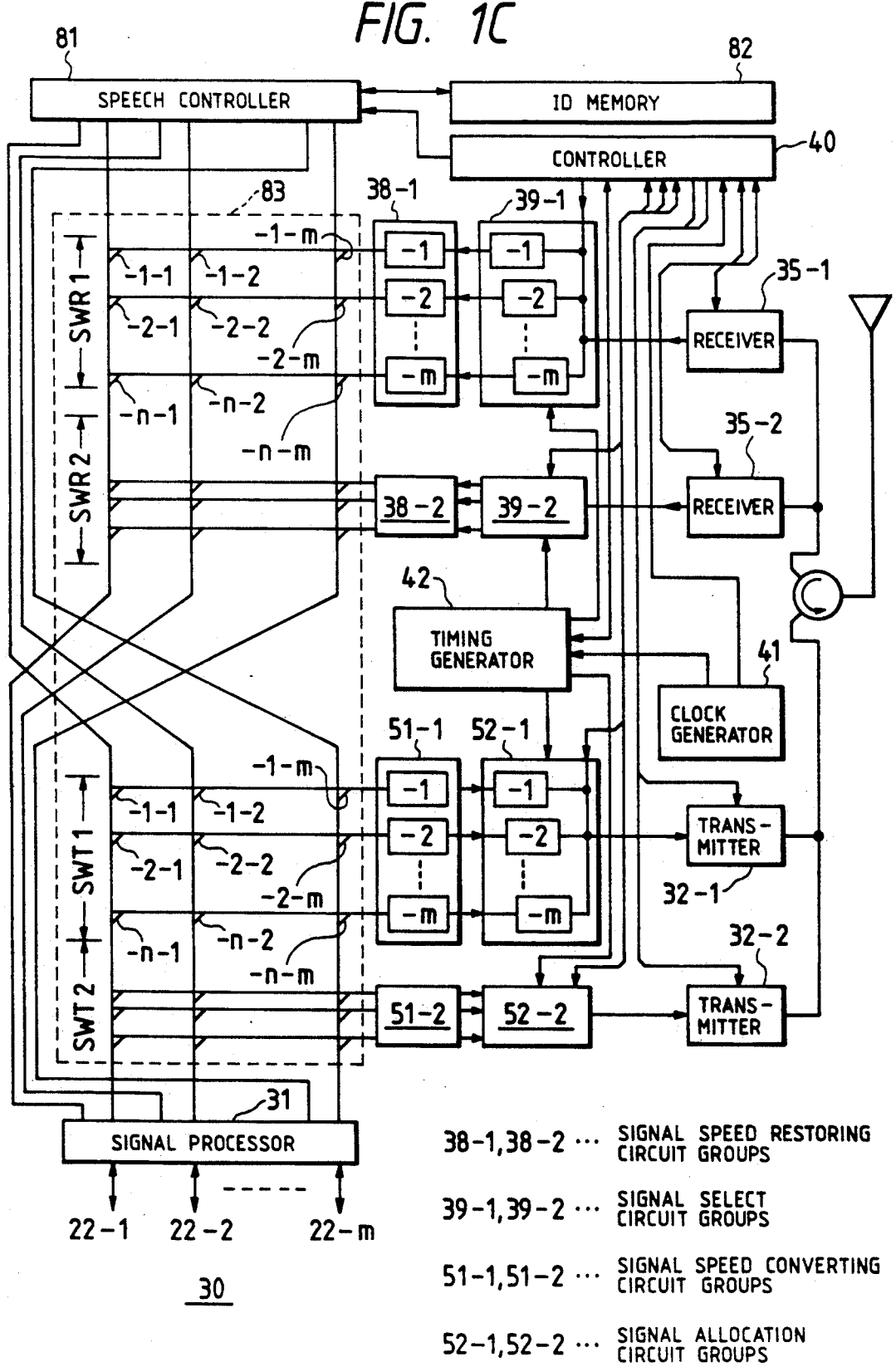
FIG. 1C shows a circuit arrangement of a base station used in the mobile communication system according to the present invention.

FIG. 1C shows an arrangement of the radio base station 30. The communication signals 22-1 to 22-m of "m" channels are coupled with a signal processor 31 as an interface by way of transmission paths between the base station 30 and the gateway exchange 20.

In operation, the communication signals 22-1 to 22-m coming through the gateway exchange 20 reaches the signal processor 31 in the radio base station 30. The signal processor 31 includes an amplifier for compensating for a transmission loss. The signal processor has many functions; function for a transmitting/receiving diversity using time slots of two or more, function to divide the signal for a plurality of radio transmitting/receiving sections, and function to make the 2–4 wires conversion when the transit trunk consists of 2 wires. That is, the signal processor executes mixing and separation of the input and output signals. The signals from the gateway exchange 20 are applied to a signal speed converting circuit group 51-1 containing a number of signal speed converting circuits 51- 1-1 to 51-1-m and another signal speed converting circuit group 51-2, through a switch group 83. The switch group 83 includes a group of switches SWR1 containing SWR 1-1-1, SWR 1-1-2, . . . , SWR 1-1-m, SWR 1-2-1, SWR 1-2-2, . . . , SWR 1-2-m, . . . , . . . , SWR 1-n-1, SWR 1-n-2, . . . , SWR 1-n-m, a group of switches SWR2 containing a number of like switches, a group of another type of switches SWT1 containing SWT 1-1-1, SWT 1-1-2, SWT 1-1-m, SWT 1-2-1, SWT 1-2-2, . . . , SWT 1-2-m, . . . , . . . , SWT 1-n-1, SWT 1-n-2, . . . , SWT 1-n-m, and a group of switches SWT2 containing a number of like switches.

The output signals of a signal restoring circuit group 38-1 including signal restoring circuits 38-1-1 to 38-1-m, and another signal speed restoring circuit group 38-2, are applied through the switch group 83 to the signal processor 31. Those signals are transmitted as communication signals 22-1 to 22-m from the signal processor 31 through the same transmission paths as those for the input signals to the gateway exchange 20. The switches in the switch group 83 are categorized into two types, switches for transmission SWT1 and SWT2, and switches for reception SWR1 and SWR2. Both types of switches operate to effect the intended functions of the switch group 83 under control of the speech path controller 81, and consequently allows the transmitting/receiving diversity operation.

The ID memory 82 is used for discriminating an ID of the mobile station 100, and storing the registered ID. The speech path controller 81 receives instructions from the controller 40 and operates the switch group 83, thereby to exercise the controls on the speech path. Further, the speech path controller 81 sends data to the controller 40, and control request signals to the same. The signals from the gateway exchange pass through the switch group 83, and reach the signal speed converting circuit group 51-1 including many speed converting circuits 51-1-1 to 51-1-m, and the speed converting circuit group 51-2. In those groups, the signals are subjected to the speed (pitch) conversion at predetermined time intervals. The signals transmitted from the radio base station 30 to the gateway exchange 20 are input through the switch group 83 to the signal processor 31, after the output signals of the radio receiving circuits 35-1 to 35-2 are input through signal select circuit groups 39-1 and 39-2 to the signal speed restoring circuit groups 38-1 and 38-2 where those signals are subjected to the speed (pitch) conversion.

The speech signals or the control signals output from the radio receiving circuits 35-1 and 35-2 are input to the signal select circuit groups 39-1 and 39-2 each including signal select circuits 39-1-1 to 39-1-m for selecting the signals for each time slot. In the signal select circuit groups 39-1 and 39-2, the speech signals are separated corresponding to time slots contained in the two radio channels, e.g., channels CH1 and CH2, as received by the radio receiving circuits 35-1 and 35-2. The output signals of the signal select circuit groups are applied to the signal speed restoring circuit groups 38-1 and 38-2 each including many signal speed restoring circuits 38-1-1 to 38-1-n as provided corresponding to the respective speech signals. The signal speed restoring circuit groups restore the speeds of the signals. The output signals of the signal speed restoring circuit groups are applied through the switch group 83 to the signal processor 31. In the processor, those are subjected to the 2-4 wires conversion, and then are output to the gateway exchange 20, in the form of communication signals 22-1 to 22-m.

A circuit arrangement of each radio receiving circuit 35-1 and 35-2 is the same as that of the radio receiving circuit 135 in the mobile station 100 shown in FIG. 1B-2.

The functions of the signal speed converting circuit groups 51-1 and 51-2 will be described.

A time length of a signal can be compressed in a manner that an input signal as segmented at fixed time intervals, such as a voice signal and a control signal, are stored in a memory, and the signal is read out of the memory at speed different from that when it is stored, for example, speed 15 times as high as the speed of the signal when it is stored. The principle of the signal speed converting circuit group 51 resembles that of the case where a voice recorded in a tape recorder is reproduced at a high speed. Practically, a CCD (charge coupled device) and BBD (bucket brigade device) are available for the signal speed converting circuit group 51. Further, a memory device may be used which is used in a television receiver or a tape recorder to expand or compress the time axis of conversation. For the details, reference is made to paper entitled "Tape Recorder to Compress/Expand the Time Axis of Conversation" written by Kosaka et. al in NIKKEI ELECTRONICS, Jul. 26, 1976, pp. 92 to 133.

A circuitry using a CCD or BBD as for the signal speed converting circuit groups 51-1 and 51-2, as referred to in the above article, is straightforwardly applied to the signal speed restoring circuit groups 38-1 and 38-2. In this case, upon receipt of a timing signal from the timing generator 42, which generates the timing signal on the basis of a clock signal from the clock generator 41 and a control signal from the controller 40, the signal restoring circuit groups decreases the signal read speed below the signal write speed.

The control or speech signals as transferred through the signal processor 31 from the gateway exchange 20 are applied to the signal speed converting circuit groups 51-1 and 51-2, where the signals are subjected to the speed (pitch) conversion process. Then, the signals are applied to signal allocation circuit groups 52-1 and 52-2 where the signals are allocated in compliance with the time slot. The signal allocation circuit groups 52-1 and 52-2 are of the buffer memory type, and each store one frame of each of the high speed signals output from the signal speed converting circuit groups 51-1 and 51-2. On the basis of the timing data as generated from the timing generator 42 by an instruction from the controller 40, the signal data are read out of the buffer memories, and are transferred to radio transmitting circuits 32-1 and 32-2. As a result, the communication data when considered as speech signals are arranged in time sequential order, not in an overlapping fashion. The communication data, when filled with control or speech signals to be given later, takes a form like a consecutive signals waveform.

Signal formats when the signals are compressed will be described with reference to FIGS. 2A and 2B.

The output signals of the signal speed converting circuits 51-1 and 51-2 are input to the signal allocation circuit groups 52-1 and 52-2 where the signals are allocated to time slots in predetermined order. In FIG. 2A(a), the downward (abbrevates as down hereafter) communication signals (abbrevates as SP) as speed converted are allotted to time slots SD1, SD2, SDn, and output from the radio transmitting circuits 32-1 and 32-2 (generally designated by 32 in the figure).

As shown, one time slot contains a synchronous (abbrevates as sync) signal and a speech signal and/or a control signal. When the speech signal is not contained, the slot contains a sync signal as applied in the speech controller 81, and an idle slot signal in the speech signal part. In some systems, no signal is present in the speech signal part of the time slot. Thus, a signal in which one frame consists of the time slots SD1 to SDn is applied to the modulator in each of the radio transmitting circuits 32-1 and 32-2.

A multiplexed signal as time sequentially arranged is amplitude-modulated or angle-modulated in each transmitting circuit 32, and then is transmitted to air from the antenna section.

In some systems, the radio signal is transmitted only for the time slots containing the control signal or speech signal, while no radio signal including a carrier wave is transmitter for other time slots. As for such systems, description will be given later in "(6) Time Slot Allocation within One Frame". The radio transmitting circuit 32 in the radio base station 30 in such a system may be substantially the same as the radio transmitting circuit 132 in the radio base station 100 shown in FIG. 1B-1, for example.

Figure 3A:
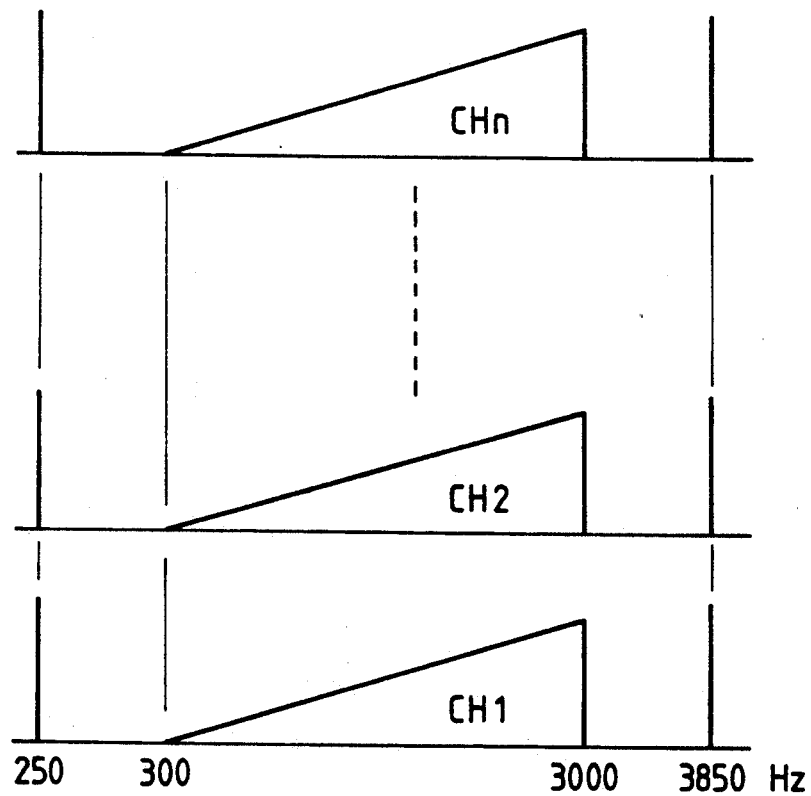
FIGS. 3A and 3B are spectral diagrams showing spectra of a speech signal and a control signal.
Figure 3A:
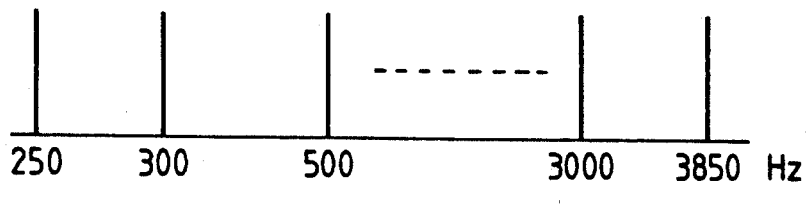

A frequency within or outside the band with of the speech signal may be used for transmitting control signals between the radio base station 30 and the mobile station when the telephone section calls or is called, which the control signal transmission precedes to the speech communication. This is illustrated in FIG. 3A. As shown in FIG. 3A(a), the frequency used for transmitting the control signals is located outside the frequency band, viz., at 250 Hz one the lower frequency side of the frequency band or at 3850 Hz on the higher frequency side. The frequency outside the frequency band is used for sending the control signal when the speech communication progresses, e.g., when in- communication handover or the diversity is desired to be applied.

These control signals are formed in the controller 40 or relaying or converting the control signals from the gateway exchange 20 or the speech path controller 81 by the controller 40.

The control signals originating from the mobile station 100 are received by the radio receiving circuits 35-1 and 35-2, and appropriately processed by the controller 40, and if required, are transferred to the speech path controller 81 and the gateway exchange 20.

In FIG. 3A(b), the frequency for transmitting the control signals is located within the frequency band, and is used at the time of call or being called.

While in the above description, the control signals are tone signals, the number of tone signals may be increased or the tone signals may be modulated into a sub-carrier signal. In this case, many types of tone signals may be sent at high speed.

In the above description, the analog control signals are treated. If required, digital data signals may be used for the control signals. In this case, the speech signal is also digitized. Both the control and speech digital signals are time division multiplexed before transmitted. A circuit arrangement to realize this is shown in FIG. 2E(b). As shown, an analog voice signal is digitized by a digital encoding circuit 91, and it is multiplexed with a data signal in a multiplex/converter circuit 92. The multiplexed signal is applied to the modulator contained in the radio transmitting circuit 32.

The multiplexed signal is received by a receiver, and is subjected to a reverse procedure of the procedure of FIG. 2E(b), in the demodulator of the receiver. Through the reverse procedure, the speech signal and the control signal are separately derived from the multiplexed signal.

A signal sent from the mobile station 100 is received by the antenna section of the radio base station 30, and is applied to the radio receiving circuits 35 (35-1 and 35-2). This upward (abbrevates as up hereafter) signal (abbrevates as SU) is shown as a model in FIG. 2A(b). In the figure, time slots SU1, SU2, ..., SUn indicate the signals transmitted from the mobile stations 100-1, 100-2, ..., 100-n to the radio base station 30 (e.g., 30-1). Each of the time slots SU1, SU2, ..., SUn consists of a sync signal and/or a speech signal as illustrated in the lower left portion in FIG. 2A(b). The sync signal is omissible when a distance between the radio base station 30 and the mobile station 100 or if some specific signal speeds are used. A carrier wave of the up radio signal within each time slot is as shown in FIG. 2B(c).

Of the input signal arriving at the radio base station 30, the control signal is straightforwardly applied from the radio receiving circuits 35-1 and 35-2 to the controller 40. At some specific speed converting ratios, after the speech signal is subjected to a similar processing, it may be applied from the outputs of the signal speed restoring circuit groups 38-1 and 38-2 to the controller 40. The speech signal is applied to the signal select circuit groups 39-1 and 39-2. A timing signal as generated by the timing generator 42 in accordance with an instruction of the control signal from the controller 40, is applied to the signal select circuit groups 39-1 and 39-2. At the timing of the timing signal, each signal select circuit group separates the time slot signals into a sync signal, a control signal and a speech signal for each time slot. These signals are applied to the signal speed restoring circuit groups 38-1 and 38-2. These circuits make reverse operations of those by the speed converting circuits 131-1 and 131-2 (FIG. 1B-1) in the mobile station 100. Through the reverse converting operation, the replica of the original signals are faithfully reproduced, and transferred to the gateway exchange 20.

How the signals propagate in a signal space will be described in connection with necessary transmission frequency band, and radio channels adjacent to it.

As shown in FIG. 1C, the control signal from the controller 40, together with the output signals of the signal allocation circuit groups 52-1 and 52-2, is applied to the radio transmitting circuits 32-1 and 32-2. At some specific signal converting ratios, after the control signal is subjected to a similar processing to that of the speech signal, it may be applied from the outputs of the signal speed allocation circuit groups 52-1 and 52-2 to the radio transmitting circuits 32-1 and 32-2.

Figure 3B:
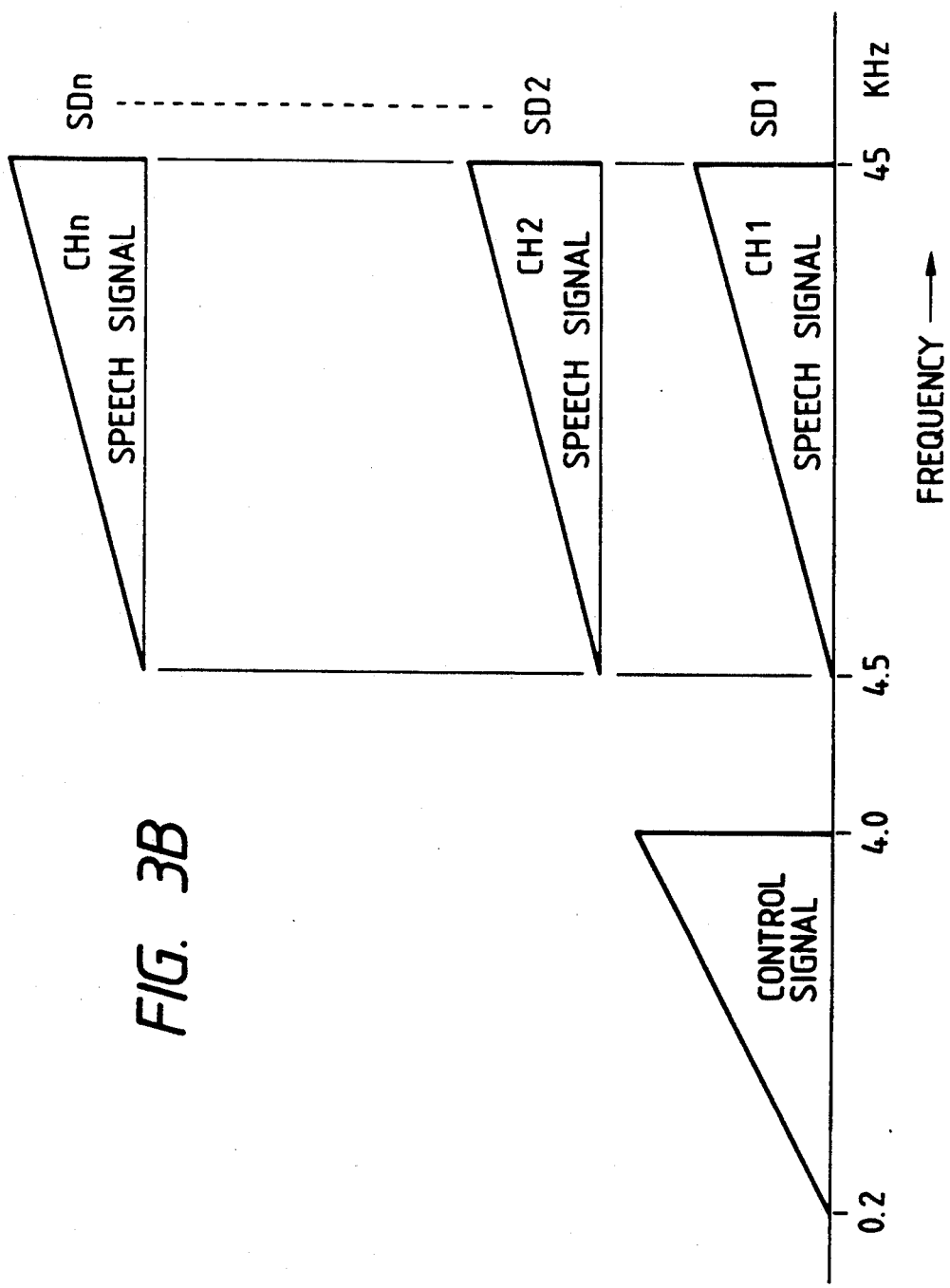

The mobile station 100 also employs the circuit arrangement necessary for realizing one of the functions of the radio base station 30 that is to receive the the two speech signals as transmitted by using two time slots as shown in FIG. 1B-1. An original signal, e.g., a speech signal (0.3 kHz to 3.0 kHz), after passing through the signal speed converting circuit group 51 (FIG. 1C), has a frequency distribution as shown in FIG. 3B. As already described, where the speed of the voice signal is increased to be speed 15 times as high as the original one, the frequency distribution of the speech signal is expanded to be 4.5 kHz to 34 kHz as shown in FIG. 3B. In the case illustrated, the control signal, together with the speech signal, is transferred by using a lower side band of the speech signal. It is assumed now that a control signal (0.2 to 4.0 kHz) and a speech signal (4.5 to 45 kHz) denoted as SD1 are contained in a time slot SD1, for example. The same thing is true for other time slots SD2 to SDn.

As a generalization, a control signal (0.2 to 4.0 kHz) and a communication signal CHi (4.5 to 45 kHz) are contained in a time slot SDi (i=2, 3, ..., n). Within each time slot, the signals are arranged time sequentially. Accordingly, there never occurs such a situation that the signals within a plurality of the time slots will simultaneously be applied to the radio transmitting circuits 32-1 and 32-2.

When those speech signals, together with the control signal, are applied to the angle modulator contained in each radio transmitting circuit 32-1 and 32-2, at least the following frequency band is required to transmit those signals as modulated $$fc \pm 45 \text{ kHz},$$

where fc is the frequency of a carrier wave. In case where a plurality of radio channels are provided in this system, the minimum frequency interval among those channels limits increase of the signal speed by the signal speed converting circuit groups 51-1 and 51-2 to a certain value. The following inequality must hold between the frequency interval freg among the radio channels and a maximum signal speed fH of the voice signal when the signal speed is increased $$freq > 2fH.$$

The voice signal is digitized at the rate of usually about 16 to 64 kb/s. Accordingly, when a scale of the abscissa in FIG. 3B which depicts the frequency distribution of the analog signal is applied to the frequency distribution of the digital signal, the scale must be expanded by a figure up one place. Also in this case, the above inequality holds.

The control signal as transmitted from the mobile station 100 to the radio base station 30 is input to the radio receiving circuits 35-1 and 35-2. The output signals of the radio receiving circuits 35-1 and 35-2 are applied to the controller 40, and also to the signal speed restoring circuit groups 38-1 and 38-2 by way of the signal select circuit groups 39-1 and 39-2. In the signal speed restoring circuit groups, the control signals are subjected to the speed conversion exactly inverse to that of the transmission side (signal speed conversion from high speed to low speed). The converted signal speed is equal to that in the public switched telephone network 10. Then, the signal speed converted control signal is applied through the signal processor 31 to the gateway exchange 20.

Figure 1D:
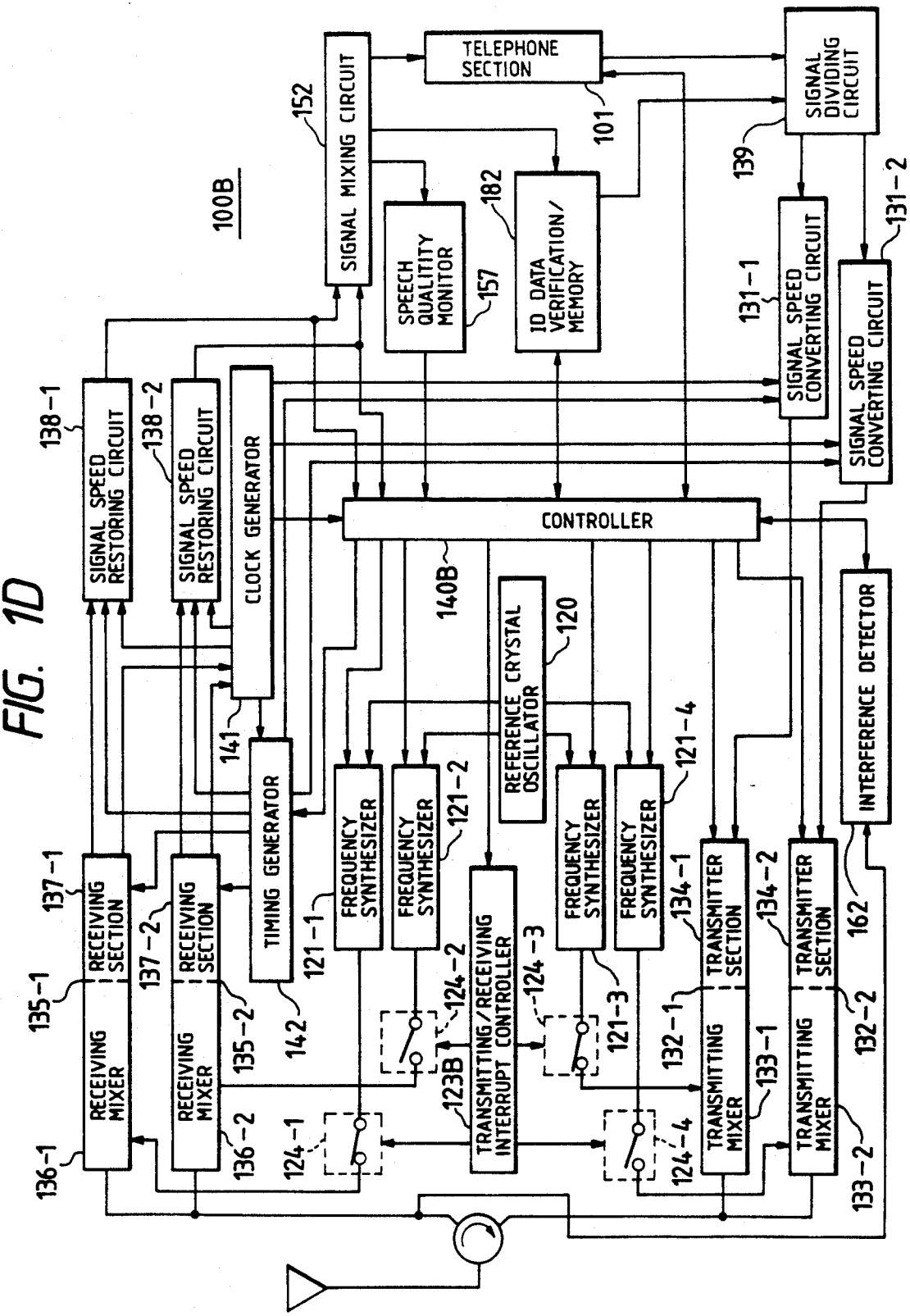
FIGS. 1D, 1E, and 1F show circuit arrangements of other mobile stations that can be used in the mobile communication system according to the present invention.

Turning now to FIG. 1D, there is shown another embodiment of the mobile station 100. In this embodiment, the mobile station is denoted as 100B. The instant mobile station 100B is different from that 100 in that a couple of radio transmitting circuits 132-1 and 132-2, and a couple of radio receiving circuits 135-1 and 135-2 are provided, and the output signals of the synthesizers 121-1 to 121-4 are applied to those circuits by way of switches 124-1 to 124-4 that are turned on and off under control of a transmitting/receiving interrupt controller 123B. The transmitting/receiving interrupt controller 123B opens and closes the switches 124-1 to 124-4 in accordance with an instruction from the controller 140B. With such an arrangement, the mobile station 100B will be free from the radio interference. A transmitting/receiving diversity can always be carried out between the mobile station and one radio base station.

Figure 1E:
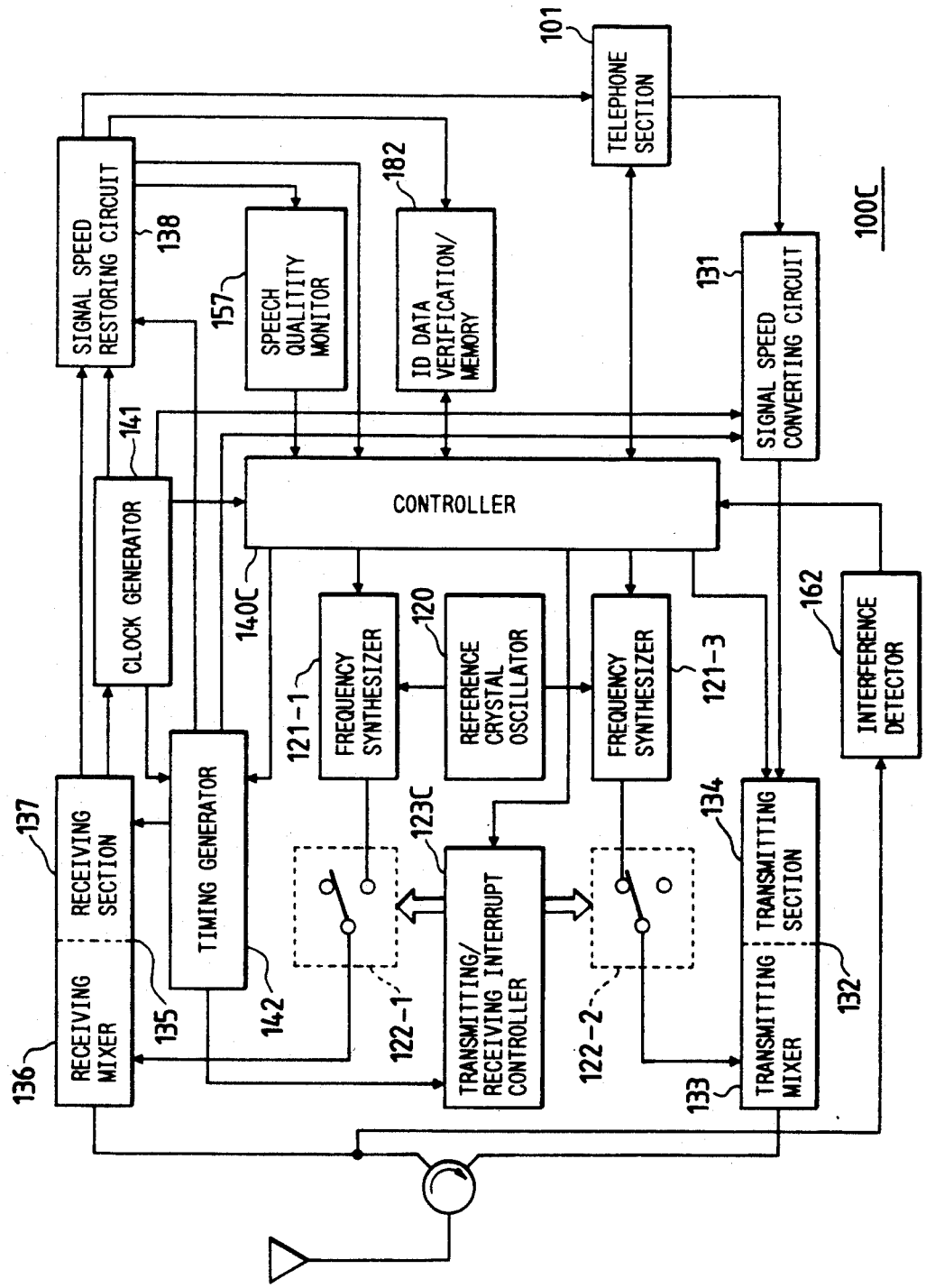

FIG. 1E shows yet another embodiment 100C of the mobile station 100. The difference of the instant embodiment from the mobile station 100 lies in that a signal speed restoring circuit 138 and a speech converting circuit 131, and a couple of synthesizers 121-1 and 121-3 for transmitting and receiving use are provided, and that the signals of given time slots can be transmitted and received through switches 122-1 and 122-2, which are operated under control of a transmitting/receiving interrupt controller 123C operable by an instruction from the controller 140. Therefore, a transmitting/receiving diversity can be carried out in this embodiment. For simplifying the circuit arrangement, only one set of the signal speed restoring circuit 138 and the signal speed converting circuit 131 is used, and the signal mixer 152 and the signal divider 139 are omitted.

Figure 1F:
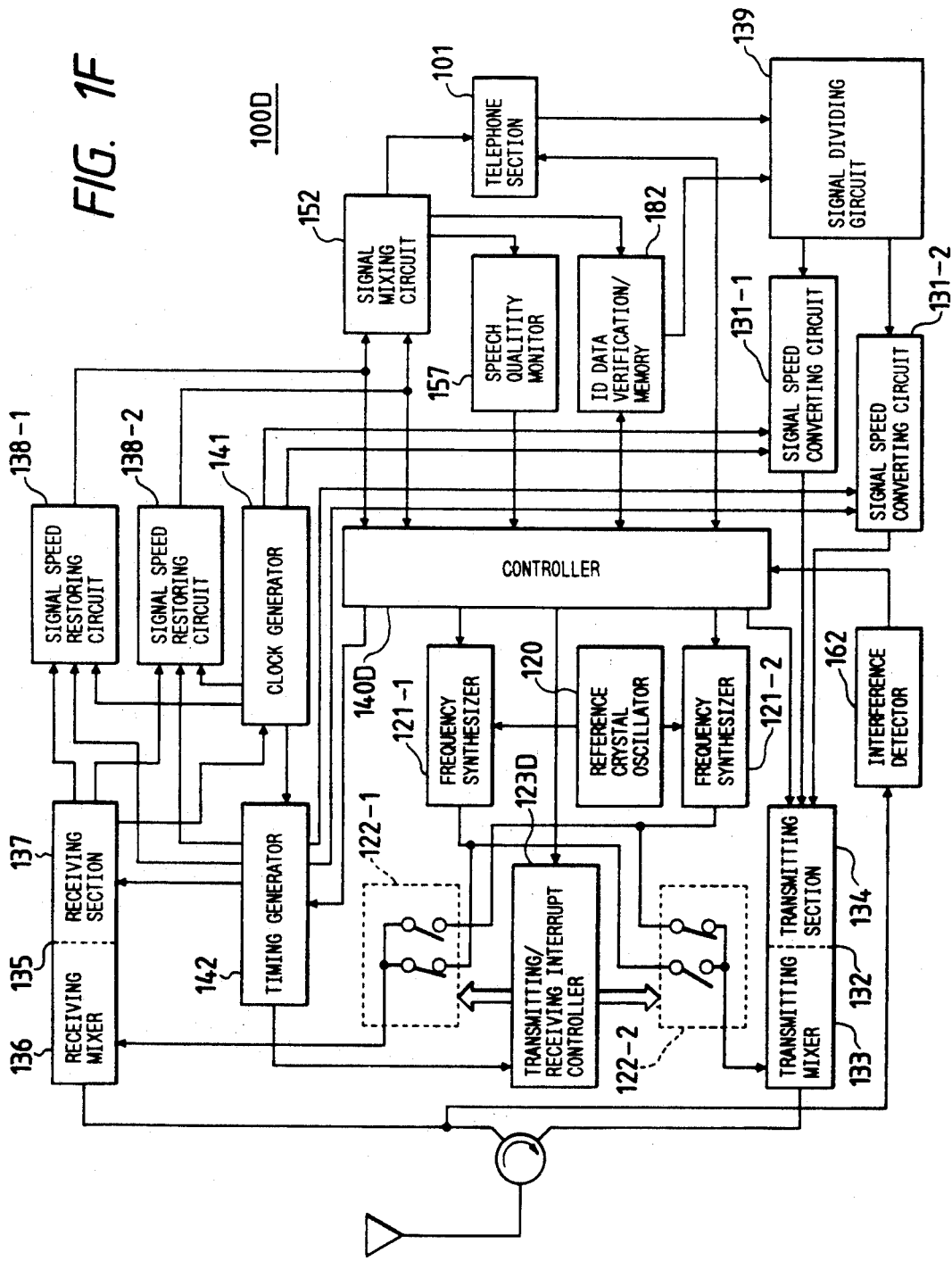

FIG. 1F shows still another embodiment 100D of the mobile station 100. The difference of the instant embodiment from the mobile station 100 shown in FIG. 1B lies in that the synthesizers 121-1 and 121-2 are used for both the transmitting and receiving, and the mobile station does not receive the signals in a transmission mode, and does not send the signals in a receiving mode by the switches 122-1 and 122-2, which are operated under control of a transmitting/receiving interrupt controller 123D operable by an instruction from the controller 140D. With such an arrangement, the same radio frequency can be used for sending and receiving signals.

Various operation of the mobile communication system thus arranged will be described in the order as given below. It is believed that the description on the operations to follow will theoretically prove excellent utility of the present invention. In the description, speech signals will first be used, and then non-telephone signals will be used.

(1) Location Registration
(2) Call Originating Operation
(3) Call Incoming Operation
(4) Handover
(5) Transmitting/Receiving Diversity Between Plurality Base Stations and a Mobile Station
(6) Time Slot Allocation within One Frame
(7) Comparison of the Diversity Effects by the Invention and by Prior Art
(8) Theoretical Description of the Invention
    (I) Adjacent Channels Interference
    (II) Intra-channel Interference
    (III) Co-Channel Interference
    (IV) Removal of Pulsative Noise in Signal Reception
    (V) Delay Time Effect of Transmission Signal
    (VI) Calculation of Effective Frequency Utilization
(9) Application of the Invention to a Communication System using a Non-telephone Signal (Broad Band Signal) Other Than a Speech Signal
(10) Application to the Invention to a Mobile Communication System Using the Same Radio Frequency for the Signal Transmission Between a Base Station and Mobile Stations (1) Location Registration Any one of mobile stations shown in FIGS. 1B-1, 1B-2, 1D, and 1E is available for the mobile station 100 in the mobile communication system according to the present invention. In the description on the location storage that follows, the mobile station 100C shown in FIG. 1E will be used. Other mobile stations of FIG. 1B-1 and 1B-2, for example, may be considered to have substantially the same arrangement as that of FIG. 1E, if only the synthesizers 121-1 and 121-3 are operating, while the remaining synthesizers 121-2 and 121-4 are rest. The same status is true for the mobile station 100B of FIG. 1D, if only the combination of the receiving section 135-1 and the transmitting section 132-1 are operating, while the receiving section 135-2 and the transmitting section 132-2 are rest. For this reason, the mobile stations 100, 100B and 100D will be designated representatively by reference numeral 100.

In a home area or a roam area as an area other than the home area where the mobile station 100 is permanently located, the gateway exchange 20 and its peripheral radio base stations 30-1 to 30-p have been operating. In such a station 100 first performs upon power on.

Before proceeding with description on the location registration, description will be given on how to allocate radio channels to the radio base station 30 in the mobile communication system incorporating the present invention. The following channel allocations, which are exactly the same as those currently employed in the analog system, are available for the system.

(a) Each radio base station 30 can use all of the radio channels.
(b) To remove the interference within a channel, the channels allocated to each radio base station are selected allowing for the number of repetitive zones. Other channels than the selected ones are prohibited from being used.
(c) In addition to the above items (a) and (b), the channels assigned to the system are classified into those used exclusively for control and those exclusively for speech communication. Those channels assigned to the system are not subjected to such classification.

When the channel allocations in (a), (b), and (c) above are combined, four types of systems can be realized. When practical channel allocations are included in addition to the above ones, a number of systems can be realized. The present invention is applicable for those systems.

A channel allocation used in the description to follow is that each radio base station 30 can use all of the radio channels, and no classification of the channels into those for control and those for speech is carried out.

To ensure a smooth operation of the system, it is assumed that the system operates under the following conditions.

i) The time slots in each channel transmitted from each radio base station 30 are all synchronized by a sync signal supplied from the gateway exchange.

ii) When signals are sent from the gateway exchange 20 to the mobile station 100 by way of different base stations 30, equal signal transmitting timings, equal signal formats, equal modulation percentages, and the like are employed.

With progression of the description, other channel allocations and other system operations will frequently be referred to.

Allowing for radio wave propagating characteristics of the mobile communication system using the microcell system, the following points are introduced into the system design.

In the microcell system in which the zone radius is within 1 km, the wave propagation characteristics depends largely on locations. A shape of a service area of one radio base station 30 is not circular, but elliptical or more complicated irregular. Accordingly, each location in the service area is infrequently covered with a single radio zone. In other words, a location does not belong to any zone or serves as an insensitive location, or different radio zones overlap at the location. In the insensitive zone, the communication is impossible. To remove such an insensitive zone, an excessive number of radio base stations 30 are installed in the current systems. This, however, results in the furtherance of the overlapping of different service zones. In such a system, if the mobile station 100 sends a location registration signal to be given later, it can be received clearly or in good condition by different radio base stations 30.

A location registration operation of the mobile communication system thus preconditioned will be described with reference to FIGS. 4A and 4B.

Figure 4A:
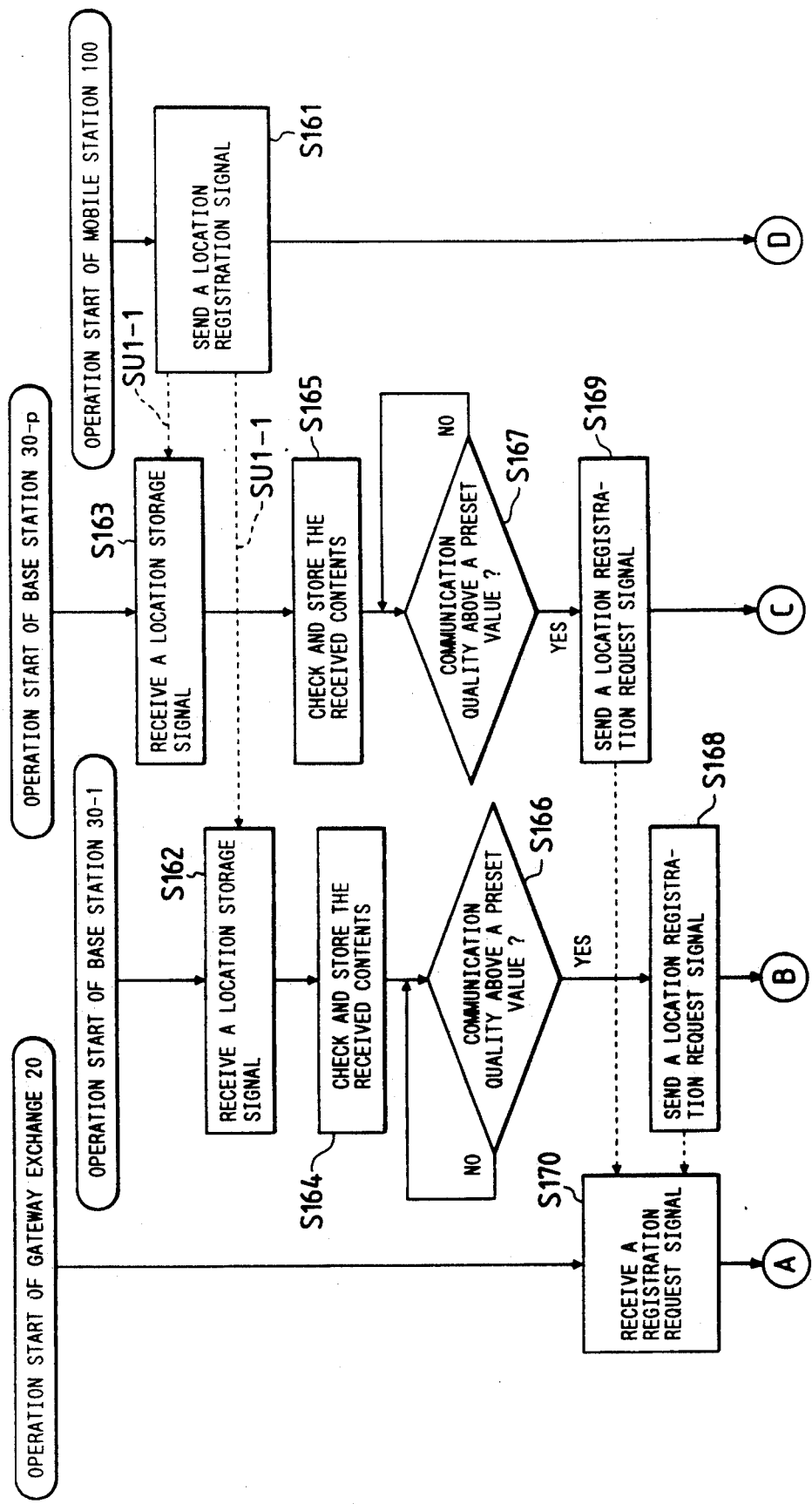

When a power switch of the mobile station 100 is turned on, a location registration signal to register the present location of the mobile station is sent to near radio base stations, for example, stations 30-1 and 30-p (p=2, 3 . . . ), which is located near the mobile station, by using an idle time slot SU1-1 in an up radio channel CH1, for example (S161 in FIG. 4A). The reason why the sending of the location registration signal is allowed is that the mobile station seizes the channel CH1 having an idle time slot SD1-1 of the speech channels sent from the radio base station 30-1, for example, gains timing data, and uses the idle time slot SU1-1 of the up channel CH1.

In this case, also in the radio base stations 30-1 and 30-p which are located near the mobile station 100 and ready for communication, the time slot SD1-1 is idle. This is readily seen because the carrier sense as mentioned above is employed. In all of the radio base stations 30, the receivers installed therein are ready for receiving the signals of the time slots through the predetermined radio channels.

When receiving a location registration signal from the mobile station 100 (S162, S163), each of the radio base stations 30-1 and 30-p checks a quality of the received location registration signal, and registers ID in the ID/discrimination memory 82 (S164, S165). When the received signal quality is above a preset value (S166 YES, S167 YES), each base station sends a location registration request signal to the gateway exchange 20 (S168, S169). The gateway exchange 20, which received the request signal (S170), prepares tables of IDs, received signal qualities and the like of all of the base stations 30-1 and 30-D, which have requested the exchange to register the location of the mobile station 100. And the exchange determines to send to the base stations 30-1 and 30-p a report on timings of transmitting a response signal to the mobile station 100, and a channel number (in this instance, CH1) used for the response signal transmission (S171, FIG. 4B). For example, the time slot SD1-1 of the down channel CH1 is allotted to the radio base station 30-1, the time slot SD1-2, to the base station 30-2, and similarly the time slot SD1-n, to the base station 30-n. The exchange sends a registration completion signal containing those allocations to the radio base stations 30-1 and 30-p (S172). After receiving the registration completion signal, the radio base stations 30-1 and 30-p (S173, S174) transfers it to the mobile station 100 by using the time slot SD1-1 and SD1-p (p=2, 3, . . . ) of the down channel CH1 (S176, S177).

The registration completion signal as sent by the time slot thus designated by the gateway exchange 20 is clearly received without any radio interference.

The mobile station 10, which received the registration completion signal (S177), checks the received signal, and stores IDs (identification numbers) of the base stations 30-1 and 30-p as registered, to the ID data verification/memory 182 (S178).

At this point in time, the registration operation of locations has ended, and a stand-by mode for call terminating is set up.

Assume now that in a wait-for-call mode, the mobile station 100 moves from the zone where its location has been registered to a zone adjacent to the former. The movement can be recognized by verifying the ID of the base station 30-1 contained in a control signal of each time slot in the radio channel, which is constantly transmitted from the base stations 30-1 and the like in comparison with the ID registration stored in the mobile station 100.

The radio channel constantly transmitted from the base stations 30-1 and the like may be a radio channel exclusively used for control or a radio channel for communication with a third party. In the latter case, each time slot contains the ID of the base station 30, and hence the comparison is made with this.

In the mobile communication system having no constant signal transmission, a location registration check signal is sent at fixed time intervals from the mobile station 100, and the base station 30, which receives the check signal, generates a signal. The signal from the base station 30 is used for recognizing the ID of the base station.

As the result of verifying the ID, if the ID of the base station 30-1, for example, is a new ID, which is different from the registered ID stored in the mobile station 100, the mobile station 100 decides that it has been moved to a new zone, and the controller 140 (FIG. 1B-1) updates the ID verification/memory 182 registrating location data. That is, by using a channel including an idle time slot, the ID data of the mobile station 100 is sent to the radio base station that has originated the received signal, e.g., the base station 30-2.

The base station 30-2 having clearly received the signal executes a procedure similar to that as mentioned above, and sends a location registration signal of the mobile station 100 to the gateway exchange 20. The gateway exchange 20, when receiving this, replaces the old location data in the ID memory 24 of it with new ID data, and causes the base station 30-2 to send this data replacement to the mobile station 100. In this way, the new location data of the mobile station 100 is stored anew.

The above update must be carried out because the mobile station is in the wait-for-ready mode. When the mobile station is moved to a new zone when it is a busy mode, any special action is not required against the gateway exchange because the location registration is updated simultaneously with the assignment of a new channel as is made between the new radio base station 30-2 and the mobile station 100, as will be described later.

The above description has been made on the assumption that the mobile station 100 used is that shown in FIG. 1E, and that for the mobile station 100 or 100B shown in FIG. 1B-1 or 1D, some specific functions of it are rest. It is noted, however, that in practical use, it is desirable to actively operate them rather than to make them rest. If the mobile station is fully operated, it has the following excellent functions, which cannot be attained by the mobile station 100C of FIG. 1E.
i) Diversity transmission is possible, allowing simultaneous transmission of the location registration request signal by using two different radio channels.
ii) Diversity reception is possible, allowing simultaneous reception of the signals of different channels from one or two different radio base stations.
iii) Cooperative action of i) and ii) above improves a reliability and increases the location registration operation.

(2) Call Originating Operation

Figure 5A:
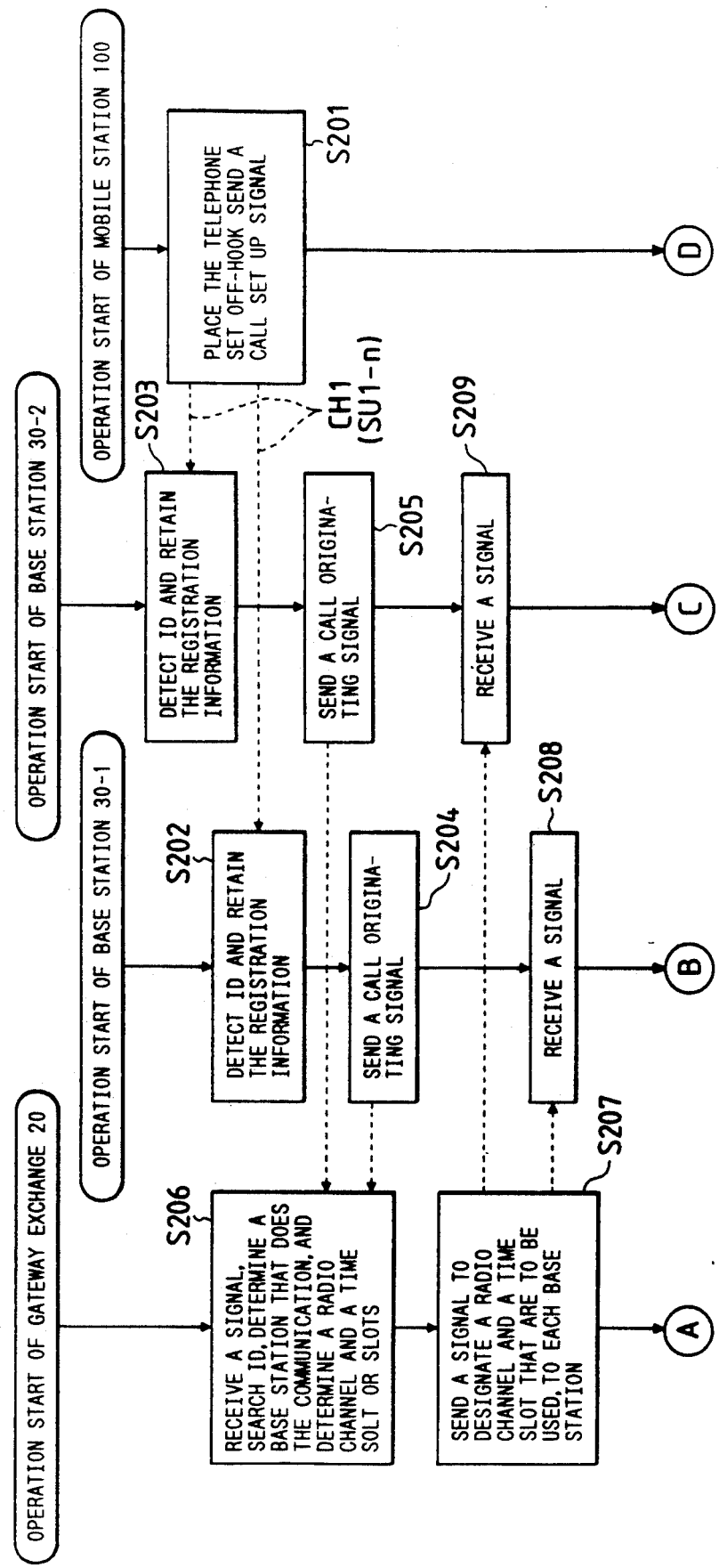
Figure 6D:
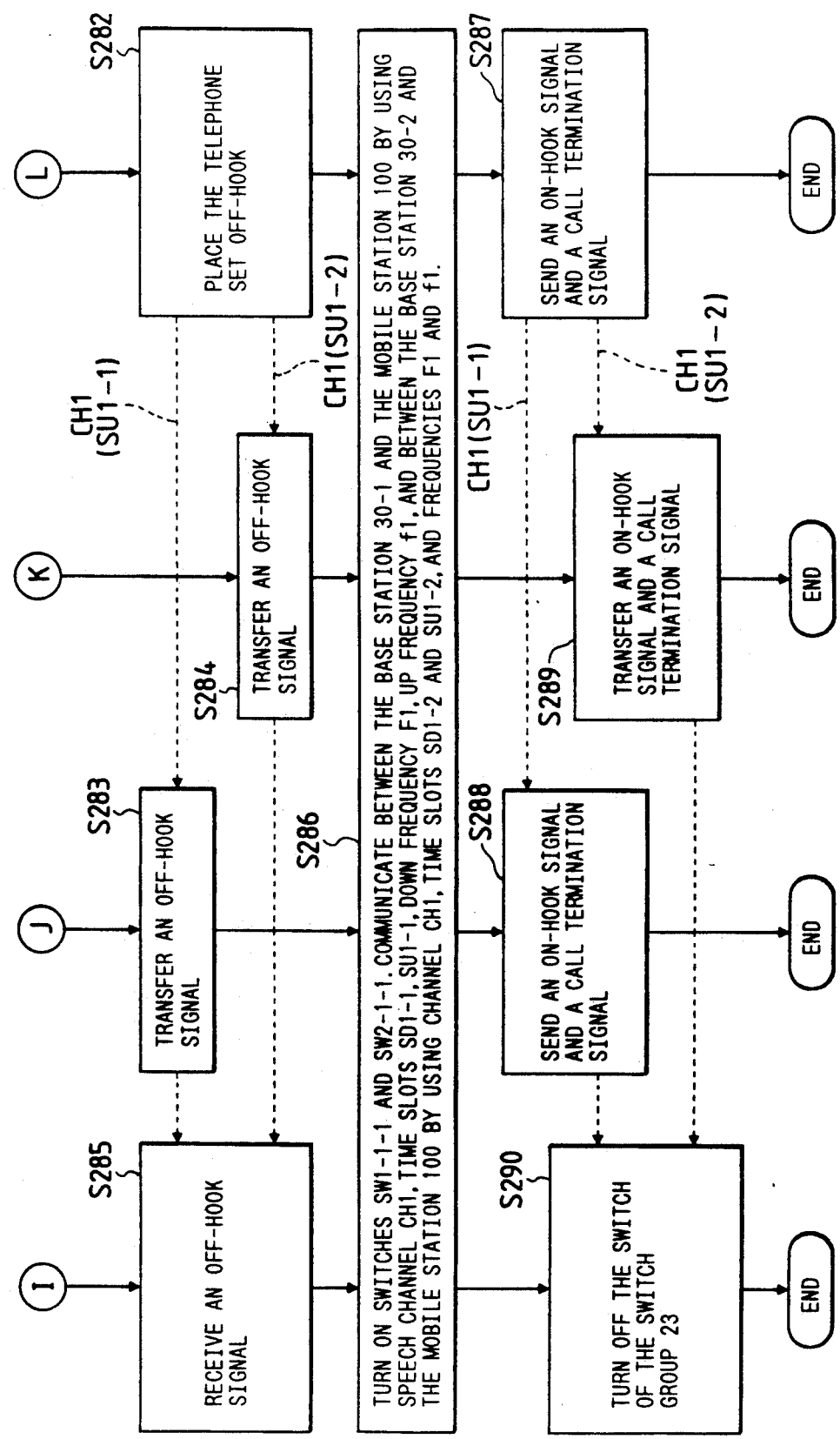

The originating operation will be described with reference to FIGS. 5A to 5C cooperating to form a flowchart.

In a state that the power source of the mobile station 100 is turned on, the location registration operation as already described in "(1) Location Registration" has been completed. When a telephone set in the telephone section 101 is placed in off-hook (starts to originate a call) (S201, FIG. 5A), the mobile station seizes an idle time slot SU1-n in a radio channel CH1, as in the case of sending the location registration signal, and sends a call setup signal by the idle time slot to near base stations 30-1 and 30-2. An operation of the mobile station 100 will be described. In a receive mode, the mobile station seizes a sync signal in the time slot SDi shown in FIG. 2A(a). The controller 140 issues a control signal to cause the synthesizer 121-1 to generate a local oscillation frequency which enables the reception of the signal of the radio channel CH1. The switch 122-1 is at a fixed state in which the contact connecting to the synthesizer 121-1 is turned on.

The synthesizer 121-3 shown in FIG. 1E receives a control signal causing a local oscillation frequency allow the transmission of the radio channel CH1, from the controller 140. It is assumed that the speed restoring circuit 138 is operating, while the speed restoring circuit 138-2 is being rest.

The switch 122-2 is also at a fixed state in which the contact connecting to the synthesizer 121-3 is turned on. Then, the mobile station sends an originating call control signal as is derived from the telephone section 101, by using the channel CH1. It is further assumed that the speech converting circuit 131 is operating.

The control signal is present in the frequency band shown in FIG. 3A(b), and is sent by using a time slot SUn.

The control signal contained in the time slot SUn contains the following data:
i) ID of the mobile station 100 per se,
ii) ID of the base station 30 whose location registration is stored,
iii) ID of the called station, and
iv) Channel number of the channel used, and time slot number.

Only the time slot SUn is used for the sending of this control signal, and other time zones are not used, and the control signal is sent in burst form. Accordingly, the sending of the control signal has not any adverse effect on other communications. Where the control signal has a relatively low speed, or an amount of data contained in the control signal is too large to set in one time slot, the control signal is sent after one frame or using the corresponding time slot in the next time slot.

To seize the time slot SUn, the following method is employed. The control signal sent from the base station 30 contains a sync signal and a control signal successive to the sync signal, as shown in FIG. 2A(a). The mobile station 100 receives this, and exercises a frame synchronization by using it. The control signal further contains control data, such as a time slot being currently used, and a time slot not yet used (idle time slot indication). In some mobile communication systems, when the time slot SDi (i=1, 2, ..., n) is used by another communication, the control signal sometimes contains only a sync signal and a speech signal. Even in such a case, a time slot not yet used usually contains a sync signal and a control signal. Accordingly, by receiving this control signal, the mobile station 100 can recognize which time slot is to used to send a ringing signal.

In case that all of the time slots are being used, it is impossible to send a call setup signal by using this channel. Accordingly, the mobile station must scan and search another channel.

In other mobile communication systems, there is a case that no radio wave is radiated for idle time slots or that no idle time slot indication is present in any of the time slots. In this case, the mobile station must find an idle time slot by successively checking the presence or absence of voice multiplexed signals SD1, SD2, ..., SDn following it.

Returning to the subject, when receiving a control signal sent from the base station 30 by any of the methods as mentioned above, the mobile station 100 decides which time slot is used to send a ringing control signal and a timing to send the control signal.

Let us consider a case that the time slot SUn for the up signal is an idle time slot. In this case, this idle time slot is used to send the call originating control signal. The mobile station sends the control signal by using the time slot, and picks up a necessary timing from a response signal from the base station 30, and sends a control signal like a burst.

If another mobile station originates a call at the same time as the mobile station under discussion originates the call, the calls will collide with each other. Accordingly, the call setup signal will be sent to the base station 30 in bad condition. In this case, the operation must be redone. A probability of occurrence of the call collision, however, can be set to be satisfactorily small as viewed in the whole mobile communication system. To further reduce the probability of the call collision, the following method may be used. When the mobile station 100 finds an idle time slot that can be used for originating a call, the first half of the idle time slot is used for a mobile station, and the second half for another mobile station. Thus, the entire idle time slot is not assigned to only one mobile station. In other words, the time slot is segmented into a number of time zones. In connection with the segmented time zones, a number of mobile stations are classified into groups. A time zone within one time slot is assigned to each group. In another method to reduce the probability of the call collision, a number of different frequencies of the control signal are prepared. In connection with this, a number of mobile stations are classified into groups. Each frequency of the control signal is assigned to each group of the mobile stations. According to this method, if a plurality of control signals of different frequencies would simultaneously be sent by a single time slot, there will occur no interference among them in the base station. The above two methods to reduce the collision probability may be separately used or both of them may be cooperatively used. In the latter case, the synergism of them can be expected.

A call originating control signal transmitted from the mobile station 100 will be received by a plurality of base stations 30-1 to 30-n, which are located near the mobile station. When detecting an ID (identification number) of the mobile station 100 (S202 and S203), each base station stores it at that time even if the mobile station is not stored or registered, and sends a ringing signal to the gateway exchange 20 (S204 and S205). Like the base station 30, it sends a call setup signal to the gate way exchange 20. At this time, the gateway exchange 20 has received similar signals from other base stations, for example, 30-2, than the base station 30-1. Accordingly, it determines a base station 30 suitable for communication with the mobile station 100 now originating the call, after synthetically considering a traffic and a receiving quality in the current zone. As the result of the consideration, if determination will be made such that the base stations allowed to communicate with the mobile station are those 30-1 and 302, the radio channels will be used are the channel CH1, and the time slots used are time slots 1 and 2 (S206), the gateway exchange sends the determination to the base stations 30-1 and 30-2 (S207). It sends an uncommunicable signal to the base stations or sends no signal and makes a time-out. The base stations 30- 1 and 30-2, which have received an communication instruction signal (S208 and S209), prepare reception of the the radio channel and the time slots. Those base stations sends the instruction as received from the gateway exchanger 20, to the mobile station 100 by using the channel CH1 and the time slot SD1-n (S210 and S211 in FIG. 5B). The instruction signals from the base stations 30-1 and 30-2 reach the mobile station 100 at the same time point and with the same contents. Therefore, there is no danger that the instruction signals interfere with each other. Upon receipt of the instruction signals, the mobile station 100 is placed in a signal reception state using the instructed two time slots SD1-1 and SD1-2. At the same time, the mobile station 100 selects two time slots SU1-1 and SU1-2 for the up radio channel, which correspond to the down time slots SD1-1 and SD1-2n (see FIG. 2A(b)). In the controller 140 of the mobile station 100, the transmitting/receiving interrupt controller 123 is operated and in turn the switches 122-1 and 122-2 are operated (S212). At the same time, the mobile station sends a slot select completion signal to the base stations 30-1 and 30-2 through the up time slots SU1-1 and SU1-2, and waits a dial tone (S213).

A model of a distribution of the time slots including the time slot SU1-1 in the carrier wave of the up radio signal is as shown in FIG. 2B(c). The base station 30 has received the radio signal in which one frame contains up time slots SU1-1 and SU1-n from another mobile station 100, in addition to the time slots SU1-1 and SU1-2.

The base stations 30-1 and 30-2, which have received the slot select completion signal, send ringing signals to the gateway exchange 20 (S214 and S215). Upon receipt of the slot select completion signal, the gateway exchange 20 detects an ID of the mobile station 100, and turns on a necessary switch of the switch group 23 in the exchange 20 (S216), and sends a dial tone (S217). The dial tone is received by the base stations 30-1 and 30-2, and is transferred therefrom to the mobile station 100 (S218 and S219). During the transfer, the same signal contents as instructed from the gateway exchange 20 are transferred. Accordingly, the mobile station 100 enjoys good time diversity receive effects and hence receives the signals in good condition.

Then, the mobile station 100 confirms that a speech path has been established (S200). Under this condition, a dial tone can be heard from the handset of the telephone section 101 of the mobile station 100. Accordingly, the mobile station starts to send a dial signal. The dial signal is applied to the speech converting circuit 131 where it is subjected to the speed conversion process. Then, it is transmitted from the transmitter 132 including the transmitting section 134 and the transmitting mixer 133, through the up time slots SU11-1 and SU1-2 (S221, FIG. 5C).

The transmitted dial signal is received by the radio receiving circuits 35-1 of the base stations 30-1 and 30-2. Responding to the ringing signals from the mobile station 100, the base stations 30-1 and 30-2 have assigned time slots to be used, operated the signal select circuit group 39-1 and the signal allocation circuit group 52-1, received the up time slot SU1-1 or SU1-2, and have been ready for transmitting signals through a down time slot SD1-1 or SD1-2.

The speech path controller 81, under control of the control signal from the controller 40, turns on the switch SWR1-1-1 or 1-1-2 for reception and the switch SWT1-1-1 or 1-1-2 for transmission of the switch group 83 (FIG. 1C). Accordingly, the dial signal sent from the mobile station 100 passes through the signal select circuit 39-1-1 of the signal select circuit group 39-1, and reaches the signal restoring circuit 38-1-1 of the signal restoring circuit group 38-1. In this circuit 38-1-1, the original signal is restored, and is transmitted in the form of a speech signal 22-1 through the switch group 83 and the signal processor 31, to the gateway exchange 20 (S222 and S223). In this way, a speech path connecting to the telephone network 10 is set up (S224).

In each of the base stations 30-1 and 30-2, an input signal from the gateway exchange 20 (a control signal, and then a speech signal after a speech communication initiates) passes through the switch SWT1-1-1 or 1-1-2 of the switch group 83, and enters the signal speed converting circuit 51-1-1 of the signal speed converting circuit group 51-1. It is subjected to a speed conversion process. Then, it is input to the signal allocation circuit 52-1-1 of the signal allocation circuit group 52-1. In the signal allocation circuit 52-1-1, time slots SD1-1 and SD1-2 are allocated to the signal. Then, the signal is transferred to the mobile station 100 by using the time slot SD1-1 or SD1-2 of the down radio channel, from the radio transmitting circuit 32. At this time, in the mobile station 100, the time slot SD1-1 or SD1-2 of the radio channel CH1 is ready for the signal reception. The signal from the base station is received by the radio receiving circuit 135, and is input to the signal speed restoring circuit 138. In this circuit, the original signal as transmitted is restored, and is input through the signal mixer 152 to the handset of the telephone section 101. In this way, a speech initiates between the mobile station 100 and the ordinary handset within the public telephone network 10 (S225).

At the end of speech communication, the handset of the telephone section 101 in the mobile station 100 is placed on-hook (S226). Then, an on-hook signal from the controller 140 are applied through the signal speed converting circuit 131 to the radio transmitting circuit 132. From the circuit 132, those signals are sent to the base stations 30-1 and 30-2 (S227). The controller 140 stops the operation of the transmitting/receiving interrupt controller 123, and sets the switches 122-1 and 122-2 to the output terminals of the synthesizers 121-1 and 121-2.

When the controller 40 of each of the base stations 301 and 30-2 receives the on-hook signal from the mobile station 100, it sends the on-hook signal to the gateway exchange 20, to turn off the switch SWR1-1-1 or 1-1-2, and switch SWT1-1-1 or 1-1-2. Here, the speech communication ends (S228 and S229). At the same time, the signal select circuit group 39 (39-1) and the signal allocation circuit group 52 (52-1) in each of the mobile stations 30-1 and 30-2 are released. In the gateway exchange 20 as received the on-hook signal, the related switch in the switch group 23 is turned off and the speech communication ends (S230).

In the description thus far made, the control signal as transferred between the base station 30-1 or 30-2 is not passed through the signal speed converting circuit group 51-1, the signal speed restoring circuit group 38-1, and the like. It is understood that such a description was made for ease of explanation, and if it is passed through the signal speed converting circuit group 51-1, the signal speed restoring circuit group 38-1, and the signal processor 31, the communication can be carried out smoothly.

(3) Incoming Call Operation

A terminating operation of the mobile station 100 will be described with reference to FIGS. 6A to 6D cooperatively showing a flowchart.

It is assumed now that the mobile station 100 is in a stand-by state while power is being on. Under this condition, the mobile station 100 has completed the location registration, and is waiting for the incoming call except when it originates a call. Under this condition, the mobile station 100 is waiting for an incoming control signal as will be transmitted from the base station 30 located near the mobile station. This waiting mode differs for different mobile communication systems used, as follows.

i) System where a radio channel used exclusively for control is provided.

In this system, the base station 30 or the gateway exchange 20 sends to the mobile station 100 a control signal containing instructions, through each time slot of the control channel or channels. In case where a plurality of control channels are used, a control channel at which the mobile station 100 is set when waiting for an incoming signal is instructed. In case where a single control channel is used, a time slot at which the mobile station 100 is set when waiting is instructed. Thus, the mobile station waits for a signal in accordance with the instruction.

ii) System where the radio channel is used for both the control and the speech.

In this system, in accordance with a waiting method as previously set up for the system, the mobile station waits for incoming signals while being set at an idle time slot of a speech channel. The waiting methods follow.

In a mobile communication system in which only one radio channel is allocated to the base station 30, an idle time slot is searched, and the mobile station waits for an incoming signal while being set at a time slot (e.g., SD1-1) as instructed by a control signal contained in the idle time slot. When no instruction is given in particular, the mobile station waits for an incoming signal by using a time slot of a low number.

In a mobile communication system in which a plurality of radio channels are allocated to the base station 30, there is a case that the radio transmitting circuits 32-1, . . . , 32-n (in FIG. 1C, only two circuits 32-1 and 32-2 are illustrated for easy of illustration) of the radio base station 30 use down radio channels CH1 (frequency F1), CH2 (frequency F2), . . . , CHn (frequency Fn), and the radio receiving circuits 35-1, 35-2, . . . , 35-n (in FIG. 1C, only two receiving circuits 35-1 and 35-2 are illustrated for ease of illustration) use up radio channels CH1 (frequency f1), CH2 (frequency f2), . . . , CHn (frequency fn). In this case, any of the following three waiting modes is used.

i) A specific idle time slot of the radio channel is instructed by a control signal contained in the radio channel.

The above instruction is constantly or intermittently instructed from the idle time slots of all the channels transmitted from the base station 30.

ii) The mobile station enters a receive mode for a radio channel (referred to as a channel CH1), such as a radio channel of a low number and a time slot of a low number as transmitted from the base station 30, in a procedure as preset in each system. This can be realized by seizing a sync signal in the time slot SDi shown in FIG. 2A(a). Let consider a case where of those channels transmitted from the base station 30, a channel and a time slot for which the receive mode of the mobile station is set up is the channel CH1 and the time slot SD1-1. In this case, the controller 140 sends to the synthesizer 121-1 a control signal which causes the synthesizer to generate a signal of such a local oscillating frequency as to allow the reception of the channel CH1. The switch 122-1 is also set to the synthesizer 121-1.

iii) The gateway exchange 20 and the base station 30 do not issue the instruction as mentioned above, but at the time of receiving calls, simultaneously send ringing signals by using the idle time slots of all the radio channels. This method is advantageous in low cost and reliable signal transmission, although the frequency utilization of the method is somewhat poor.

It is assumed that under this condition, a incoming call signal destined for the mobile station is applied from the public switched telephone network 10 travels through the exchange 11 to the gateway exchange 20. The gateway exchange 20 searches the ID memory 24, and recognizes that the mobile station 100 is currently registered in the base stations 30-1 and 30-2. Accordingly, it prepares for sending a incoming call originating signal to the mobile station 100. Specifically, it determines the base station 30 to be used for communication on the basis of the traffic in the base station 30, a signal quality at the time of storing the registration information of the mobile station, and the like. If the base stations 30-1 and 30-2 are determined to be used for communication, the gateway exchange sends a incoming call signal to the base stations 30-1 and 30-2 by using the channel CH1 and the idle time slot SD1-1 to which the mobile station 100 has been set in order to receive an incoming signal (S251, FIG. 6A).

In the base stations 30-1 and 30-2, this signal, like the speech signal, is transferred, as communication signals 22-1 to 22-m, through the switch group 83, the signal speed converting circuit groups 51-1 and 51-2, and the signal allocation circuit groups 52-1 and 52-2, to the controller 40 (FIG. 1C).

Upon receipt of the signal, the controller 40 instructs the speech controller 81 to find the transmitting and receiving switches SWT and SWR, and to turn on them and keep their on state. Further, it sends a signal to the mobile station 100 by a procedure as instructed by the gateway exchange 20 (S252 and S253).

In this instance, the procedure is such that the base stations 30-1 and 30-2 send the same signals at the same time by the same channels CH1 and time slots SD1-1. Each of those signals that are the same is, for example, an ID signal of the mobile station 100 +a signal for indicating a incoming call signal. The description thus far made refers mainly to the base station. 30-1. The same operation is correspondingly applied for the operation of the base station 30-2.

In the mobile station 100 having received this signal, the signal is transferred from the receiving section 37 of the radio receiving circuit 135 to the controller 140. The controller 140 recognizes that the signal is a incoming call signal designated for the mobile station 100 of it (S254), and sends the ID of the mobile station per se as an acknowledgement signal back to the base stations 30-1 and 30-2 by using the time slots SU1-1 and SU1-2 (S255).

After receiving a call resignating response signal from the mobile station 100, the base stations 30-1 and 30-2 each check the ID and make a quality check (S256 and S257), and send the call terminating response signal and those items of data as well to the gateway exchange 20 (S258 and S259).

There is the possibility that the call resignating response signal from the mobile station 100 is received not only by the base stations 30-1 and 30-2 but also other base stations near the mobile station 100, for example, the base station 30-1. In case where after completing the location registration, the the mobile station fails to update the registered data, the other base stations 20 than the stations 30-1 and 30-2 may receive the call resignating response signal in good condition rather than the stations 30-1 and 30-2. The reason for this is that the mobile communication system is systematized such that the base stations 30 constantly monitor the idle time slots in the radio channels, and if they receive a call originating or a call resignating response signal from a mobile station, they must immediately take necessary actions. In the case of the call resignating response signal, the action is to report the reception of the call resignating response signal to the gateway exchange 20.

The call resignating response signal, which reaches the gateway exchange through the above system operation, sometimes contains the ID of the base station 30 not yet stored or registered, in addition to the mobile station 50. To cope with this, when receiving the call resignating response signal, the gateway exchange 20 checks as to whether or not the ID of the mobile station 100 has been stored in the ID memory 24. If it is not stored, the gateway exchange stores it, together with the quality check data, in the ID memory 24, and sends the location registration signal, together with the ID data stored, to the base stations 30. The subsequent operation is similar to those of the base stations 30-1 and 30-2 already registered.

Returning to the subject matter, after receiving the call resignating response signal from a plurality of the base stations 30, the gateway exchange 20 checks the ID (S260), determines a base station to be used for communication, a radio channel, a time slot, and the like, and send the result of determination to the base stations 30-1 and 30-2 (S261, FIG. 6B).

The base station 30-1, for example, which received the determination result, checks if the ID of the mobile station 100 has been correctly registered (S262 and S263), checks if the channel and the time slot as designated by the gateway exchange 20 are idle, and if the current channel and time slot are to be changed to the designated ones (S264 and S265). Then, it sends a channel/time slot designated signal to the mobile station 100 by the down speech channel CH1 and the time slot SD1-1 (S266 and S267).

In the mobile station 100 which receives the channel/time slot designated signal (S268), if it confirms that the time slot of the designated channel is idle (S269), the current time slot is changed to the time slot of that channel, and a channel/time slot switch completion signal is sent by using the up channel CH1 and the time slot SU1-1 (S270, FIG. 6C). A response to a time slot designated signal as transmitted from another base station 30 is processed in a similar way.

In the base station 30-1, for example, which recognizes the switch to the idle time slot (S271 and S272), the current channel and time slot of the base station per se are switched to the switched time slot, and a channel/time slot switch completion report is sent to the gateway exchange 20 (S273 and S274).

In the gateway exchange 20 which receives the channel/time slot switch completion report signal, in order to set up a speech path connecting through the exchange 11 to the telephone network 10, the speech controller 21 is operated to turn on a related switch SW in the switch group 23, thereby to connect the base stations 30-1 and 30-2 to the telephone network 10 (S275). Responsively, the telephone network 10 sends a ringing signal through the exchange 11 and the gateway exchange 20 (S276), and this is confirmed by the base stations 30-1 and 30-2 (S277 and S278). Then, the ringing signal is sent through the speech channel CH1 and the time slots SD1-1 and SD1-2 (S279 and S280), and a ring back tone is produced to ring a bell in the mobile station (S281).

Hearing the ringing, a handset is picked up (off-hook) (S282, FIG. 6D), and then an off-hook signal is sent through the channel CH1 and the time slots SU1-1 and SU1-2, and is repeated by the base stations 30-1 and 30-2 (S283 and S284) to the gateway exchange 20 (S285). In the exchange, the switches SW1-1-1 and SW2-1-1 have been turned on. Accordingly, a speech initiates between the telephone network 10 and the mobile station 100 by using the speech channel CH1 and the time slots SD1-1 and SU1-1, and the up frequency F1 and the down frequency f1 between the mobile station 100 and the base station 30-1. and the speech channel CH1 and the time slots SD1-2 and SU1-2, and the up frequency F1 and the down frequency f1 between the mobile station 100 and the base station 30-2.

After the speech ends, the handset is put on the telephone set, and an on-hook signal and a call terminating signal are sent to the base stations 30-1 and 30-2 by way of the channel CH1 and the time slots SU1-1 and SU1-2 (S287). The base stations 30-1 and 30-2 confirm the call termination, and repeat the signals to the gateway exchange 20 (S288 and S289). Upon receipt of those signals, the gateway exchange 20 drives and causes the communication controller 21 to turn off the switch SW thus far used in the switch group 23, and the call is terminated (S290).

In the above description, the same channel CH1 is used for both the base stations 30-1 and 30-2. If required, different channels may be used. In some mobile communication systems, it is sometimes impossible to use the same channel in the adjacent zones. For such a system, the channels CH1 and CH2 may be used. In this case, in the synthesizers 121-1 and 121-3 shown in FIG. 1E, the local oscillating frequencies for the channels CH1 and CH2 must be generated at preset timings. A quick response operation is required. In this respect, the arrangements of FIG. 1B and 1D are easy in the operation.

(4) Handover

There will occur such a situation that when a vehicle or a person carrying the mobile station 100 moves or walks, the mobile station 100, which has engaged the communication with the base stations 30-1 and 30-2, must change the speech (communication) channel connecting to those base stations to another speech channel connecting to a new base station 30- 3, for example. Description to follow is the operation of handover which means to switch the old speech channel to the new speech channel. The fact that the interrupt resulting from the channel switch, which is essential to the present invention, will never occur, will also be described.

It is assumed that the mobile station 100 is engaging the communication with the base stations 30-1 and 30-2 by using the synthesizers 121-1, the radio receiving circuit 135, and the radio transmitting circuit 132, and by way of the up time slots SU1-1 and SU1-2 and the down time slots SD1-1 and SD1-1 and SD1-2 of the channel CH1. The mobile station moves apart from the base stations 30-1, and approaches to the base station 30-3. With increase of the distance between the mobile station 100 and the base station 30-1, the speech quality gradually becomes poor. In the gateway exchange 20 of FIG. 1A, the S/N monitor 25 detects the deterioration of a quality of the signal transmitted from the mobile station 100 (specifically detects drop of the signal level below a signal level L1). The level L1 is selected to be above a minimum level quaranteeing a satisfactory line quality. It sends to all of the base stations near the mobile station a request signal that requests them to measure a signal quality of the signal transmitted from the mobile station.

In response to the request, each base station sends a measured value of signal quality to the gateway exchange 20. The S/N monitor 25 of the gateway exchange 20 starts to compare the measured level of signal quality with a reference level L2 of signal quality. It is assumed now that the result of the comparison shows that the measured level of the base station 30-2 is the highest, and is above the reference level L2 (L2>L1). Under this condition, the gateway exchange judges that the mobile station moves to enter a service zone (zone 3) of the base station 30-3, and decides to cause the mobile station to switch the channel to a new one. Then, the gateway exchange searches a speech channel containing an idle time slot, and finds that it is the channel CH1. The gateway exchange sends a control signal to the mobile station 100 by using the time slots SD1-1 and SU1-1 of the down radio channel CH1 being currently used, and the control signal instructs the mobile station to prepare for the communication by way of time slots SD1-3 and SU1-3, for example, of the radio channel CH1.

At the same time, the gateway exchange instructs the radio base station 30-3 to make a communication by way of the time slot SD1-2 and SU2-2 of the radio channel CH1. After issuing those instructions, the gateway exchange simultaneously turns on the switches SW1-1-1, SW2-1-1, and SW3-1-1 of the switch group 23, and starts to send the same speech signal as that of the base stations 30-1 and 30-2 to the base station 30-3. As a matter of course, the modulation depth, length of the time slot, the number of time slots within one frame, timings of radio channels are set to be equal to one another in those three base stations.

To realize the transmission of the control signal, in case that the control signal takes an analog form, as shown in FIG. 2E(a), a low frequency fD0 outside the frequency band of the speech channel, which ranges from 0.3 to 3.0 kHz, or higher frequencies fD1, fD2, . . . , fD8 (8 waves from 3.8 kHz to 4.5 kHz in 0.1 kHz steps).

When the number of items to be controlled, i.e., controlled data, is large, the number of control waves fD0 to fD8 may further be increased. To cope with the same, a sub-carrier system may be employed. In this case, if one or more waves of the eight waves is frequency modulated or amplitude modulated, a further increased number of control data may be transmitted.

In case where the control signal is a digital data signal, an approach is possible in which the voice signal is also digitized, and both the signals are transmitted in time divisional manner. The scheme of this approach is shown in FIG. 3E(b). As shown, a voice signal is applied to a digitizer 91 where it is digitized. The digitized voice signal and the data signal are applied to a time-division multiplexing circuit 92, and the multiplexed signal is applied to a modulation circuit of the transmitter 31.

Figure 2D:
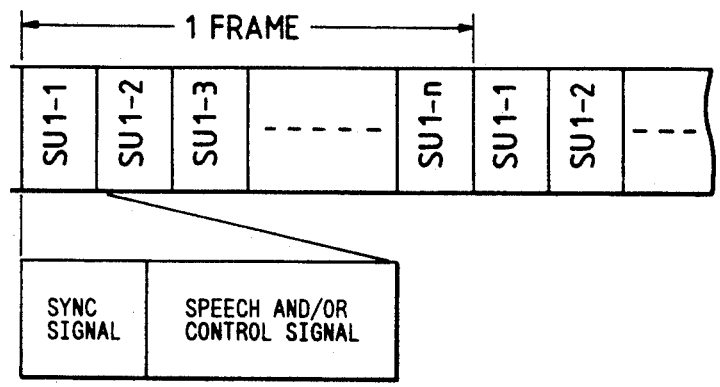
Figure 2D:
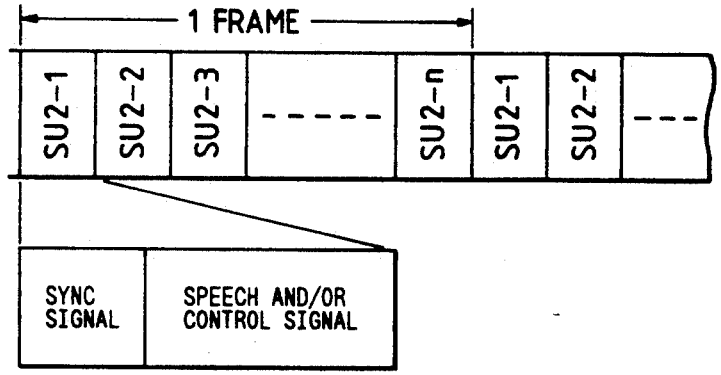
Figure 2D:
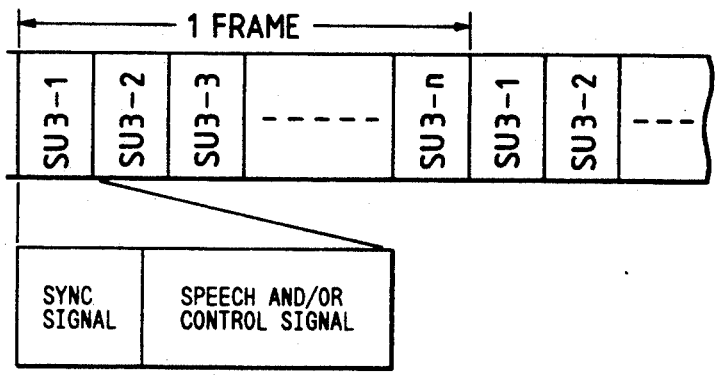
Figure 2E:
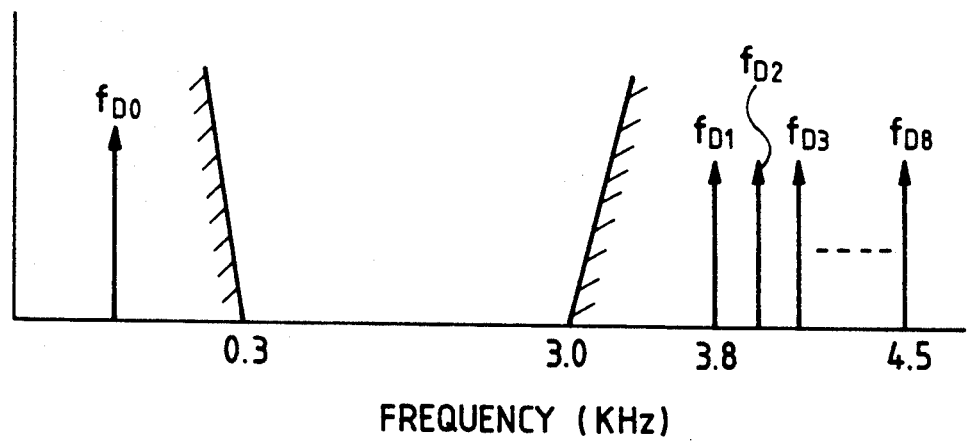
FIGS. 2E(a) and 2E(b) show a spectral diagram and a circuit arrangement, which are useful in explaining a structure of a control signal used in the present invention.
Figure 2E:
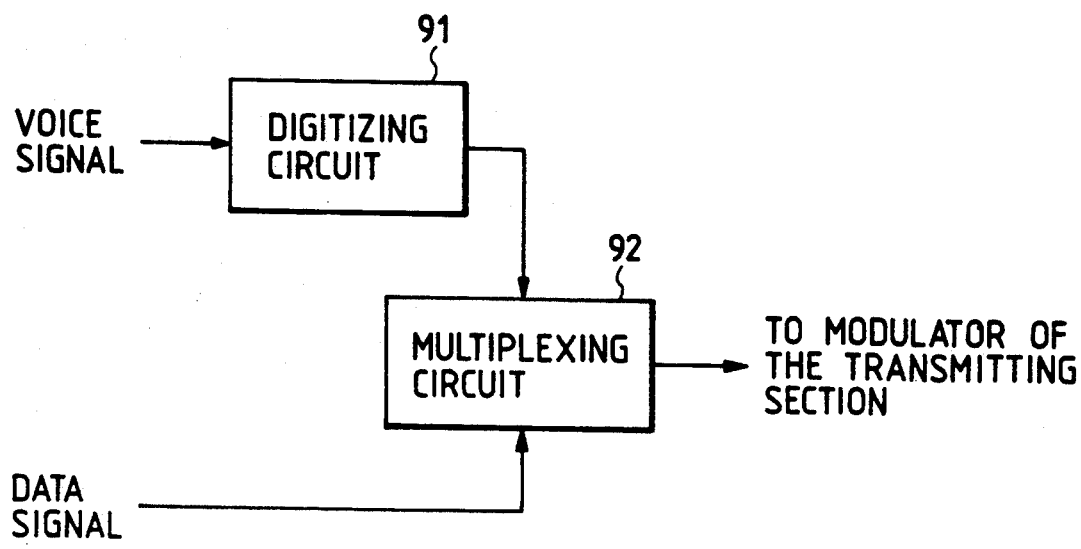

Timing charts describing an operation of the instant mobile communication system before and after the channel is switched are shown in FIGS. 2C and 2D.

In FIG. 2C(c) or 2C(d), the down time slot SD1-1 or SD2-2 are contained in the radio channel CH1 which is used by the base station 30-1 or 30-2 when it sends a signal to the mobile station 100. Other time slots (including idle slots) are used for communicating with other mobile stations. Similarly, in FIG. 2C(e), the time slot SD3-3 is a time slot of the radio channel CH1 which is used by the base station 30-3 to be used for communication, when it transmits a signal to the mobile station 100.

FIGS. 2D(f) to 2D(h) show the formats of signals responsively transmitted by the mobile station when it receives the output signals shown in FIGS. 2C(c) to 2C(d). Accordingly, the time slots used are SU1-1 (CH1), SU2-2 (CH1), and SU3 (CH1). Other time slots (including idle time slots) are used for other communications.

The S/N monitor 25 of the gateway exchange 20 detects that the line quality of the time slots SD1-1 and SU1-1 of the channel CH1 used between the base station 30-1 and the mobile station 100 is deteriorated below the level L1 (see FIGS. 2C(c) and 2D(f)). Upon detection of the quality level, the gateway exchange 25 instructs, by using the time slot SD1-1 of the channel CH1, the mobile station 100 to prepare for receiving a signal transmitted from the base station 30-3 by using the time slot SU3-3 of the radio channel CH1 together with the signals from the former base stations.

In response to the instruction, the controller 140 of the mobile station 100 causes the synthesizer 121 to generate a signal of such a frequency as to allow the reception of a signal of the frequency F1 of the channel CH1 containing the time slot SD3-3 as transmitted from the radio station 30-3. Up to this point, the mobile station 100 has received a signal transmitted from the base station 30-1 and 30-2 through the time slots SD1-1 and SD2-2, by using only the synthesizer 121.

As the result of the quality deterioration of the time slot SD1-1 of the channel CH1 as transmitted from the base station 30-1, the base station 30-3 transmits a radio wave through the time slot SD3-3 of the channel CH1. In the mobile station 100, the transmitting/receiving interrupt controller 123 responsively operates to repetitively operate the switch 122-1. At the same time, only the synthesizer 121-1 is operated to switch the operating mode of the mobile station from the present mode to a new mode. In the present mode, the mobile station has communicate with the base station 30-1 and 30-2 by using the time slots SU1-land SU2-2 of the radio channel CH1. In the new mode, the mobile station is ready for transmitting a signal to the base station 30-3 by using the time slot SU3-3 of the channel CH1 of frequency F1. The output signals of the synthesizers 121-1 d 121-3 to be used for this transmission are repetitively switched by the switch 122-2 in response to the signal from the transmitting/receiving interrupt controller 123.

This switch transmitting/receiving period that the time slots SU1-1, SU2-2 and SU3-3 of the channel CH1 are concurrently used, continues until the gateway exchange 20 confirms the time slot SU3-3 of the channel CH1 and the fact that the quality level of the channel is above the reference quality level L2. Then, the gateway exchange 20 releases the time slots SD1-1 and SU1-1 of the channel CH1, and the communication between the mobile station 100 (B) and the base stations 30-2 and 3-3 will uninterruptively continue by only using the time slots SD2-2 and SD3-3 and SU2-2 and SU3- 3 of the channel CH2.

A switching frequency fs of the switch 122-1 or 122-2 during the switch transmitting/receiving period is different for different mobile communication systems. The frequency fs is given by $$fs = (nT1)^{-1}$$

where "n" indicates number of time slots within one frame contained in the radio channel CH1, and T1, a time duration of one time slot.

FIG. 7A to 7D cooperate to form a flowchart showing an operation flow of the instant mobile communication system when the handover is operated.

It is assumed that the gateway exchange 20, the base stations 30-1 to 30-3, and the mobile station 100 start to operate, the switches SW1-1-1 and SW2-1-1 of the switch group 23 in the gateway exchange 20 are in an on state, and the mobile station is communicating with the base stations 30-1 and 30-2. For the communication, the the time slots SD1-1, SD2-2, SU1-1, and SU2-2 of the radio channel CH1 of down frequency F1 and up frequency f1, as instructed by the communication controller 21 in the gateway exchange 20, are used (S101, FIG. 7A). The base stations 30-1 and 30-2 engaging the communication constantly sends a report describing a receive state from the mobile station 100 (S102). Responsive to the report, the S/N monitor 25 of the gateway exchange 20 monitors the speech quality to check as to if it is below the level L1 (S103). If the speech quality is below the level L1 (S103, YES), the communication controller 21 instructs the base stations 30 located near the base station 30-1 to monitor the signal of the time slot SU1-1 of the up frequency f1 which is currently used for the communication between the base station 30-1 and the mobile station 100 (S104).

Each base station 30 (e.g., 30-1) receiving the monitor instruction receives and monitors the time slot SU1-1 of the frequency f1 (S105), and reports the monitor result to the S/N monitor 22 of the gateway exchange 20. The monitor 22 measures the speech quality of each base station 30, and compares it with the reference quality level L2, and detects that the quality is better than the level L2, and conforms that the communication is good (S107, YES).

Figure 7A:
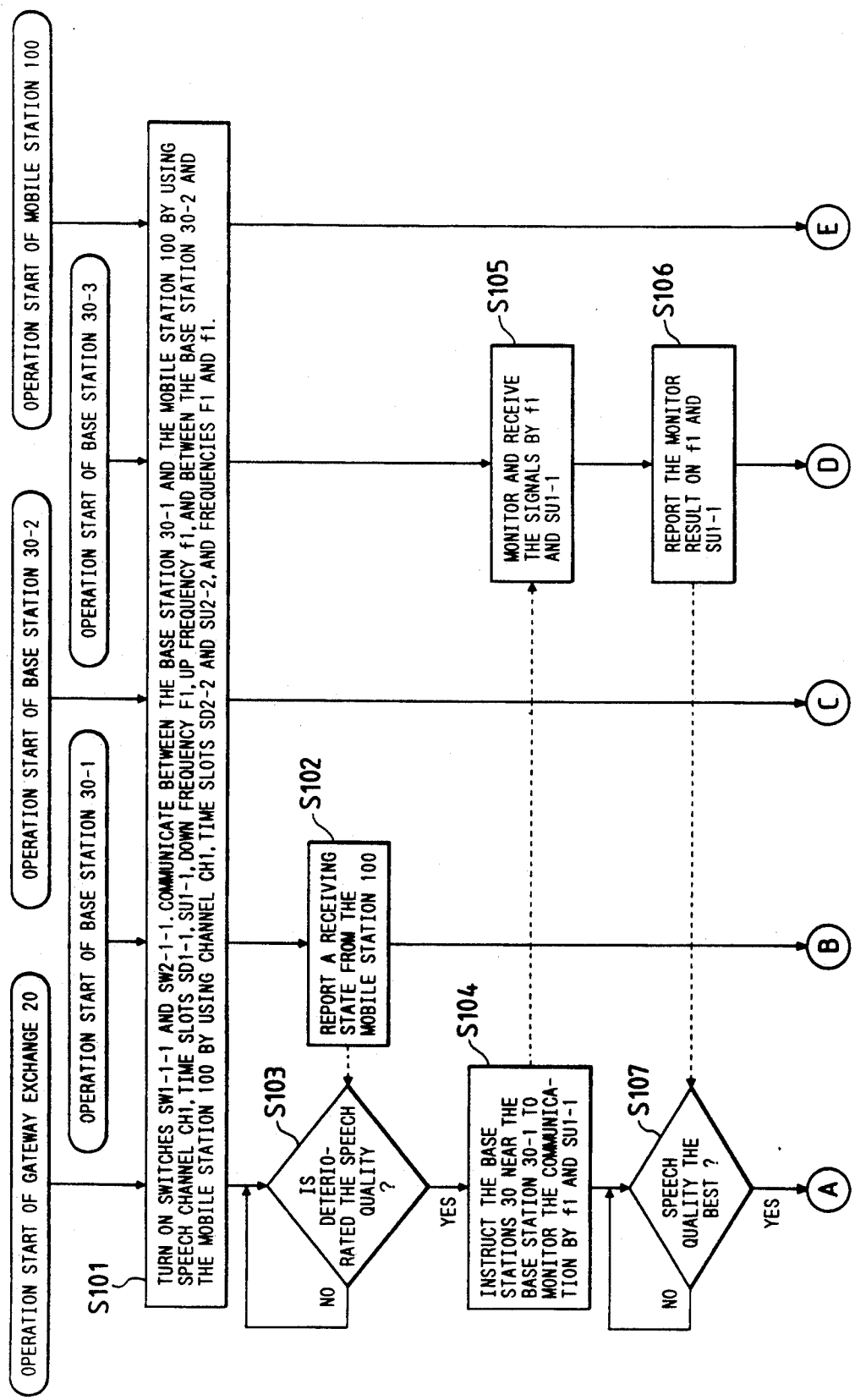
Figure 7B:
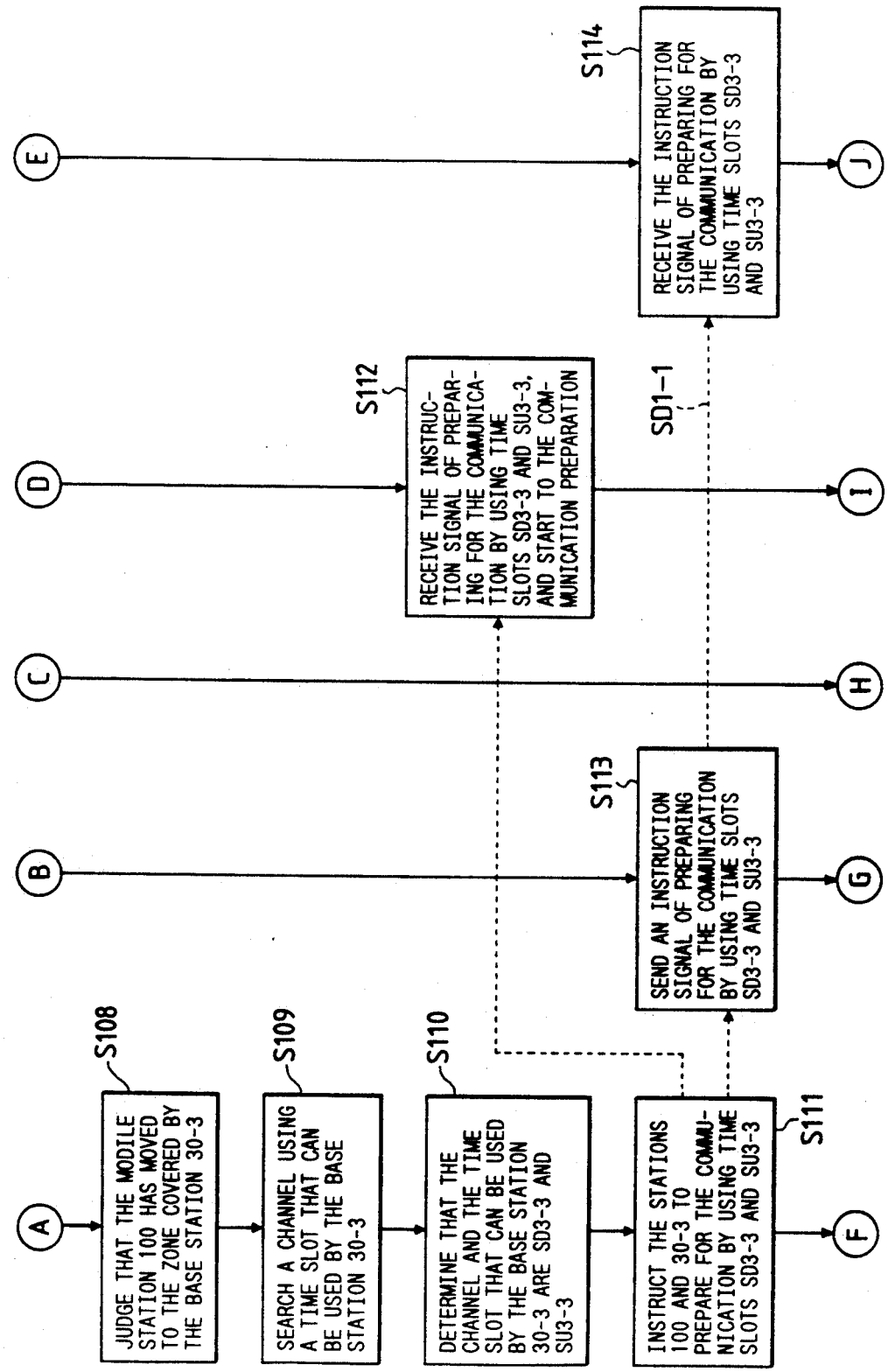
Figure 7C:
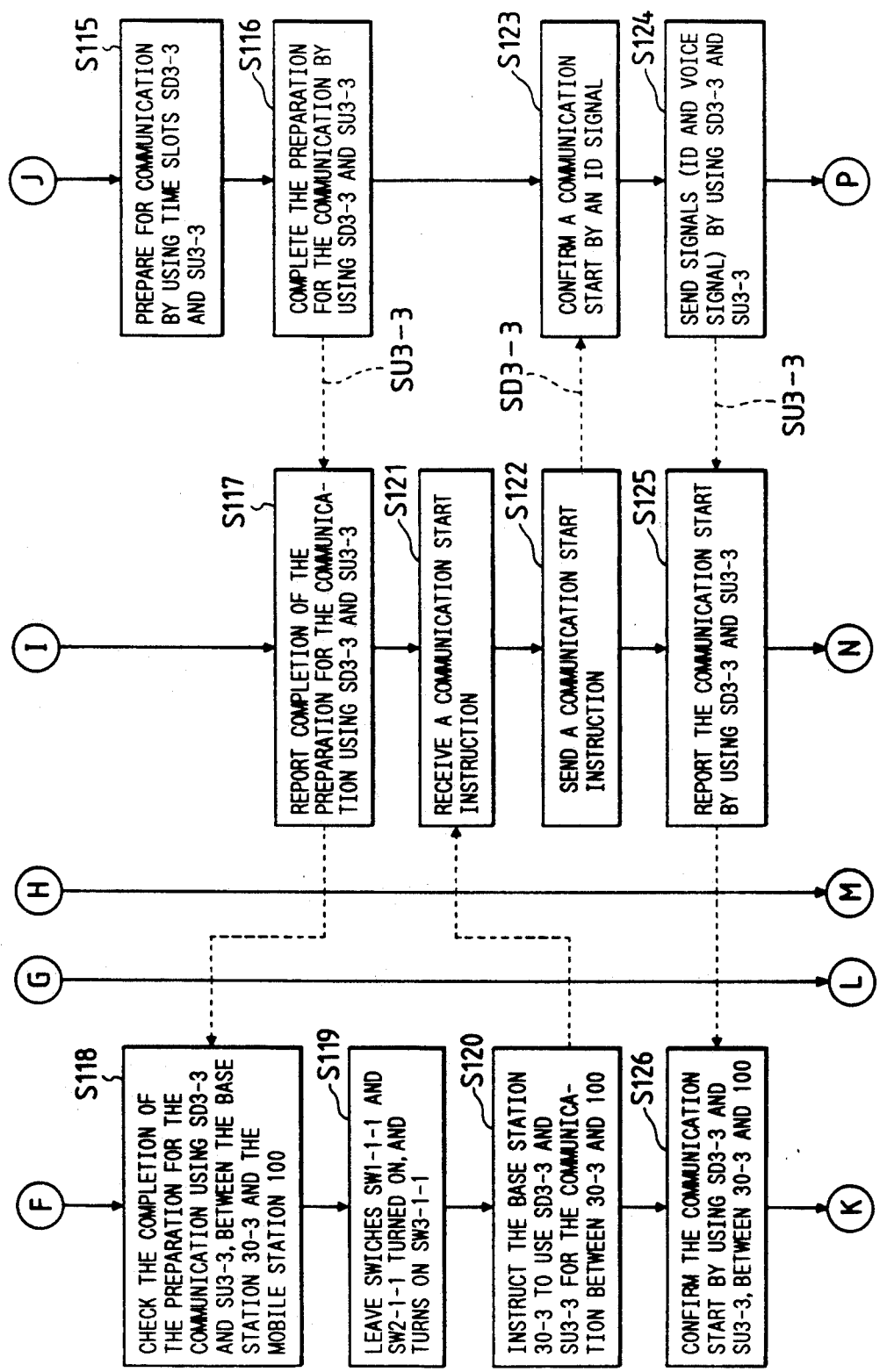
Figure 8C:
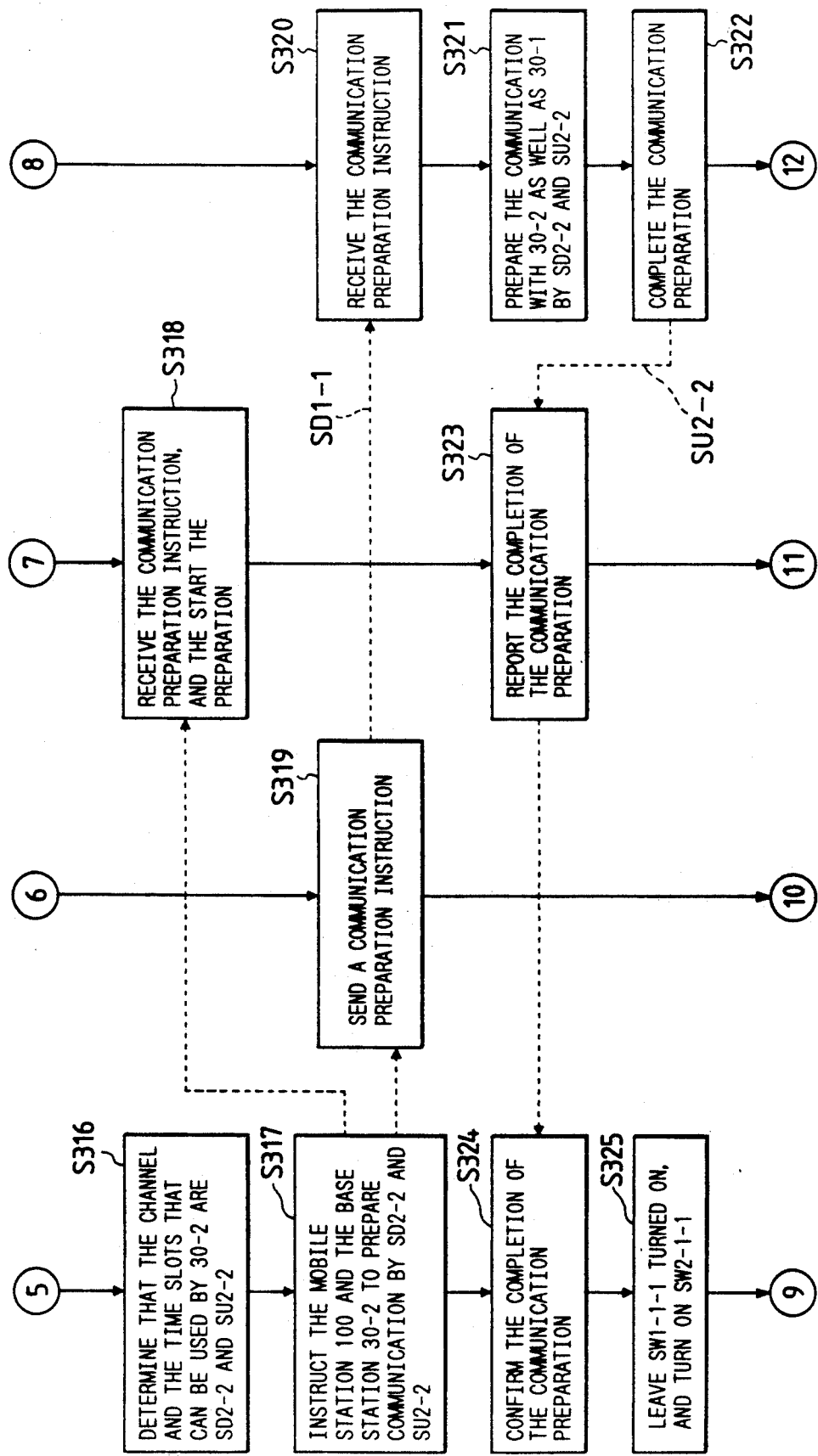
Figure 8D:
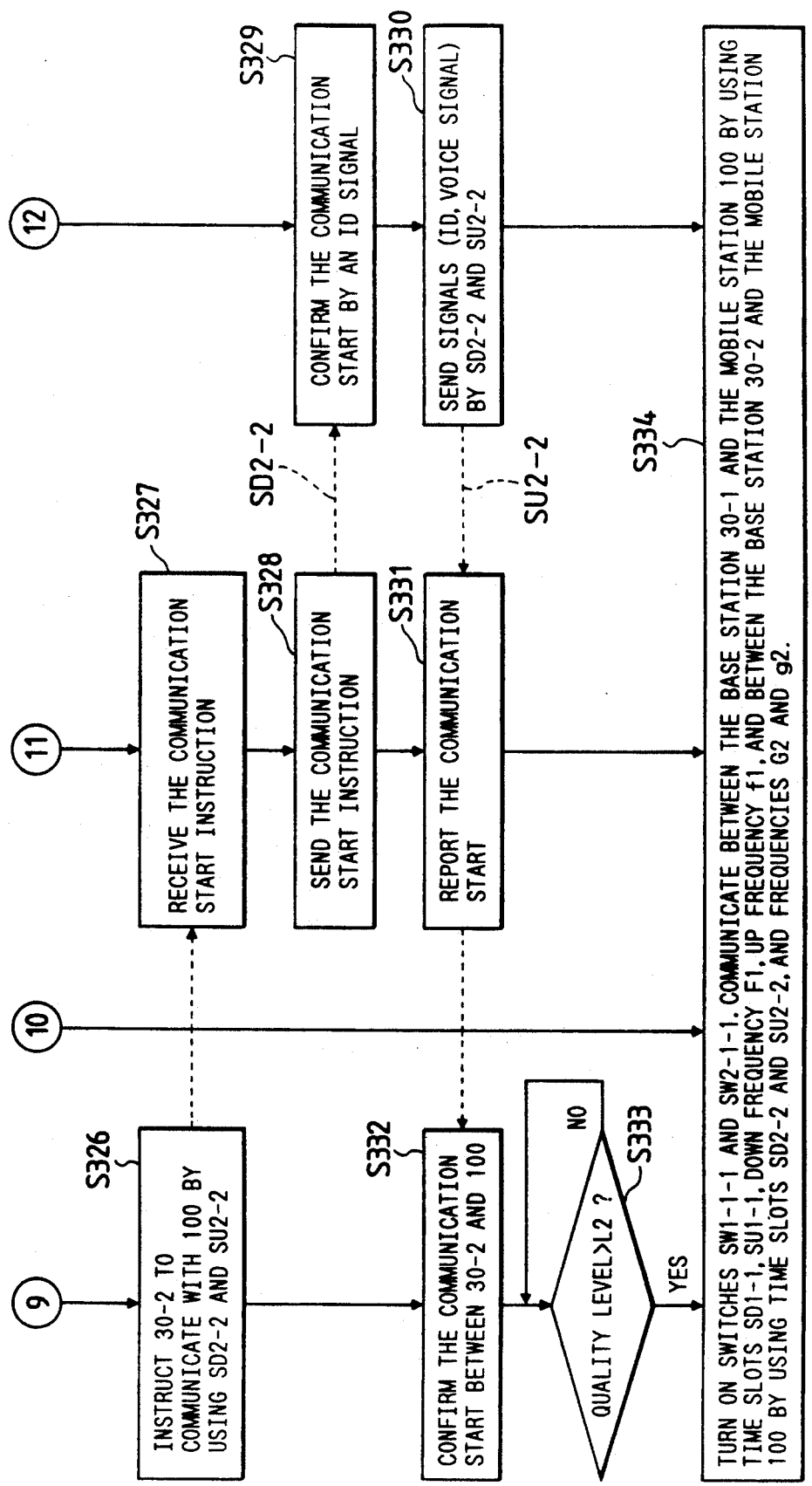

From this fact, the communication controller 21 judges that the mobile station 100 has moves from the zone covered by the base station 30-1 to a zone by the base station 30-3 (S108, FIG. 7B). To change the communication with the base station 30-1 to that with the base station 30-3, the communication controller searches a channel containing an idle time slot that can be used by the base station 303 (S109), and selects time slots SD3-3 and SU3-3 of the channel CH1 (S110). Then, the communication controller 21 sends an instruction signal to the controller 140 which in turn instructs the transmitter 132 and the receiver 135 in the mobile station 100 to prepare for communication using the time slots SD3-3 and SU3-3 of the channel CH1 (S111).

The communication preparation instruction to use the time slots SD3-3 and SU3-3 of the channel CH1 is sent to the base station 30-3, which in turn prepares for communication using the time slots SD3-3 and SU3-3 of the channel CH1 (S112). At the same time, this instruction is sent from the base station 30-1 by using the time slot SD1-1 of the channel CH1 (S113). The mobile station 100 receives the communication preparation instruction to use the time slots SD3-3 and SU3-3 of the channel CH1 of the frequency F1 (S114). Upon receipt of the instruction, the mobile station enters the preparation for the communication using the time slots SD3-3 and SU3-3 of the channel CH2. More specifically, the controller 140 instructs the synthesizers 121-1 and 121-2 to continue the state that communication is allowed with the reception by the frequency F1 and the transmission by the frequency f1. The transmitting/receiving interrupt controller 123 enters the operation using the time slots SD3-3 and SU3-3 (S115, FIG. 7C).

Upon completion of the preparation for the communication using the time slots SD3-3 and SU3-3 of the channel CH1, the mobile station 100 sends a report completing the preparation to the base station 30-3 by using the time slots SD3-3 and SU3-3 of the channel CH1 (S116). When receiving the report, the base station 30-3 confirms that the preparation for the communication using the time slots SD3-3 and SU3-3 of the channel CH1 is completed in the base station per se, and sends a report of completing the preparation to the gateway station 20 (S11).

When the gateway exchange 20 confirms the completion of preparing for the communication using the time slots SD3-3 and SU3-3 (S118), it leaves the switches SW1-1-1 and SW2-1-1 turned on, and turns on the switch SW3-1-1 (S119). Then, the communication controller 21 contained in the gateway exchange 20 instructs the base station 30-3 to initiate the communication with the mobile station 100 using the time slots SD3-3 and SU3-3 (S120).

When receiving the communication initiating instruction (S121), the base station 30-3 sends the instruction by using the time slot SD3-3 (S122). The mobile station 100 confirms the initiation of the communication using the time slots SD3-3 and SU3-3 by an ID signal as an identification signal to identify the mobile station (S123), and sends a communication signal containing the ID signal (S124). When receiving the communication signal, the base station 30-3 sends a report of the communication initiation using the time slots SD3-3 and SU3-3 (S125).

In the gateway exchange 20 receiving the report, the S/N monitor 25 confirms the communication initiation using the time slots SD3-3 and SU3-3 (S126), and measures a quality level of the communication between the mobile station 100 and the base station 30-3. When it is above the reference quality level L2 (S127, YES, FIG. 7D), it instructs the base stations 30-1 and 30-3 to stop the communication having been done between the base station 30-1 and the mobile station 100 (B) using the time slots SD1-1 and SU1-1 (S128).

In response to the instruction, the base station 30-1 stops the communication using the time slots SD1-1 and SU1-1 of the channel CH1 (S129). When receiving the instruction to stop the communication using the channel CH1, the base station 30-3 transfers it to the mobile station 100 (S130). Upon receipt of the instruction (S131), the mobile station 100 turns on and off the switch 122-2 at a preset timing, so that only the time slots SD2-2, SD3-3, SU2-2 and ST3-3 of the channel CH1 are valid. The, it sends a report stopping the communication using the time slot SU1-1 of the channel CH1 by using the time slot SU3-3 of the channel CH1 (S132). Upon receipt of the report, the base station 30-3 transfer the report of stopping the communication using the time slot SU1-1 of the channel CH1 (S133).

In the gateway exchange 20 receiving the report of stopping the communication using the time slot SU1-1 of the channel CH1, the communication controller 21 leaves the switches SW2-1-1 and SW3-1-1 of the switch group 23 turned on, and turns off the switch SW1-1-1 (S134).

At this time point, the period of the channel switch operation terminates, and the mobile station 100 can uninterruptively and noiselessly communicate with the base stations 30-2 and 30-3 by using the channel CH1, down frequency F1 and up frequency f1, with the switches SW2-1-1 and SW3-1-1 being turned on (S135).

In the description thus far made, when a channel being busy is switched to another one, the same radio channel may be allocated to the adjacent zones. The reason for this follows. In the time division communication system like the present invention, even if a small zone architecture is employed, and the same radio channel is used for the two adjacent zones, in the case of the system in which no radio wave is transmitted through an idle time slot, no radio interference occurs if the time slots are different, as already described. It is evident that the present invention is applicable for a mobile communication system which prohibits one radio channel from being repeatedly used within a zone as employed in the conventional small zone architecture.

As for the channel switch operation as already mentioned, in the circuit arrangement of the mobile station 100 shown in FIG. 1E, one radio receiving circuit 135 and one transmitting circuit 132 are used. In handover operation, the speech signals of the time slots in the three channels, old and new, that are concurrently used, are processed. In this case, if the allocated time slots of the old and new channels of three have the same timings (e.g., the time slots SD1-1 and SD2-1 in FIG. 2C, and the time slots SU1-1 and SU2-1 in FIG. 2D), a cross modulation will occur in each of the transmitting-/receiving mixers 133 and 136, possibly deteriorating the communication quality. To prevent this, it should be avoided to allocate the time slots of the same timings. The same thing is true for the mobile station 100 as arranged as shown in FIG. 1B.

In case where the time slots of the same timings must be allocated, the mobile station as shown in FIG. 1D is used. As shown, a couple of radio transmitting circuits 132-1 and 132-2, and a couple of radio receiving circuits 135-1 and 135-2 are used in the mobile station. Accordingly, no radio interference will occur. Additionally, the simultaneous transmitting/receiving diversity can be carried out.

(5) Transmitting/Receiving Diversity Between a Mobile Station and a Plurality of Base Stations FIGS. 8A to 8D cooperate to show a flowchart showing an operation flow when a transmitting/receiving diversity communication is carried out in the non-blank-off time mobile communication system.

It is assumed that the gateway exchange 20, the base stations 30-1 and 30-2, and the mobile station 100 start to operate, the switch SW1-1-1 of the switch group 23 in the gateway exchange 20 is in an on state, and the mobile station 100 is communicating with the base station 30-1. For the communication, the the time slots SD1-1 and SU1-1 of the radio channel CH1 of down frequency F1 and up frequency f1, as instructed by the communication controller 21 in the gateway exchange 20, are used (S301, FIG. 8A).

In the description that follows, the mobile station 100B (simply designated by 100) shown in FIG. 1D will be used.

It is assumed that the mobile station 100 decides to continue the communication with the mobile station 30-1, and to communicate with other base stations 30 located in the vicinity of the base station 30-1, in order to keep or improve the communication quality (S302). The decision is sent to the base station 30-1 (S303) by an outside-band control signal. The base station 30-1 receives this (S304), and transfers it to the gateway exchange 20 (S305). The exchange 20, when receiving the control signal (S306), checks a traffic condition near the mobile station 100 (S307). As the result of the check, if the traffic is abnormally congested (S308, YES), it sends through the base station 30-1 to the mobile station 100 a signal indicating that the transmitting/receiving diversity communication cannot be carried out (S309). If there is no traffic congestion (S308, NO), the gateway exchange instructs the base stations 30 located near the base station 30-1 to receive and monitor a signal carried by the time slot SU1-1 of up frequency f1 that is used for the communication between the base station 30-1 and the mobile station 100 (S310, FIG. 8B).

Each base station 30 (e.g., 30-2) receiving the instruction receives and monitors the signal carried by the time slot SU1-1 of up frequency f1 (S311), and sends a report of the monitor result to the S/N monitor 22 of the gateway exchange 20 (S312 and S313). The monitor 22 measures the speech quality of each base station 30, and compares it with the reference quality level L2, and detects that the speech quality of the base station 30-2 is better than the level L2 (S314, YES).

From this fact, the communication controller 21 judges that the mobile station 100 has moves from the service or radio zone covered by the base station 30-1 to the service zone by the base station 30-2. To carry out the transmitting/receiving diversity communication between the mobile station 100 and the base station 30-2, the communication controller searches a channel containing an idle time slot that can be used by the base station 30-2 (S315), and selects time slots SD3-2 and SU3-2 of the channel CH2 (S316). Then, the communication controller 21 sends an instruction signal to the controller 140 which in turn instructs the transmitter 132 (132-2) and the receiver 135 (135-2) in the mobile station 100 to prepare for the transmitting/receiving diversity communication using also the time slots SD2-2 and SU2-2 of the channel CH1 (S317).

The communication preparation instruction to use the time slots SD2-2 and SU2-2 of the channel CH2 is sent to the base station 30-2, which in turn prepares for communication using the time slots SD2-2 and SU2-2 of the channel CH2 (3182). this instruction is sent from the base station 30-1 by using the time slot SD1-1 of the channel CH1 (S319). The mobile station 100 receives the communication preparation instruction to use the time slots SD2-2 and SU2-2 of the channel CH1 of the frequency G2 (S320). Upon receipt of the instruction, the mobile station enters the preparation for the communication using also the time slots SD2-2 and SU2-2 of the channel CH2. More specifically, the controller 140 instructs the synthesizers 121-2 and 121-4 to set up a state that communication is allowed with the reception by the frequency G2 and the transmission by the frequency g2. The transmitting/receiving interrupt controller 123 enters the operation using the time slots SD2-2 and SU2-2 (S321).

When the mobile station 100 completes the preparation for the communication using the time slots SD2-2 and SU2-2 of the channel CH2, while communicating with the base station 30-1 by using the time slots SD1-1 and SU1-1 of the channel CH1, the mobile station 100 sends a report of completing the preparation to the base station 30-2 by using the time slots SD2-2 and SU2-2 of the channel CH2 (S322). When receiving the report, the base station 30-2 confirms that the preparation for the communication using the time slots SD2-2 and SU2-2 is completed in the base station per se, and sends a report of completing the preparation to the gateway station 20 (S323).

When the gateway exchange 20 confirms the completion of preparing for the communication using the time slots SD2-2 and SU2-2 between the base station 30-2 and the mobile station 100 (S324), it leaves the switch SW1-1-1 turned on, and turns on the switch SW2-1-1 (S325). Then, the communication controller 21 contained in the gateway exchange 20 instructs the base station 30-2 to initiate the communication with the mobile station 100 using the time slots SD2-2 and SU2-2 (S326, FIG. 8D).

When receiving the communication initiating instruction (S327), the base station 30-2 sends the instruction by using the time slot SD2-2 (S328). The mobile station 100 confirms the initiation of the communication using the time slots SD2-2 and SU2-2 by an ID signal as an identification signal to identify the mobile station 100 (S329), and sends a communication signal containing the ID signal (S330). When receiving the communication signal, the base station 30-2 sends a report of initiating the communication using the time slots SD2-2 and SU2-2 (S331).

In the gateway exchange 20 receiving the report, the S/N monitor 25 confirms the communication initiation using the time slots SD2-2 and SU2-2 (S332), and measures a quality level of the communication between the mobile station 100 and the base station 30-2. The monitor confirms that it is above the reference quality level L2 (S333, YES).

At this point in time, the transient period to the transmitting/receiving diversity communication terminates. With the switches SW1-1-1 and SW2-1-1 being turned on, the mobile station 100 can continue the communication with the base station 30-1 in the state of step S301, and the base station 30-2 by using the channel CH2, down frequency G2 and up frequency g2, with the switches SW1-1-1 and SW2-1-1 being turned on, in the diversity communication (S334).

In the communication in the transmitting/receiving diversity communication, the switches SW1-1-1 and SW2-1-1 in the switch group 23 are both in an on state, and the speech signal applied to the base station 30-2 is the same as that to the base station 30-1. Further, the modulation depth, length of the time slot, the number of time slots within one frame, and the timings of the radio channels in the base station 30-1 are equal to those in the base station 30-2.

In the above diversity communication between the mobile station 100 and the two base stations 30, two different radio channels CH1 and CH2 are provided, but the same radio channel may be used. Where the single or double radio channels are used, the time slot may appropriately be selected. The effect of the diversity communication will be described later.

(6) Time Slot Allocation within One Frame

Figure 11A:
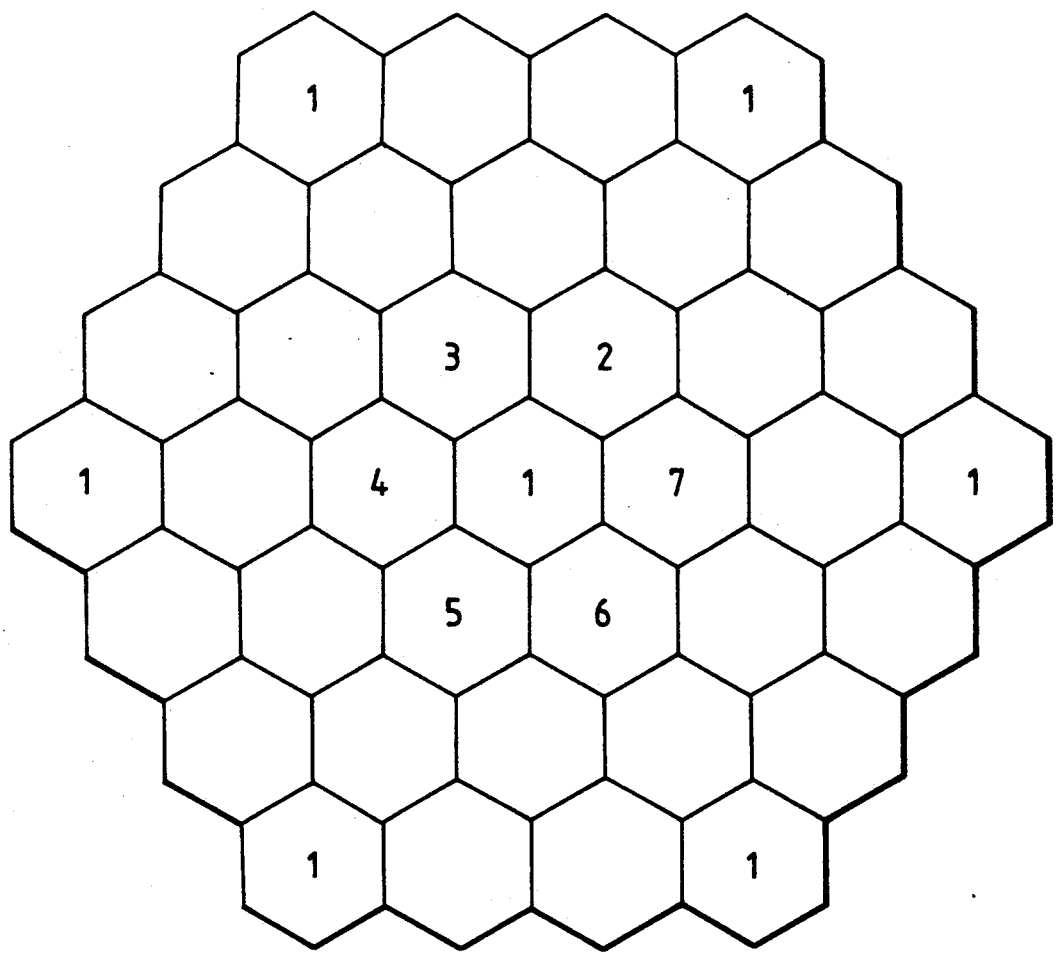
FIG. 11A is a schematic illustration of a microcell system to which the present invention is applied.

It is assumed that a mobile communication system to be used in this paragraph employs a microcell system in the zone architecture as shown in FIG. 11A. The principle of allocating time slots within one frame in each small zone will be described in comparison with the known zone repetition numbers in the microcell system, for ease of explanation.

In a basic zone configuration, a service area is entirely filled with regular hexagonal unit areas of the equal size, as shown in FIG. 11A. Each base station 30 (not shown) is located at the center portion of each regular hexagonal unit area. With use of a non-directional antenna, the regular hexagonal unit area entirely serves as a service area. In this instance, the adjacent unit areas will never overlap with one another since no leakage from one zone to the adjacent ones is present. A number centered in each hexagonal unit area indicates a zone number. In the figure, a maximum zone number is 7, n=7. An infinite plane may be completely filled with service areas (microcell zones) of n (=1, 2, ..., 7). It is evident that the zone number "n" is not limited to 7, but may repetition number. A value of "n" is determined depending on the system conditions. The zone repetition number "7" means that at least 7 number of radio channels are required for the system. The radio channel (CH1 in this instance) used for the zone 1 cannot be used for the adjacent zones 2 to 7; otherwise radio interference would occur. It is allowed to be used for the next but one zone. See FIG. 11A.

In the time division system according to the present invention, the limit of using the radio channel for the zone can be removed if the allocation of the time slots within one frame is properly carried out. This will be discussed below.

Figure 11B:
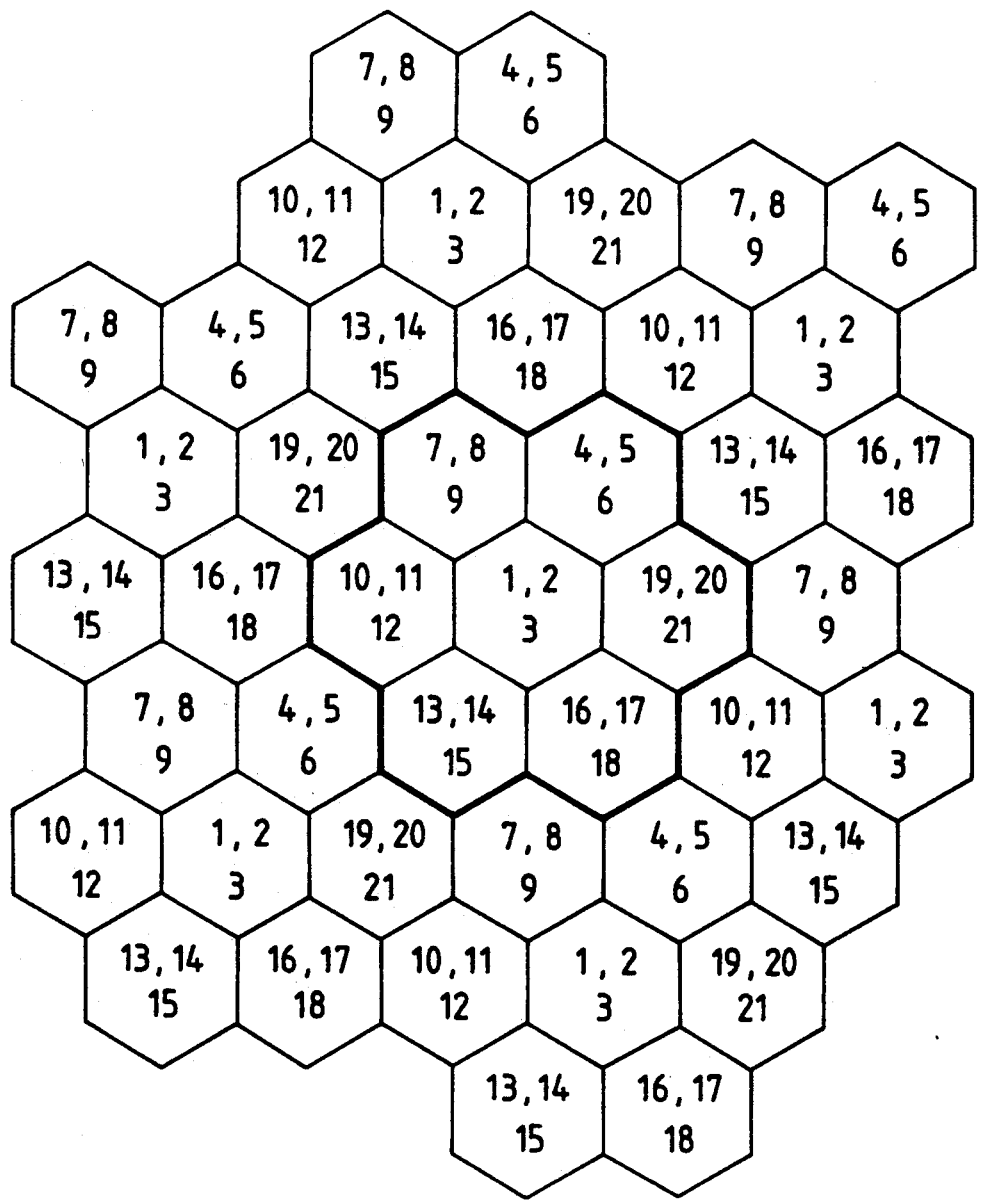
FIG. 11B shows a schematic illustration of a microcell system to which a time slot allocation according to the present invention is applied.

In FIG. 11B, a group of seven zones each zone having a specific allocation of time slots are repeatedly arrayed to fill a service area. As shown, each zone includes three time slots within one frame. The same radio channel may be used for those zones. In this case, however, the transmitting timings of the time slots as referred to in items (1) to (5) must be synchronized with one another in the base stations 30. Further, each base station 30 transmits radio waves for only the time slots allocated, but does not transmit any radio wave for other time slots. Incidentally, the receiver of each base station 30 is capable of receiving a radio wave transmitted through any time slot of any radio channel. The allocation of the time slot is applied to the signals transmitted from the base station 30, because the radio interference never becomes problematic in the reception of radio waves.

Where the time slot numbers that can be used are allocated to each zone as shown in FIG. 11B, a radio zone and the next but one radio zone have the same time slot numbers as seen from the drawing. Such an arrangement of the radio zones ensures a satisfactory attenuation of propagating radio waves, and hence creates no problem of radio interference between the service zones using the same time slot numbers.

Strictly, there is no necessity that the known zone repetition numbers are related to the time slot allocation methods according to the present invention in a one to one correspondence, that is, when the number of the zone repetitions (the number of the hexagonal unit areas in FIG. 11B) is 7, the number of the allocated time slots is 7. The required number of the allocated time slots depends only on the system design conditions, but it can be considered that the above correspondence approximately holds. Description that follows will handle the location registration and the call originating operation of the system operations (1) to (5), to which the operation discussed in this paragraph is applied. In the description, however, it is assumed that the base stations 30 are all able to use every radio channel, and those radio channels consist of two types of channels, one for control only and the other for speech only.

(A) Location Registration

Figure 14B:
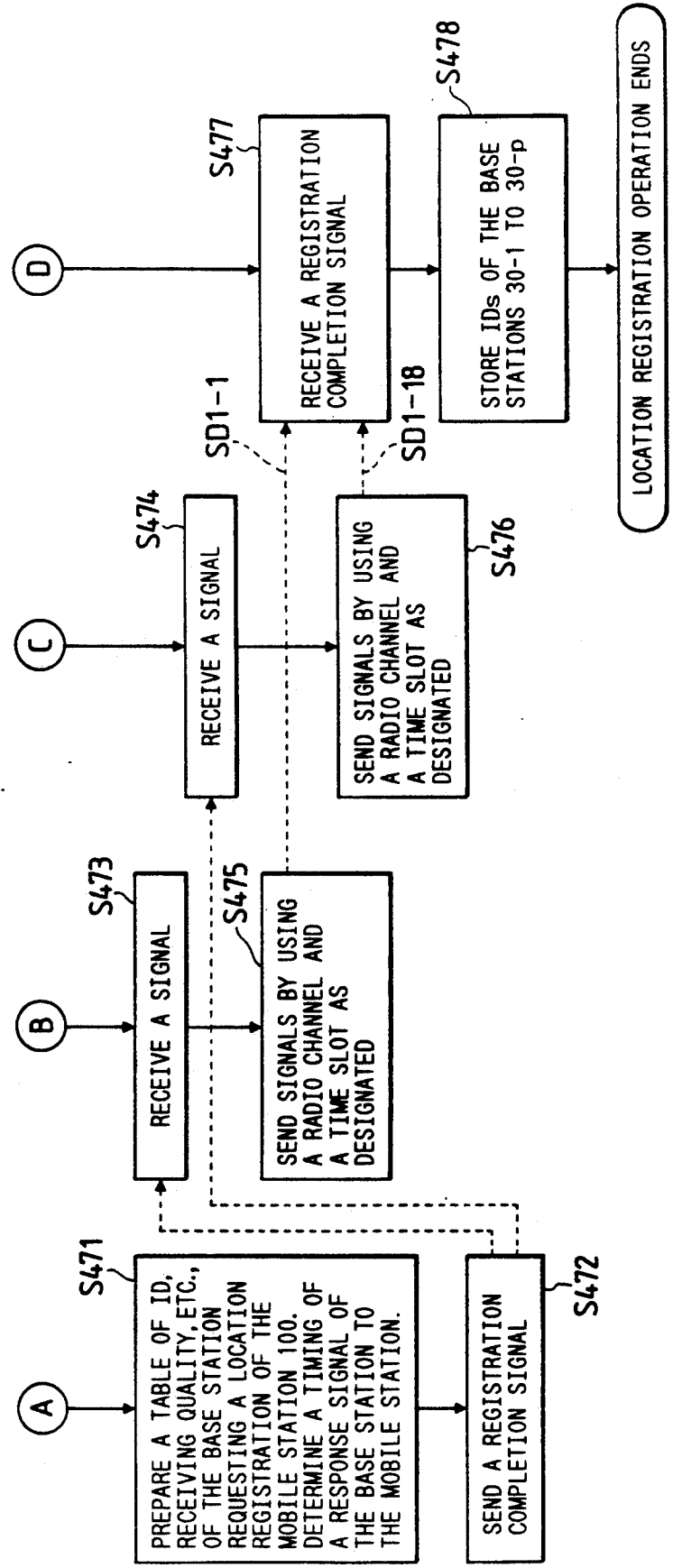

When a power switch of the mobile station 100 is turned on, a location registration signal to register the present location of the mobile station is sent to the radio base stations, for example, stations 30-1 and 30-p (p=2, 3...), located near the mobile station by using an idle time slot SU1-1 in an up radio channel CH1, for example (S461 in FIG. 14A). The reason why the sending of the location registration signal is allowed is that the mobile station receives a control signal sent from the near radio base station 30-1, for example, gains timing data, and uses the idle time slot SU1-1 of the corresponding up control channel.

In this case, also in all of the radio base stations 30, the receivers are all ready for receiving the signals of all of the time slots of the preset control radio channel.

When receiving a location registration signal from the mobile station 100 (S462, S463), each of the many radio base stations 30-1 and 30-p checks a quality of the received location registration signal, and stores ID in the ID/discrimination memory 82 (S464, S465). When the received signal quality is above a preset value (S466 YES, S467 YES), each base station sends a location registration request signal to the gateway exchange 20 (S468, S469). The gateway exchange 20, which received the request signal (S470), prepares tables of IDs, received signal qualities and the like of all of the base stations 30-1 and 30-D, which have requested the exchange to store the location registration of the mobile station 100. And the exchange determines a time slot number of the control radio channel to used for the response to the mobile station 100, and sends it to the base stations 30-1 and 30-p (S471, FIG. 14B). For example, the time slot SD1-1 of the down control channel is allotted to the base station 30-1, the time slot SD1-2, to the base station 30-2, and similarly the time slot SD1-n, to the base station 30-n. The exchange sends a registration completion signal containing those allocations to the radio base stations 30-1 and 30-p (S472). After receiving the registration completion signal, the radio base stations 30-1 and 30-p (S473, S474) transfers it to the mobile station 100 by using the time slot SD1-1 and SD1-p (p=2, 3, ...) of the down control channel (S476, S477).

The registration completion signal as sent by the time slot thus designated by the gateway exchange 20 is clearly received without any radio interference.

The mobile station 100, which received the registration completion signal (S477), checks the received signal, and stores IDs (identification numbers) of the base stations 30-1 and 30-p as registered, to the ID data verification/memory 182 (S478).

At this point in time, the registration operation of locations has ended, and a stand-by mode for call terminating is set up.

(B) Call Originating Operation

A call originating control signal transmitted from the mobile station 100 is received by a plurality of base stations 30-1 to 30-n, which are located near the mobile station. When detecting an ID (identification number) of the mobile station 100 (S402 and S403), each base station stores it at that time even if the mobile station is not stored or registered, and sends a call setup signal to the gateway exchange 20 (S404 and S405). Like the base station 30, it sends a call setup signal to the gate exchange 20. At this time, the gateway exchange 20 has received similar signals from other base stations, for example, 30-2, than the base station 30-1. Accordingly, it determines a base station 30 suitable for communication with the mobile station 100 now originating the call, after synthetically considering a traffic and a receiving quality in the current service zone. As the result of the consideration, if determination is made such that the base stations allowed to communicate with the mobile station are those 30-1 and 302, the radio channels used are the channel CH1, and the time slots used are time slots 1 and 18 (S406), the gateway exchange sends the determination to the base stations 30-1 and 30-2 (S407). It sends an uncommunicable signal to the base stations or sends no signal and makes a time-out. The base stations 30-1 and 30-2, which have received an communication instruction signal (S408 and S409), prepare reception of the the radio channel and the time slots. Those base stations sends the instruction as received from the gateway exchanger 20, to the mobile station 100 by using the time slots SD1-1 and SD1-18 (S410 and S411 in FIG. 5B). The instruction signals from the base stations 30-1 and 30-2 reach the mobile station 100 at the same time point and with the same contents. Therefore, there is no danger that the instruction signals interfere with each other.

Upon receipt of the instruction signals, the mobile station 100 is placed in a signal reception state using the instructed two time slots SD1-1 and SD1-18. At the same time, the mobile station 100 selects two time slots SU1-1 and SU1-18 for the up radio channel, which correspond to the down time slots SD1-1 and SD1-18 (see FIG. 2A(b)). In the controller 140 of the mobile station 100, the transmitting/receiving interrupt controller 123 is operated and in turn the switches 122-1 and 122-2 are operated (S412). At the same time, the mobile station sends a slot select completion signal to the base stations 30-1 and 30-2 through the up time slots SU1-1 and SU1-18, and waits a dial tone (S413).

A model of a distribution of the time slots including the time slot SU1-1 in the carrier wave of the up radio signal is as shown in FIG. 2B(c). The base station 30 has received the radio signal in which one frame contains up time slots SU1-1 and SU1-n from another mobile station 100, in addition to the time slots SU1-1 and SU1-2.

The base stations 30-1 and 30-2, which have received the slot select completion signal, send call setup signals to the gateway exchange 20 (S414 and S415). Upon receipt of the slot select completion signal, the gateway exchange 20 detects an ID of the mobile station 100, and turns on a necessary switch of the switch group 23 in the exchange 20 (S416), and sends a dial tone (S417). The dial tone is received by the base stations 30-1 and 30-2, and is transferred therefrom to the mobile station 100 (S418 and S419). During the transfer, the same signal contents as instructed from the gateway exchange 20 are transferred. Accordingly, the mobile station 100 enjoys good time diversity receive effect and hence receives the signals in good condition.

Figure 15A:
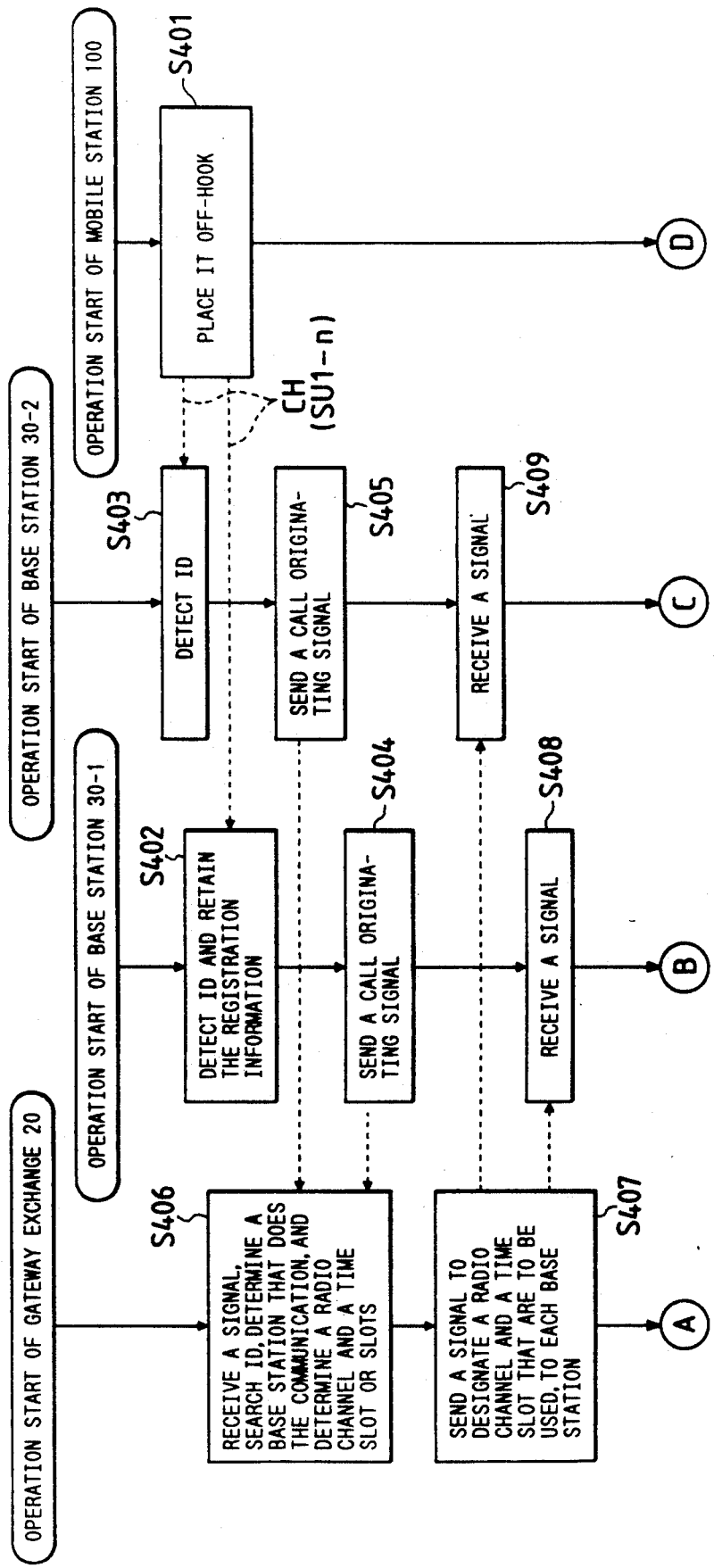
FIGS. 15A to 15C cooperate to form a flowchart showing a flow of a call originating operation when an intra-frame time slot allocation according to the present invention is used.
Figure 15B:
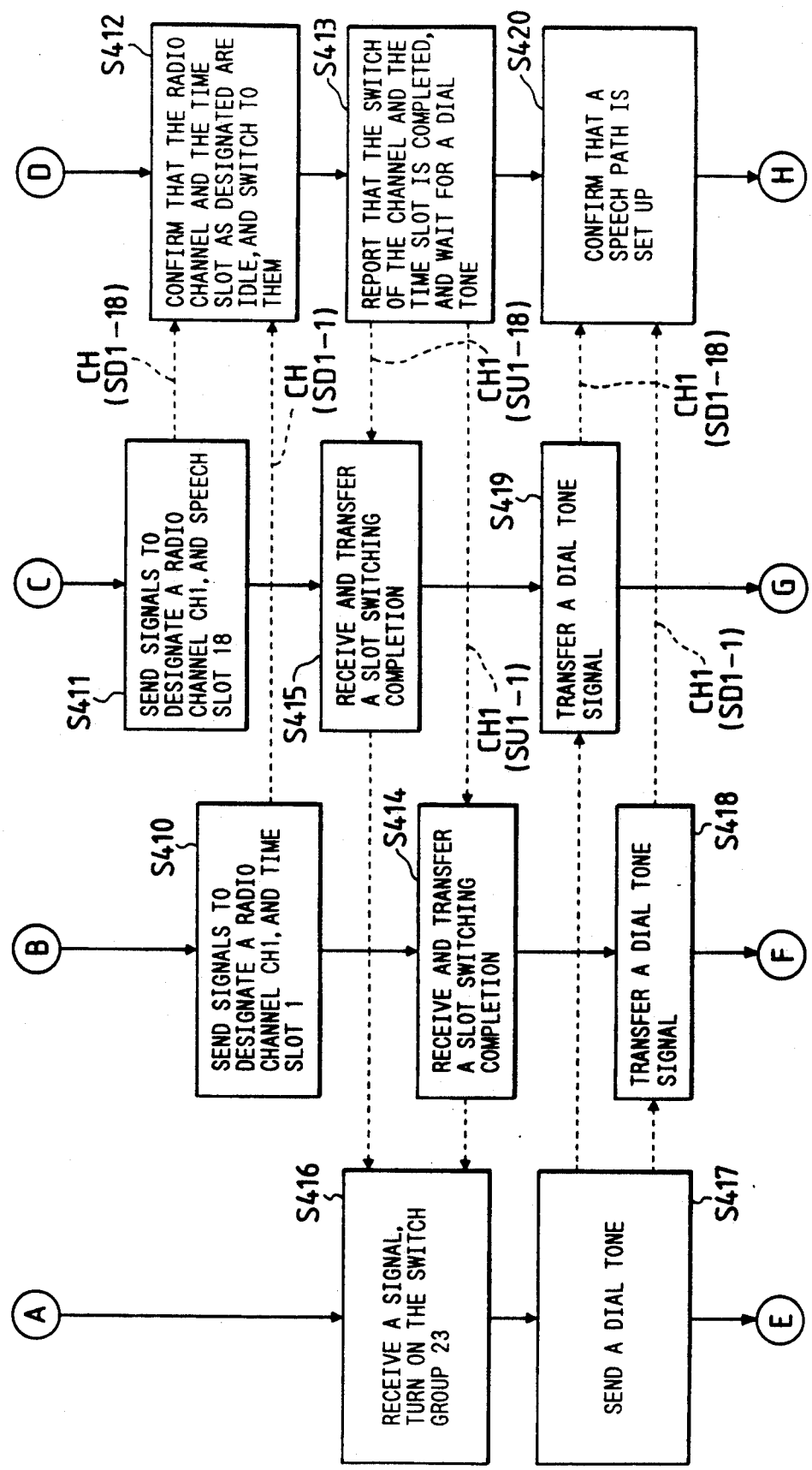
Figure 15C:
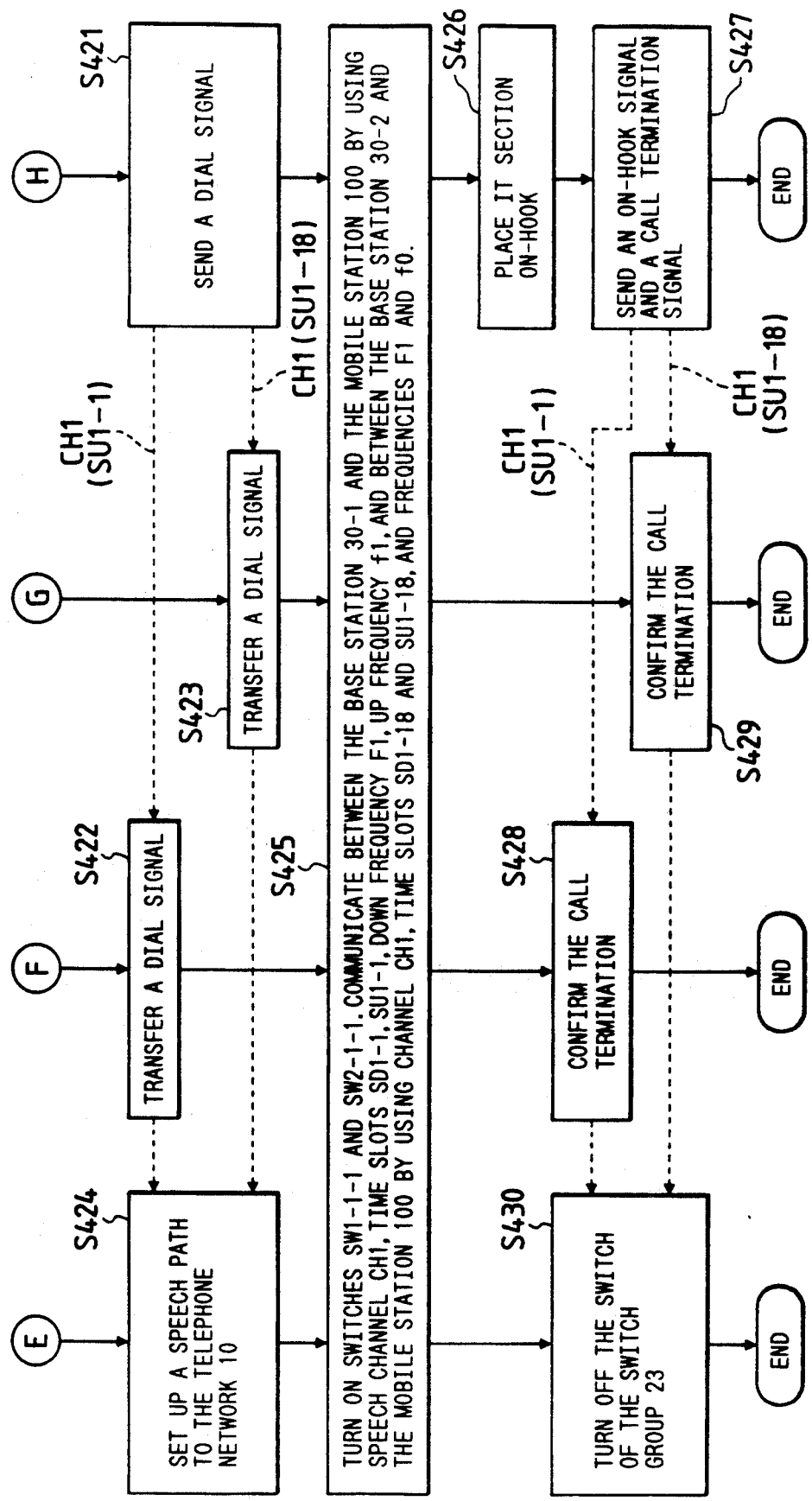

Then, the mobile station 100 confirms that a speech path has been established (S420). Under this condition, a dial tone can be heard from the handset of the telephone section 101 of the mobile station 100. Accordingly, the mobile station starts to send a dial signal. The dial signal is applied to the speech converting circuit 131 where it is subjected to the speed conversion process. Then, it is transmitted from the transmitter 132 including the transmitting section 134 and the transmitting mixer 133, through the up time slots SU11-1 and SU1-2 (S421, FIG. 15C).

The transmitted dial signal is received by the radio receiving circuits 35-1 of the base stations 30-1 and 30-2. Responding to the call signals from the mobile station 100, the base stations 30-1 and 30-2 have assigned time slots to be used, operated the signal select circuit group 39-1 and the signal allocation circuit group 52-1, received the up time slot SU1-1 or SU1-18, and have been ready for transmitting signals through a down time slot SD1-1 or SD1-18.

The speech path controller 81, under control of the control signal from the controller 40, turns on the switch SWR1-1-1 or 1-1-2 for reception and the switch SWT1-1-1 or 1-1-2 for transmission of the switch group 83 (FIG. 1C). Accordingly, the dial signal sent from the mobile station 100 passes through the signal select circuit 39-1-1 of the signal select circuit group 39-1, and reaches the signal restoring circuit 38-1-1 of the signal restoring circuit circuit group 38-1. In this circuit 38-1-1, the replica of original signal is restored, and is transmitted in the form of a speech signal 22-1 through the switch group 83 and the signal processor 31, to the gateway exchange 20 (S422 and S423). In this way, a speech path connecting to the telephone network 10 is set up (S424).

In each of the base stations 30-1 and 30-2, an input signal from the gateway exchange 20 (a control signal, and then a speech signal after a speech communication commences) passes through the switch SWT1-1-1 or 1-1-2 of the switch group 83, and enters the signal speed converting circuit 51-1-1 of the signal speed converting circuit group 51-1. It is subjected to a speed conversion process. Then, it is input to the signal allocation circuit 52-1-1 of the signal allocation circuit group 52-1. In the signal allocation circuit 52-1-1, time slots SD1-1 and SD1-18 are allocated to the signal. Then, the signal is transferred to the mobile station 100 by using the time slot SD1-1 or SD1-18 of the down radio channel, from the radio transmitting circuit 32. At this time, in the mobile station 100, the time slot SD1-1 or SD1-18 of the radio channel CH1 is ready for the signal reception. The signal from the base station is received by the radio receiving circuit 135, and is input to the signal speed restoring circuit 138. In this circuit, the replica of original signal as transmitted is restored, and is input through the signal mixer 152 to the handset of the telephone section 101. In this way, a speech commences between the mobile station 100 and the ordinary handset within the public telephone network 10 (S425).

At the end of speech communication, the handset of the telephone section 101 in the mobile station 100 is placed on-hook (S426). Then, an on-hook signal from the controller 140 are applied through the signal speed converting circuit 131 to the radio transmitting circuit 132. From the circuit 132, those signals are sent to the base stations 30-1 and 30-2 (S427). The controller 140 stops the operation of the transmitting/receiving interrupt controller 123, and sets the switches 122-1 and 122-2 to the output terminals of the synthesizers 121-1 and 121-2.

When the controller 40 of each of the base stations 301 and 30-2 receives the on-hook signal from the mobile station 100, it sends the on-hook signal to the gateway exchange 20, to turn off the switch SWR1-1-1 or 1-1-2, and switch SWT1-1-1 or 1-1-2. Here, the speech communication ends (S428 and S429). At the same time, the signal select circuit group 39 (39-1) and the signal allocation circuit group 52 (52-1) in each of the mobile stations 30-1 and 30-2 are released. In the gateway exchange 20 as received the on-hook signal, the related switch in the switch group 23 is turned off and the speech communication ends (S430).

When the method of allocating time slots within one frame as mentioned above is applied to the non-blank-off time mobile communication system and the system exercises the operations (1) to (5) above, the following advantages can be obtained. In the advantages description to follow, it is assumed that all of the radio base stations are allowed to use all of the radio channels.

i) The time slot allocating method ensures no radio interference for a radio channel or channels used in each radio zone. With this feature, when the gateway exchange 20 permits the mobile station or stations to use the channel, there is no need of searching the channels and the time slots used by the adjacent service zone or the next but service one zone every time it permits use of the channels and time slots. In this respect, the communication processing is easy and quick, thereby providing economical advantages.

ii) In the mobile communication system of the type which employs two types of radio channels, one for control only and the other for speech only, the time diversity communication is applicable for the control signals sent from a plurality of base stations 30, even if the simple mobile station 100 as shown in FIG. 1E is used. This feature improves the signal receiving quality.

As an example, the mobile station 100 receives the control signal sent from the nearest base station 30-p (step S176 in FIG. 4B), and recognizes the time slot number allocated to the cell zone in which the mobile station is present, and designates a base station 30 in which its location is to be stored or registered (in the case of originating a call, a called party). In this case, a time slot allocation ID of the desired base station 30 is contained in the up control signal transmitted from the mobile station 100.

iii) In the mobile communication system of the type which separately employs the control radio channels and the speech radio channels, there is a case that the request condition on the signal receiving quality for the control signal is different from that on the speech (or broad band signal) quality. Such a case can be dealt with modifying the time slot allocation.

For example, in case where the request condition for the control signal is strict, the number of time slots (corresponding to the number of repetitive zones as allocated for the control signal is 12, while the number of allocated time slots for the speech signal is 7. That is, a designer can deal with such a strict request condition by making a difference between the the number of allocated time slots for the control signal and that for the speech signal. The method making use of the difference between the numbers of the allotted time slots is applicable for a mobile communication system of the type in which the speech channel and the broad band channel are separately used.

(7) Comparison of the Diversity Effects by the Invention and by Prior Art

Comparison of the diversity effect by the communication system according to the present invention and by a conventional communication system is tabulated as shown in FIG. 9.

Firstly, in the transmitting/receiving diversity communication using a plurality of base stations 30 as described in item (5) above, the plurality of base stations 30 may use the same channel or different channels. The same thing is true for the time slots. Accordingly, satisfactory diversity effect can be obtained. Additionally, those base stations 30 are located at different places, and hence is free from the correlation on the transmitting-/receiving characteristics among the antennae. This also ensures good diversity effect.

In the diversity communication using a single base station 30 according to the invention, the base station is located at one place. Accordingly, if the same channel and the same time slot are used, the diversity effect as obtained cannot be obtained. The space diversity is invalid unless the transmitting and receiving antennae are properly distanced, because improper distance between the antennae fails to negate the correlation between the antennae.

Meanwhile, in the conventional communication system, in case where a plurality of base stations are used, the space diversity effect can be obtained if the same channel or different channels are used. However, it is impossible to set up a diversity communication for each time slot. No diversity effect can be obtained. In case where a single base station used, the diversity effect can be obtained when different channels are used. A little diversity effect can be obtained but use of the same channel and the same time slot or different time slots is not allowed.

As seen from the above evaluations, the transmitting-/receiving diversity according to the present invention is remarkable. In the diversity communication using a single radio channel, a simple mobile station as shown in FIG. 1E may be used. It will be readily understood that the mobile station shown in FIG. 1E, although only one set of transmitter and receiver is used, can communicate with a plurality of base stations 30 in a diversity mode, provided that a single radio channel is used.

From the foregoing description, it is seen that the transmitting/receiving diversity can be exercised by using many time slots, between the base stations 30 of three or more and the mobile station 100C.

(8) Theoretical Description of the Invention

Theoretical description will be given on the facts that the mobile communication system according to the present invention can transmit signals in good condition, and that the communication using one radio channel will never interfere with the communication using another channel. In the description, an up radio signal (transmitted from the mobile station to the base station 30) will be used by way of example.

It is assumed that all of the communication paths, viz., all of the time slots, are idle for the up radio signal. The mobile station 100 which desires to originate a call has selected a time slot (e.g., time slot SD1) of the up radio channel of the mobile station 100, that can be used, by using a control signal in the time slot SD1 of the down radio channel. In response to a signal from the timing generator 132, the radio transmitting circuit 132 sends a control signal (if a speech path has been set up, a speech signal) to the radio base station 30.

When another mobile station originates to be called a call toward the mobile station, the mobile station sends a control signal or a speech signal to the base station 30 by using another time slot of the same radio channel as a radio signal.

The signals contained in the up radio channel as mentioned above will mathematically be described.

A data or speech signal as an output signal or a control signal (analog or digital signal) of the telephone section 101 shown in FIG. 1B-1 may be expressed by $$\mu(t) = \sum_{i=1}^{m} a_i \cos(\omega_i t + \theta_i) \quad (1)$$

A control signal outside the frequency band is expressed by $$\mu_c(t) = \sum_{i=m+1}^{n} a_i \cos(\omega_i t + \theta_i) \quad (2)$$

where ai is an amplitude, wi is an angular frequency of the signal, $\theta i$ is a phase when t=0, and "m" and "n" are positive integers.

A case that a frequency modulation is used in the instant mobile communication system will be described below. It is evident that the present invention is applicable to the case of using a phase modulation or an amplitude modulation. When a carrier wave signal is frequency modulated by using the signal of the equation (1) or the signals of the equations (1) and (2), we have the resultant modulated signal as given by $$\begin{aligned} I &= I_0 \sin \int (\omega + \mu(t)) \, dt \\ &= I_0 \sin(\omega t + S(t)) \end{aligned} \quad (3)$$

or $$\begin{aligned} I &= I_0 \sin \int (\omega + \mu(t) + \mu_c(t)) \, dt \\ &= I_0 \sin(\omega t + S(t) + S_c(t)) \end{aligned} \quad (4)$$

where $$s(t) = \sum_{i=1}^{m} m_i \sin(\omega_i t + \theta_i)$$

$$s_c(t) = \sum_{i=m+1}^{n} m_i \sin(\omega_i t + \theta_i)$$

$$m_i = a_i/\omega_i \, (i = 1, 2, 3, \ldots, n)$$

In the equation (4), S(t)+sc (t) indicates a transmission signal having a general form.

By using the equations (3) or (4), we have a radio signal transmitted from the antenna of the mobile station 100 as given by $$I = (I_{01}/n)\left[1 + 2\sum_{m=1}^{\infty} \{n/m\pi)\} \times \sin(m\pi/n)\cos mpt\right] \times \quad (5)$$

$$\sin(\Omega_1 t + S_1(t) + S_{c1}(t))$$

where "n" indicates the number of slots (of equal time intervals) within one frame, "p" a switch angular frequency, and "m" a positive odd number.

The equation (5) describes the case where of "n" number of time slots within one frame, one time slot is used for transmitting a signal from the mobile station using one radio channel. In case where the mobile station is engaging the communication using one radio channel whose time slots are all filled with signals, the signal contained in the radio channel is $$I = (I_{01}/n)\left[1 + 2\sum_{m=1}^{\infty} \{n/m\pi)\} \times \sin(m\pi/n)\cos mpt\right] \times \quad (6)$$

$$\sin(\Omega_1 t + S_1(t) + S_{c1}(t)) + (I_{02}/n)\left[1 + 2\sum_{m=1}^{\infty} \{n/m\pi)\} \times \right.$$

$$\left.\sin(m\pi/n) \times \cos mp\{t - 2\pi/(np)\}\right] \times \sin(\Omega_2 t + S_2(t) +$$

$$S_{c2}(t)) + (I_{03}/n)\left[1 + 2\sum_{m=1}^{\infty} \{n/m\pi)\} \times \sin(m\pi/n) \times\right.$$

$$\left.\cos mp\{t - 4\pi/(np)\}\right] \times \sin(\Omega_3 t + S_3(t) + S_{c3}(t)) + \ldots +$$

$$(I_{0n}/n)\left[1 + 2\sum_{m=1}^{\infty} \{n/m\pi)\} \times \sin(m\pi/n) \times\right.$$

$$\left.\cos mp\{t - 2(n-1)\pi/(np)\}\right] \times \sin(\Omega_n t + S_n(t) S_{cn}(t))$$

where "p" is a switch angular frequency, "m" a positive odd number, and switching times for "n" number of input waves are equally distanced.

The equation (6) describes all of the signals as received by the base station, as the signals within the same radio channel. The signals as transmitted from the base station shown in FIG. 1A to the respective mobile stations can be described by an equation similar to the equation (6). Io1, ..., Ion in the right side of the equation (6) can be considered to be equal, but those are generally treated to be different since the transmission power sometimes is controlled. As a matter of course, S1(t), ..., Sn(t) are different from the signals received by the base station. Since those are equal in the above equation, any special signs are not applied to them. In this case, the signal sent from the base station 30 is also expressed by the equation (6). The mobile station 100, which is oppositely coupled in communication with the base station, selectively receives only the signal, which is required for the mobile station per se in the equation (6), by using the timing generator 142 and the transmitting/receiving interrupt controller 123 in FIG. 1B-1. If this signal is the signal of the time slot SD1 shown in FIG. 2A for the mobile station 100-1, it is the signal of the first term in the right side of the equation (6), viz, the signal as described by the right side. The signal as given by the equation (5) is passed through the amplitude limiter in the receiving section 137 in FIG. 1B-1, it is transformed into the following equation $$I = A \sin(\Omega_1 t + S_1(t) + S_{c1}(t)) \quad (5')$$

where A is an amplitude, and independent of frequency and time. When the signal of the equation (5') is passed through the frequency discriminator, then a demodulated signal as given below is produced $$e(t) = \mu(t) + \mu_c(t)$$

By passing this signal through the signal speed restoring circuit 131 of FIG. 1B-1, the original signal is restored.

The above description relates to the case where the base station 30 sends a signal, and the mobile station 100 receives it. The same thing is correspondingly applied to the case where the mobile station 100 sends a signal and the base station receives it. In the latter case, the base station must receive signals as time sequentially transmitted from a number of mobile stations, while the mobile station receives only one signal directed to the mobile station per se.

In order to use for checking the effects by the interference between the adjacent channels, for example, as will be given later, the equation (6) is modified. The right side of the equation (6) is developed into $$I = (I_{01}/n) [\sin\{\Omega_1 t + U_1(t)\} + (n/\pi)\sin(\pi/n) \times \quad (7)$$
$$[\sin\{(\Omega_1 + p)t + U_1(t)\} + \sin\{(\Omega_1 - p)t + U_1(t)\}] +$$
$$(n/3\pi)\sin(3\pi/n) \times [\sin\{(\Omega_1 + 3p)t + U_1(t) - (6\pi/n)(n - 1)\} +$$
$$\sin\{(\Omega_1 - 3p)t + U_1(t) + (6\pi/n)(n - 1)\}] + (n/5\pi)\sin(5\pi/n) \times$$
$$[\sin\{(\Omega_1 + 5p)t + U_1(t) - (10\pi/n)(n - 1)\} + \sin\{(\Omega_1 - 5p)t +$$
$$U_1(t) + (10\pi/n)(n - 1)\}] + \ldots + (I_{02}/n) [\sin\{\Omega_2 t + U_2(t)\} +$$
$$(n/\pi)\sin(\pi/n) \times [\sin\{(\Omega_2 + p)t + U_2(t)\} + \sin\{(\Omega_2 - p)t +$$
$$U_2(t)\}] + (n/3\pi)\sin(3\pi/n) \times [\sin\{(\Omega_2 + 3p)t + U_2(t) -$$
$$(6\pi/n)(n - 1)\} + \sin\{(\Omega_2 - 3p)t + U_2(t) + (6\pi/n)(n - 1)\}] +$$
$$(n/5\pi)\sin(5\pi/n) \times [\sin\{(\Omega_2 + 5p)t + U_2(t) - (10\pi/n)(n - 1)\} +$$
$$\sin\{(\Omega_2 - 5p)t + U_2(t) + (10\pi/n)(n - 1)\} + \ldots] + \ldots +$$
$$(I_{0n}/n) [\sin\{\Omega_n t + U_n(t)\} + (n/\pi)\sin(\pi/n) \times [\sin\{(\Omega_n + p)t +$$
$$U_n(t)\} + \sin\{(\Omega_n - p)t + U_n(t)\}] + (n/3\pi)\sin(3\pi/n) \times$$
$$[\sin\{(\Omega_n + 3p)t + U_n(t) - (6\pi/n)(n - 1)\} + \sin\{(\Omega_n - 3p)t +$$
$$U_n(t) - (6\pi/n)(n - 1)\}] + (n/5\pi)\sin(5\pi/n) \times [\sin\{(\Omega_n + 5p)t +$$
$$U_n(t) - (10\pi/n)(n - 1)\} + \sin\{(\Omega_n + 5p)t + U_n(t) -$$
$$(10\pi/n)(n - 1)\}] + \ldots]$$

where, $$U_i(t) = S_i(t) + S_{ci}(t)$$
$$(i = 1, 2, \ldots, n)$$

As seen from the equation (7), the signal I is composed of many carrier wave signals. A qualitative evaluation will be applied to adjacent channel interference, the same channel interference, delay quantity of the transmission signal, and the like, which must be taken into consideration in designing a mobile communication system. The fact that a mobile communication system according to the present invention can smoothly be realized will be described on the basis of the evaluation.

(I) Adjacent Channels Interference

In case that the number time slots within one frame is 10, a voice multiplexing degree is 10, and the period of one frame is 100 msec., most of the signal components is confined within one channel, and the signal in that channel have little effect on the adjacent channels. This will qualitatively be In the equation (7), a situation that the adjacent channel interference is the greatest will occur when the time slots are all busy. For ease of calculation, let a frequency (omega)i (i=1, 2, ..., n) of a carrier wave signal outputted from the mobile station 100 and a transmitted signal Ui (i=1, 2, ..., n) be $$\Omega_1 = \Omega_2 = \ldots = \Omega_n, U_1 = U_2 = \ldots = U_n \quad (8)$$

If those factors are so set, its influence upon an amount of interference is negligible (actually, this case provides a maximum of the amount of interference to possibly occur).

Also in the actual mobile communication system, the currents Io1 to Ion in the above equation can be considered to be equal, and then we have $$I_{01} = I_{02} = \ldots = I_{0n} = I_0 \quad (8')$$

By using this relation, the equation (7) can be rewritten into $$I/n = (I_0/n) < \sin(\Omega_1 t + U_1(t)) + (n/\pi)\sin(\pi/n) \times [\sin\{(\Omega_1 + \quad (9)$$
$$p)t + U_1(t)\} + \sin\{(\Omega_1 - p)t + U_1(t)\}] + (n/3\pi)\sin(3\pi/n) \times$$
$$[\sin\{(\Omega_1 + 3p)t + U_1(t) - (6\pi/n)(n - 1)\} + \sin\{(\Omega_1 - p)t +$$
$$U_1(t) - (6\pi/n)(n - 1)\}] + (n/5\pi)\sin(5\pi/n) \times [\sin\{(\Omega_1 + 5p)t +$$
$$U_1(t) - (10\pi/n(n - 1)\} + \sin\{(\Omega_1 - 5p)t + U_1(t) -$$
$$(10\pi/n)(n - 1)\}] > + \ldots >$$

Assuming that "p" in the equation (9) is 20 (pi radian), i.e., 10 Hz of frequency, the phase of the carrier wave is neglected, and energy (voltage) is expressed in terms of a peak value (as a result, the influence by interference wave is evaluated to be excessive), the equation (9) can be rewritten into $$I/n = (I_0/n)\{1 + (n/\pi)\sin(\pi/n) + (n/3\pi)\sin(3\pi/n) \div \ldots\} - \quad (10)$$
$$(I_0/n)\{(n/\pi)\sin(\pi/n) + (n/3\pi)\sin(3\pi/n) + \ldots\}$$

As viewed from another radio channel, the carrier frequencies of the interference waves are positioned at $$\pm p, \pm 2p, \pm 3p, \ldots$$

with respect to p=0, viz., the main carrier frequency. In other words, the carrier frequencies of the interference waves are located separated from the main carrier frequency by the above figures in the positive and negative directions. The calculation is made on the assumption that the greatest influence exists. Since the absolute values of $$\sin(\pi/n), \sin(3\pi/n), \sin(5\pi/n), \ldots$$

are each below "1", the equation (10) may be expressed by the follow equation (hence, the radio wave interference becomes greater). If each of the absolute values is 1, we have $$I/I_0 = 1 + (n/\pi)\{1 \div 1/3 + 1/5 + \ldots + 1/(2n - 1) + \ldots\} + \quad (11)$$
$$(n/\pi)\{1 + 1/3 + 1/5 + \ldots + 1/(2n - 1) + \ldots\}$$

In the equation (11), "1" of the first term of the right side indicates the main carrier wave component. $(n/\pi)\{$ $\}$ of the second term, the subcarrier component present in the upper side-band of the main carrier wave. $(n/n)\{$ } of the third term, the subcarrier component present in the lower side-band of the main carrier wave.

Figure 10:
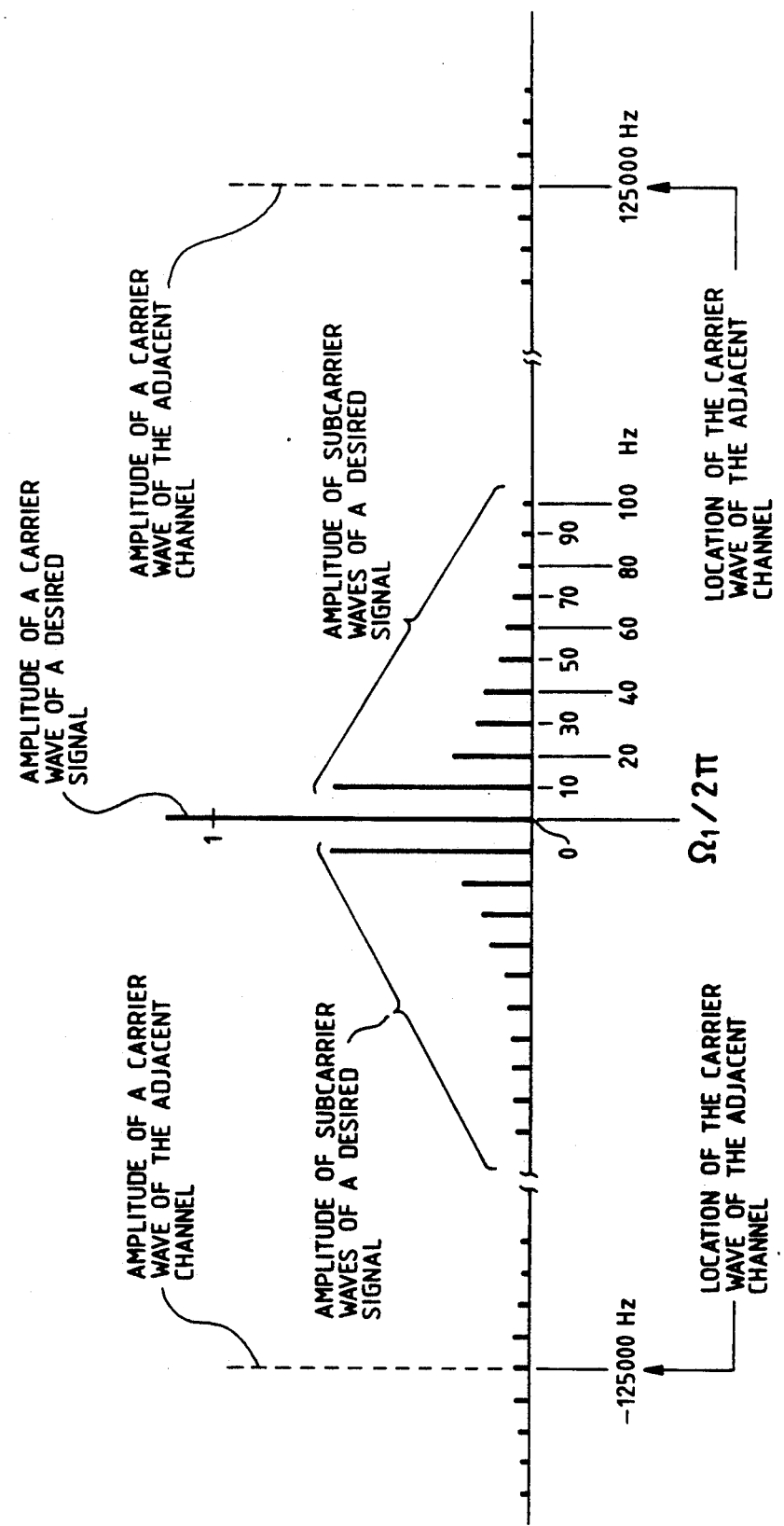
FIG. 10 is a spectral diagram showing a radio interference with the adjacent channels in the mobile communication system according to the present invention.

An energy distribution of a number of carrier waves in the equation (11) can be depicted with respect to frequency, as shown in FIG. 10. Let us compare the energy within ±10 kHz with respect to the center frequency, which is contained in the subcarrier energy (amplitude) retained within the radio channel, with the energy within ±10 to 20 kHz. The energy (voltage) E within ±10 kHz is $$E(10 \text{ KHz}) = (2n/\pi) \sum_{n=1}^{500} 1/(2n - 1) \simeq 2n/\pi \times 5.5506 \quad (12)$$

The energy (voltage) E within ±10 kHz to 20 kHz is $$E(20 \text{ KHz}) = (2n/\pi) \sum_{n=501}^{1000} 1/(2n - 1) \simeq 2n/\pi \times 0.1421 \quad (13)$$

Accordingly, $$R = E(20 \text{ KHz})/E(10 \text{ KHz}) \simeq 0.0256 \quad (14)$$

The relation (14) indicates that the energy E within ±10 kHz to 20 kHz is approximately 1/40 as much as that within ±10 kHz. Likewise, that the energy E within ±20 kHz to 30 kHz is 0.00761, viz., approximately 1/130 as much as that within ±10 kHz.

The above approximate figures results from the calculations when existence of many subcarriers is exaggeratedly considered. Nevertheless, the energy of 90% or more of the transmitted power exists within the transmission band width of the radio channel of the station per se, while the remaining energy of 1% or less possibly interferes with other channels.

Let us calculate carrier wave power that would possibly interfere with the adjacent channels by using the equation (11). The calculation will be conducted on the assumption that the radio channels including the adjacent channels have the same frame structures.

It is assumed, further, that the adjacent channels are separated by 125 kHz from each other, and the components of 75 kHz to 175 kHz of the subcarrier waves interfere with the channels, From the equation (11), we have the entire power as given below $$2n/\pi \sum_{n=3751}^{8751} 1/(2n - 1) = n \times 0.0027 \quad (15)$$

Meanwhile, since the energy of the main carrier wave (this is equal to the energy of the main carrier wave of the adjacent channel) is 1, a ratio of the signal wave to interference wave (referred to as D/U) is 1/0.0027, and is 50 dB (at the power ratio).

The above calculation was conducted under the condition that "p" is 20 (pi radian), or 10 Hz. Here, let us conduct a similar calculation under the condition that "p" is 100 Hz (increase of "p" is made for reducing a delay time of the signal as will subsequently be described). The, we have the signal wave/interference wave is 30 dB (power ratio). In the general mobile communication, D/U (signal wave/interference wave) tolerated as a one-channel interference is 24 dB (power ratio). From this, it is seen that the above figure is much higher than the tolerable figure. This implies that if the transmitting wave according to the present invention is pulsatively interrupted, the radio wave interference with the adjacent channels is negligible.

While the above calculations relates to the transmission from the mobile station 100, the same calculation is correspondingly applied to the transmission from the base station 30, and similar calculation results can be obtained. In the latter case, use conditions within the time slots for the sync signal and the control signal are different from those in the former case. In proportion with this, a frequency distribution within the time slot differs, but effect by the difference of the frequency distribution is unnoticeable.

(II) Intra-Channel Interference

The intra-channel interference occurs for the reason that of harmonics or carrier frequencies, (omega)±np, of the transmitting pulse signal described by the equation (9), those carrier wave having large "n" are prevented from being output by the characteristics of a band-pass filter or an interrupt circuit installed in the output section of the radio transmitting circuit, In this case, an ideal shape of an envelope (in which the carrier waves are contained) is not rectangular, but the envelope take a form which is composed of a number of sine waves so as to resemble a rectangular wave (a beat envelope as shown in FIG. 2B(d)). The signal component of such a waveform enters another time slot. In this way, the intra-channel interference occurs.

The interference by the intra-channel interference will theoretically be described.

It is assumed that the time slots SD1 and SD2 are used by communications A and B (FIG. 2B(d)). With the aid of the equation (7), the wave interfering with the communications A and B can mathematically be described by the following equation $$A = \sum_{m>m_0} n/\{(2m + 1)\pi\} \times \sin\{(2m + 1)\pi/n\} [\cos\{(\Omega + 2(2m + 1)p)t + U(t)\} - \cos\{(\Omega - (2m + 1)p)t + U(t)\}] \quad (16)$$

The numerical calculations that are conducted in connection with the equation (8) and the subsequent ones, may be applied for specific calculations of the equation (16). Accordingly, if the filter circuit contained in the radio transmitting circuit 32 is designed to have a broad band, and $m_0$ is set at 1000 (100 Hz×1000=100 kHz) or more, the intra-channel interference is negligible. Actually, it is easy to design a circuit satisfying such conditions.

(III) Co-Channel Interference

Where the present invention is applied to the microcell zone system, if two different radio zones use the same radio channel, a radio wave of the first radio zone sometimes enters the radio channel of the second radio zone. This is the same channel interference.

In FIG. 11A, a regular hexagonal block indicates a microcell zone covered by each base station 30. The base station 30 is located at the center portion of the zone. In this instance, the base stations located in the microcell zones 1 to 7 use different radio channels, and the number of repetitive zones is 7.

In FIG. 11A, when a distance between two base stations 30 using the same channel (the shortest distance of those distances between the center of one hexagonal block 1 and other hexagonal block 1) is "d", a tolerable D/U (a ratio of a desired wave input level D to interference wave input level U) must be obtained. The D/U can be obtained by a frequency and output power (size of the radio zone) of the system, and a radio wave propagating state. In the conventional analog system, an interference value is known for the D/U value thus obtained. The conventional technique is unavailable for the system according to the present invention, because the modulation system is different from that of the convention one. To obtain an exact value, the system must actually be constructed and measured for its value. Use of the conventional tolerable D/U, however, will provide a relatively satisfactory result also in the system of the invention.

(IV) Removal of Pulsative Noise in Signal Reception

As already described, the output signal when the time division signal according to the present invention is received and the output signal of the frequency (phase) discriminator is obtained, is expressed by the equation (5'). This is an ideal case, but practically, noise is generated due to various causes as described below. The noise is generated at the boundary between the slots shown in FIG. 2A. The causes are:

a) Discontinuity between different signals,
b) Deformation of a signal waveform due to the frequency response of the intermediate frequency (IF) amplifier 143, and
c) Noncoincidence of the timing in the signal speed converting circuit group with the timing at the time of reception (including a delay arising from the propagation of a signal in space (this cause is involved in both the transmitting and receiving sides).

The noise thus generated is removed in the radio receiving circuit 135. This will be described by using the drawing of FIG. 1B-2 showing the detail of the radio receiving circuit 135. A signal as caught by the antenna section is input to the receiving mixer 136, and its output signal is amplified to a proper level by the IF amplifier 143.

Part of the output signal of the IF amplifier is applied to the clock regenerator 141 where a clock signal is regenerated. Part of this is applied to the timing generator 142. Another part of the output signal of the IF amplifier 143 passes through the gate circuit 144 and reaches the frequency (phase) discriminator 145 where it is demodulated. Under control of a signal from the timing generator 142, the gate circuit 144 allows only the signal necessary for the mobile station 100 to go to the discriminator 145, while prohibits the unnecessary signal, for example, a signal directed to another mobile station, from going to the discriminator. As a result, distortion noise due to intermodulation is removed.

The output signal of the discriminator is applied again to the gate circuit 146. The gate circuit 146 is provided for removing noise in the base band, particularly the noise due to the causes in item a) and c) above.

Through the operation of the gate circuit 146, a signal whose noise is remarkably reduced is applied to the signal speed restoring circuit 138. On the other hand, there is the possibility that the operation of the gate circuit 146 cuts off part of a desired signal. This can be avoided in a manner that of the time slots shown in FIG. 2A, the time slots containing signals are located at and near the center of the time slot array, and guard times are located at both sides of the time slot array, and no signal is set in the guard times. This can be realized in a manner that, as already described, the signal speed conversion is slightly quickened, and when the original signal is restored after reception, the restoration is proportionally slightly quickened.

(V) Delay Time Effect of Transmission Signal

The following causes produce great transmission delay at the transmitting/receiving terminals.

i) The transmission base band is segmented at fixed intervals and these segmented ones are stored in the memory (e.g., BBD and CCD).
ii) A signal as received at the receiving end (terminal) is segmented every time slot, and the segmented ones are stored into the memory circuit.
iii) Signal transmission time arising from the fact that transmitting and receiving points are distanced.
iv) The diversity reception is applied, and the same signals are transmitted and received at the same time points.

Additionally, the IF circuit, the transmitting receiving mixer circuits, the transmitting and receiving filters, and the like delay the transmission signal, but the delay is small. Accordingly, the delays by those circuits will not be referred to.

As for item iii), practically, a distance between calling and called automobile telephone sets is approximately 10 km (distance for the wire telephone system is omitted). Then, $$10 \text{ km}/300000 \text{ km/sec} = 1/30 \text{ msec}$$

In the case of the portable telephone system, there is a proposal in which a service area of one base station is extremely small, e.g., about 25 m in radius (entitled "Proposal for a Portable Telephone System—One Approach to the Ultimate Communication—", The Institute of Electronics Information and Communication Engineers, Technical Report, CS86-88 Nov. 1986, and Japanese Patent Application No. 62-64023, entitled "Portable Telephone System").

In the above portable telephone system, a distance between calling and called automobile telephone sets is approximately 100 m (the distance for the wire telephone system is omitted). Then, $$100 \text{ m}/300000 \text{ km/sec} = 1/3000 \text{ msec}$$

When comparing with the delay times in item i) and ii), the delay time due to item iii) is negligible.

The generation of time delays by item i) and ii) may be illustrated as a model, as shown in FIGS. 12A and 12B.

In FIG. 12A, an input signal is applied to the signal speed converting circuit 51-1 of the signal speed converting circuit group 51 in the base station 30, as shown in (a) of FIG. 12A (time flows from left to right as viewed in the drawing). A signal A within T as a unit for signal speed (pitch) conversion is time compressed by T/n in the signal speed converting circuit 51-1. The signal after compressed ((b) in FIG. 12A) is output so that its trailing edge coincides with the trailing edge of the input signal (a). The output signal (b) is output from the radio transmitting circuit 32, as shown in (c) in FIG. 12A. In the mobile station 100 receiving the output signal, the speed restoring circuit 138 receives at the input the compressed signal A at the timing shown in (d) of FIG. 12A. The circuit 138 restores the signal, and output it as shown in (e) of FIG. 12a. A delay time (tau)1 from the leading edge of the signal A of (a) to the leading edge of the signal A of (e) is T−T/n. In this case, the transmission times during the course from the outputting by the transmitter to the space transmission and the receiving by the receiving section of the mobile station 100 are neglected.

In FIG. 12B, at the trailing edge of the signal A ((a) in FIG. FIG. 12B) input to the signal speed converting circuit 51-1 of the base station 30, the leading edge of a signal A time compressed to T/n is positioned. Accordingly, an output signal of the radio transmitting circuit 32 is as shown by (c) of FIG. 12B. A signal input to the speed restoring circuit 138 of the mobile station 100 as received the signal (c), is as shown in (d) of FIG. 12B. As shown, the trailing edge of the time compressed signal A coincides with the leading edge of the signal A of (e) as time expanded "n" times for restoration. As seen from the signal of (e), there is a delay $t_2$, $= t + t/n$.

A circuit for processing the signals shown in FIG. 12A is more complicated than a circuit for processing the signals shown in FIG. 12B. The former can lessen the delay time. The latter is simpler in circuit arrangement but a delay by it is slightly larger.

In actual communication, particularly bidirectional communication such as a voice communication, a sender expects a response from a called party. Therefore, the delay time must be two times the delay time $t_1$ or $t_2$. Let us consider this with specific figures. Assuming that one time slot (one segment) T of the transmission signal is T=1/10 sec., and a time compression factor "n" is n=10, then we have $$2\tau_1 = 2 \times 1/10(1 - 1/10)$$
$$= 18/100 = 0.18 \text{ sec.}$$
$$(180 \text{ m sec.})$$

$$2\tau_2 = 2 \times 1/10(1 + 1/10)$$
$$= 22/100 = 0.22 \text{ sec.}$$
$$(220 \text{ m sec.})$$

In the satellite communication, the delay time is approximately 250 msec. Accordingly, the above figure is approximately equal to that of the satellite communication. The reduction of delay time, if required, can be realized by reducing the width of the time slot (time width of one segment) in the base band. If the T is reduced and T=1/100 sec. and the time compression factor "n" is n=100, $$2\tau_1 = 2 \times 1/100(1 - 1/100)$$
$$= 2 \times 99/10000 \approx 0.02 \text{ sec.}$$
$$(20 \text{ m sec.})$$

$$2\tau_2 = 2 \times 1/100(1 + 1/100)$$
$$= 202/1000 \approx 0.02 \text{ sec.}$$
$$(20 \text{ m sec.})$$

In a practical communication system, the above conditions can be satisfied if the number of time slots within one frame for the same mobile terminal is 10, and the time slots for other communications are recirculatingly provided (the time duration of one frame is reduced to 1/10).

The above delay is that resulting from a system design, and the delay time of the wire communication system is omitted. Compensation is possible for the delay time of the wire communication system, but that delay little influences the system operation.

The delay time that possibly influences the communication system will be described. Distance of the mobile station 100 to a base station 30, and hence a space propagating distance of the signal are different for different mobile stations. Accordingly, when the base station 30 receives the signals from the respective mobile stations 100, overlapping of the time slots, gap between the time slots, and other adverse matters possibly occur.

In the case of the land mobile telephone system, if the mobile station 100 is located near the base station 30, and another mobile station 100 is distance from the base station 30 by 10 km, the delay time difference is 1/30 msec., as already stated. In other words, there is the possibility that the time slots overlaps about 0.03 msec. To cope with this, a guard time of about 0.05 msec., must be provided.

In the case of the portable telephone system, as in the previous case, the distance difference between the base station and two mobile stations is 100 m, and hence the delay time difference is 0.0003 msec. Such a figure is negligible for a communication system including signal components of 1 MHz or less.

Description that follows is elaboration of the case of item iv) where the diversity communication is applied and the same signal is transmitted at the same time point. The delay time caused when the diversity communication is used, occurs mainly in the control signal to obtain the diversity effect, when the control signals as transmitted by using two time slots of different time slot numbers are mixed, the signal in the time slot of the lower number is temporarily stored in a buffer memory, for example, for time adjusting in connection with the signal that will later arrive. In this respect, in a communication system in which a large delay time is unpreferable, it is suggestible to use time slots whose distance is not large, for example, adjacent time slots, for signal transmission, or to use the time slots of the same number in different radio channels.

For the voice signal, no consideration must be given to the following points. As seen from FIG. 1D, for example, the signal as sent is received and passed through the speed restoring circuits 138-1 and 138-2. Then, the outputs of them are applied to the signal mixing circuit 152. Accordingly, the signal delay occurs in only the time slot of the low number. The voice signal in the time slot that follows is not delayed, because the speech signal is speed converted and transmitted after that time point. The timing of commencing the speech is determined by the timing of the control signal at the time of originating a call. Accordingly, even if the last number is assigned to the time slot, that time point is the time that transmission of the voice signal starts, and the signal speed conversion progresses. Consequently, no delay time difference occurs that is due to the time slot used.

(VI) Calculation of Frequency Utilization Efficiency

Let us calculate the frequency utilization efficiencies in the case of the pulse communication according to the present invention and a conventional FM communication in the description, a modulating signal is a voice signal, and a speech circuit is used. Figures of specifications in the systems are as given below.

1) Pulse Communication according to the invention

Figure 13A:
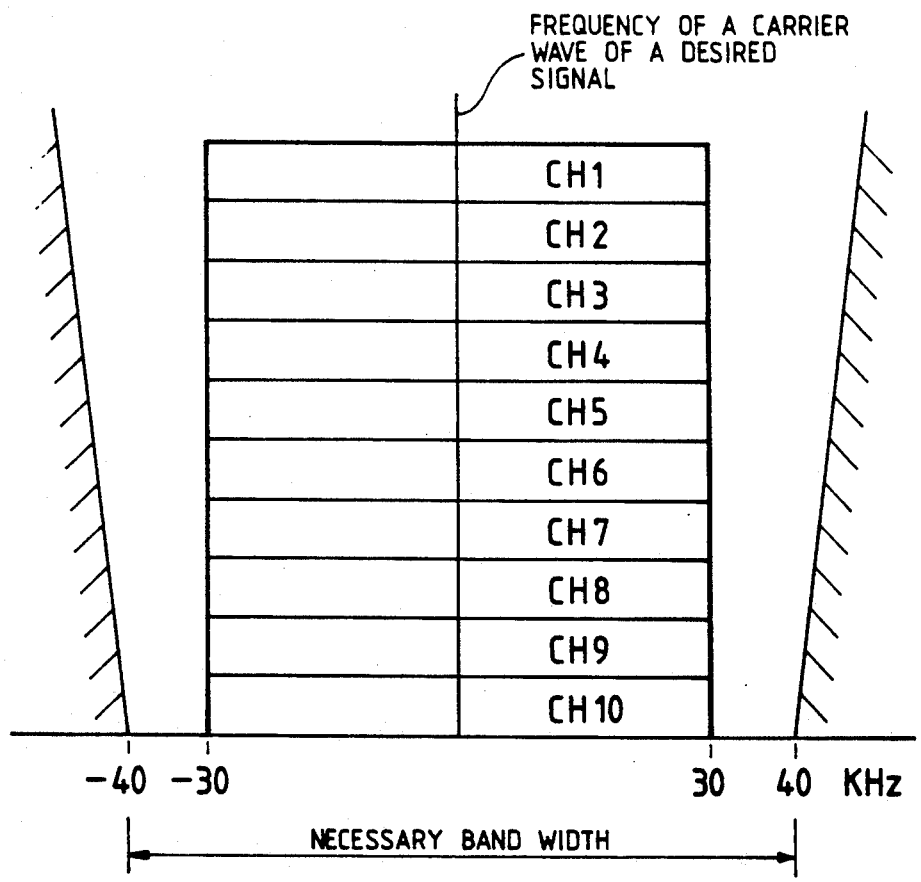
FIG. 13(a) and 13(b) show spectral diagrams for explaining necessary band widths of the conventional mobile communication system and the mobile communication system according to the present invention.

One radio channel consists of ten time slots; 10 voice channels can be used. A required frequency band is: 3 kHz × 10 = 30 kHz. Guard bands are additionally used, and hence the base band is ±40 khz, as shown in FIG. 13(a). This figure is disadvantageous to the invention.

Actually, such guard bands are not required, and those are used for ease of comparative explanation.

2) Conventional FM Communication (one voice channel /carrier)

Figure 13B:
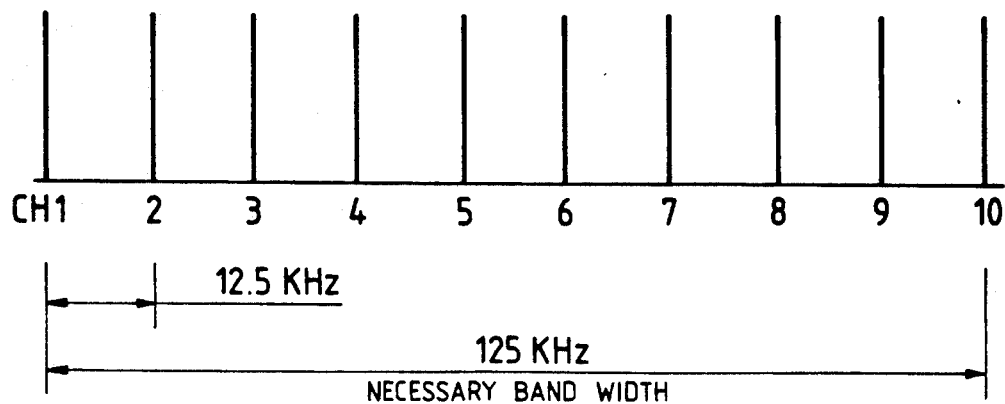

Since the base band signal of one radio channel occupies one voice channel, a required frequency band is: 3 kHz $\times 1 = 3$ kHz. $\pm 8$ kHz is required for the guard bands, and the radio carrier interval is 12.5 kHz as shown in FIG. 13($b$) (this figure is widely used in a cordless telephone system of 250 MHz/400 MHz band in Japan). Therefore, to simultaneously transmit the voice signals of 10 channels, a frequency band required is 12.5 kHz $\times 10 = 125$ kHz.

When comparing the above two systems, $$80:125 = 0.64.$$

The above figure shows that the pulse communication system according to the present invention requires only 60% of the frequency band of the conventional SCPC (single channel per carrier).

When comparing the above two communicating systems in a a large number of channels (the number of subscribers that can concurrently communicate), for example, 100 channels, a required frequency band of the present invention communication is $$\{3 \text{ kHz} \times 100 + 50 \text{ (guard bands)kHz}\} \times 2 = 700 \text{ kHz}.$$

In the FM communication (SCPC), it is $$12.5 \text{ kHz} \times 100 = 1250 \text{ kHz}.$$

When comparing them, $$700:1250 = 0.56.$$

This figure shows an additional superiority of the communication system according to the present invention over the convention one.

Let us then compare the frequency utilization efficiency of the pulse communication according to the present invention with that of a mobile communication system incorporating a TDMA (time division multiple access) widely used in recent Europe.

3) DMS 90 System (refer to paper by F. Lindell et al., "Digital Cellular Radio for the 1990s", Telecommunications, pp254 to 265, Oct. 1987).

This system allow a multiplex transmission of 10 voice channels (16 kilo bits/sec. for one channel), 340 kilo bits/sec., and a carrier wave interval (required frequency band) of 300 kHz.

A ratio of the frequency utilization effect of the communication system of item 1) above and that of the DMS90 in item 3) above, is $$80:300 = 0.67.$$

This figure shows a more ramarkable superiority of the system of the invention than of the analog system (SCP).

(9) Application of the Invention to a Communication System using a non-telephone system signal (broad band signal) other than a speech signal The description of items (1) to (8) is directed for the communication system in which the signal mainly used is a voice signal. It is apparent that the present invention is not limited to the communication system using the voice signal, but is applicable for the communication system using the non-telephone system signal, particularly a broad band signal. Alternatively, it is applicable for the communication system in which the voice signal and the non-telephone system signal are transmitted by using a single radio channel. This follows.

The signals contained in the time slots shown in FIG. 2A have substantially equal maximum frequencies, about 45 kHz, as shown in FIG. 3B. Bearing this in mind, if the maximum frequency of the base band signal, i.e., the input signal to the signal speed converting circuit group 51 shown in FIG. 1C is 6 kHz, it may be made substantially equal to that of another voice signal if such a signal speed conversion as to use two time slots shown in FIG. 2A. And no radio interference occurs. To this end, reduction of the rate of the signal speed conversion to $\frac{1}{2}$ suffices. If the maximum frequency of the broad band signal such as an image signal is 10 times as large as that of the voice signal, the signal speed conversion is carried out at the rate of 1/10, and ten (10) time slots are used.

To smoothly operate the communication system, it is unpreferable to transmit signals whose signal speeds are greatly different, by using the same radio channel. Initially, voice data, high speed data (30 kHz), and broad band signal (300 kHz) are separated and different radio channels are allocated to those signals, respectively. In case where the traffic is congested, the communication system is arranged so as to allow coexistence of different types of signals. If it is so arranged, the system has a high frequency utilization efficiency, and can deal with a variation of traffic.

(10) Application of the Invention to a Mobile Communication

System Using the Same Radio Frequency for the Signal

Transmission Between a Base Station and Mobile Stations

In the communication system as referred to in items (19 to (8), the frequency of the radio channel for signal transmission from the base station is different from the frequency of the radio channel for signal transmission from the mobile station. It is evident that the present invention is applicable for a mobile communication system (called a Ping-Pong transmission system) in which the same radio frequency is used for both the signal transmissions from the base station 30 and the mobile station. This follows.

In this case, it is required that each of the base station 30 and the mobile station can receive a signal from its opposite party without any radio interference. To this end, the transmission times of the time slots are time sequentially set at different times. This will be described in more detail with reference to FIGS. 2F to 2K.

In FIG. 2F corresponding to FIG. 2A already used, there are shown an output signal of the radio transmitting circuit 32 of the base station 30 and an input signal to the radio receiving circuit 35 in FIGS. 2F(a) and 2F(b). In the figure, time slots SD1 to SDn for transmitting signals from the base station are arranged in the first half of one frame. No signal is transmitted in the second half of the frame. The second half of the frame contains time slots Su1 to SUn used for transmitting signals from the mobile station 100. The base station 30 time sequentially receives the signals in the time slots SU1 to SUn as transmitted from the mobile stations 100. Since no signal transmission from the base station 30 is carried out by using this half frame, no radio interference occurs in the reception.

FIGS. 2G and 2H, which correspond to FIGS. 2C and 2D, show time slot arrays in the transmitting-/receiving diversity.

From the description in connection with FIG. 2F, it is seen that the instant communication system is operable in good condition when the time slot timings shown in FIGS. 2G and 2H are used.

Figure 2J:
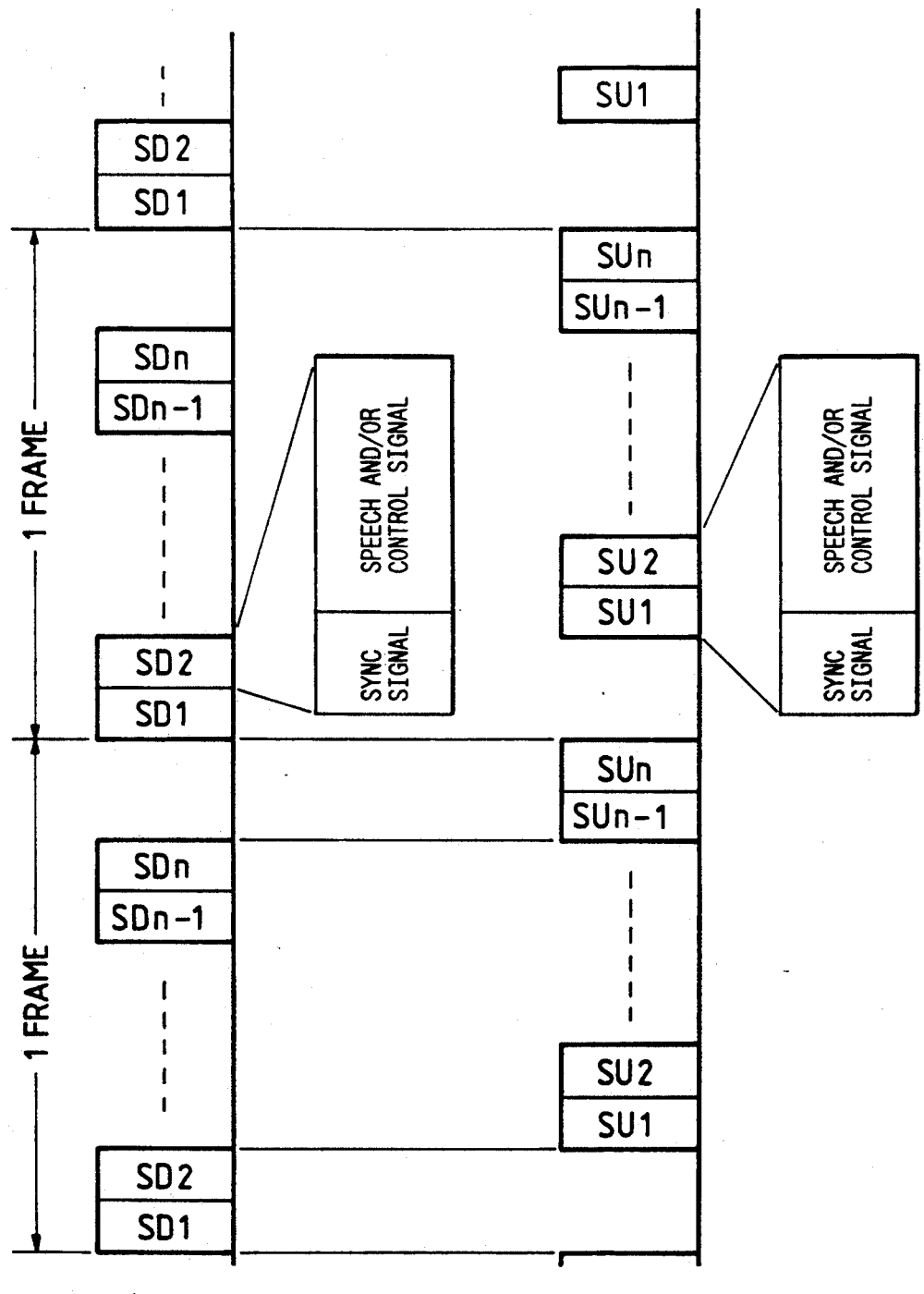

In FIGS. 2I, 2J, and 2K, there are illustrated time slot arrays when the same radio frequency is used for other transmission and reception.

As illustrated in FIG. 2I, after one down time slot SD1 ((a) in the figure) is output from the radio transmitting circuit 32 of the base station 30, the radio receiving circuit 35 receives a signal of a down time slot SU1 ((b) in the figure) from the mobile station 100. Subsequently, the signal is sent by using a time slot SD2, and it is received by using a time slot SU2.

FIG. 2J shows a communication state that signals are transmitted by using two down time slots SD1 and SD2 ((a) in the figure), and it is received by two time slots SU1 and SU2.

In the time slot arrays in FIG. 2K(a) and 2K(b), "n" number of down time slots SD1 to SDn are used for transmission, "n" number of different up time slots SI1 to SUn, for reception. In this instance, the length of the down time slot is longer than that of the up time slot. Such time slot arrays are convenient for such a data transmission that in response to a command from the base station (land side) 30, the mobile station (terminal side) 100 provides a short response. In case where the amount of data transmitted from the mobile station (terminal side) 100 is larger than that from the base station, the length of the up time slots SU1 to SUn is longer than that of the down time slots SD1 to SDn.

When the present invention is applied to a microcell system, the frame and the time slot must be synchronized in every base station.

Such a Ping-Pong transmission makes the arrangement of the transmitting/receiving device simple. This will be described with reference to FIG. 1F (As a matter of course, it is operable with the arrangements shown in FIGS. 1B-1, 1D, and 1E).

In FIG. 1F corresponding to FIG. 1B-1, as for the operation of the mobile station 100D, the same frequency but different timings are used for both transmission and reception. The remaining things are the same as those in FIG. 1B-1.

In FIG. 1F, the synthesizers 121-3 and 121-4 shown in FIG. 1B-1 are not used. The synthesizers 121-1 and 121-2 are subjected to common use. In the operation as shown in FIG. 2F, for example, the output timings to the switch 122-1 of the transmitting/receiving interrupt controller 123D is shifted from that to the switch 122-1 by ½ frame. Except the above, the operation of the mobile station 100 is the same as that of the mobile station in FIG. 1B-1. The circuit arrangement of the base station 30 may be made simple as the mobile station 100D.

The description in paragraphs (1) to (9) ca be applied to this paragraph, with modifications as given below.

i) F1(G1) is used for both the up frequency F1(G1) and the down frequency f1(g1).

ii) Since the time required for transmitting the signal within one frame is doubled, if a support concerning the signal delay time is given to the system, the time length of one time slot is halved. Specifically, a rate of time compressing the original signal as described in paragraphs (1) to (8), is doubled or a rate of time dividing the original signal is doubled. In reception, the reverse procedure is applied.

As described in this paragraph, when the present invention is applied to the Ping-Pong transmission, the following advantages are obtained.

i) The hardware arrangement is simple.

ii) When the Ping-Pong transmission is applied to the conventional digital communication system, the multiplex propagating characteristic deforms a pulse waveform, and remarkably reduces an average bit error rate. This is remarkable particularly in a high signal transmission, vis., when the signal speed exceeds 200 kpbs, for example. The communication system according to the present invention essentially belongs to the analog communication system. Accordingly, although the system is influenced by the effects by the multiplex transmission, but it is negligible, In the case where a voice signal is subjected to the analog transmission through the space transmission, if the multiplex degree is 100, the maximum frequency is low, 3 kHz×100=300 kHz. In the micro-wave fixed communication as a conventional technique, signals of 8 MHz to 12 MHz are transmitted. When comparing this figures, it is very low. Therefore, no problem would arise.

As seen from the foregoing description, when the present invention is applied to a mobile communication system, the result communication system has a higher frequency utilization effect than the conventional one. The adjacent channel interference, the same channel interference, and the delay characteristic of the transmission signal as design parameters and greatly determines the line quality, can be reduced to negligible values, improve the frequency utilization efficiency.

In the conventional communication system employing the microcell system, when the mobile station now engaging a communication moves from one zone to another, the communication will be interrupted unless handover technique would be introduced. This becomes problematic, causing image quality deterioration and burst signal error in the facsimile and data transmission, although it little creates a problem in the speech signal transmission. In the communication system according to the present invention, the above problems are completely removed. No radio interference occurs in the same base station or between the base station and mobile stations Use of the diversity communication is possible. Thus, the communication quality is greatly improved. The present invention greatly contributes to the growth of industry.

While some specific embodiments have been described, it is understood that the present invention may variously be changed and modified within the scope of the appended claims.

What is claimed is:

1. A mobile communication system using a time division communication system, comprising:
   mobile radio means for transmitting and receiving timecompressed and segmented signals through a radio channel allocated to a plurality of time slots;
   a plurality of radio base stations each having a service area which is disposed to overlap at least partially with one another, each of said radio base stations being provided with a predetermined communicable time slot previously allocated thereto so as to communicate with said mobile radio means using only a specific time slot of said time slots of said radio channel when said mobile radio means moves across one of said service areas, said predetermined communicable time slot allocated to one of said radio base stations being different from that allocated to the other radio base stations adjacent thereto; and gateway exchange means for exchanging communications between said mobile radio means and said radio base stations and for connecting said radio base stations to a public switched telephone network.

2. A mobile communication system according to claim 1, in which said gateway exchange means generates a synchronous signal, and said time slots transmitted through said radio channel are synchronized with said synchronous signal.

3. A mobile communication system according to claim 1, in which said radio base station sends a radio signal by using only the time slot allocated to said radio base station.

* * * * *